(12) United States Patent
Webster et al.

(10) Patent No.: US 8,097,741 B2
(45) Date of Patent: Jan. 17, 2012

(54) HYBRID COATINGS PREPARED FROM GLYCIDYL CARBAMATE RESINS

(75) Inventors: Dean C. Webster, Fargo, ND (US); Dipak Chattopadhyay, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 150 days.

(21) Appl. No.: 12/593,716

(22) PCT Filed: Mar. 31, 2008

(86) PCT No.: PCT/US2008/058904
§ 371 (c)(1),
(2), (4) Date: Mar. 1, 2010

(87) PCT Pub. No.: WO2008/150568
PCT Pub. Date: Dec. 11, 2008

(65) Prior Publication Data
US 2010/0216951 A1 Aug. 26, 2010

Related U.S. Application Data

(60) Provisional application No. 60/907,400, filed on Mar. 30, 2007, provisional application No. 60/976,052, filed on Sep. 28, 2007.

(51) Int. Cl.
*C07F 7/10* (2006.01)

(52) U.S. Cl. ........ 556/413; 549/512; 549/551; 549/553; 549/555; 556/419; 556/421; 428/428; 428/450

(58) Field of Classification Search ................... None
See application file for complete search history.

(56) References Cited

U.S. PATENT DOCUMENTS

| 6,369,188 B1 * | 4/2002 | Rappoport et al. ............. 528/49 |
| 7,501,480 B2 * | 3/2009 | Westhoff et al. ................ 528/27 |

FOREIGN PATENT DOCUMENTS

| JP | 56-115781 | * 11/1981 |
| SU | 1708815 | * 1/1992 |

OTHER PUBLICATIONS

"Thermal Stability and Degradation Kinetics of Novel Inorganic/Organic Epoxy Hybrid Containing Nitrogen/Silicon/Phosphorus by Sol-gel Method" Thermochimica Acta (2007) 453, 97-104.*
"Preparation and Characterization of Alkoxysilane-funcitonalized Isocyanurates" Polymer (2000) 41, 57-71.*

* cited by examiner

*Primary Examiner* — Marc Zimmer
(74) *Attorney, Agent, or Firm* — J.A. Lindeman & Co., PLLC

(57) ABSTRACT

The invention relates to solvent-containing two-component polyurethane moisture cured hybrid sol-gel coating formulation comprising 1) an epoxy-functional binder with carbamate functionality and 2) a blended curing component comprising at least one sol gel precursor and an amine crosslinker.

25 Claims, 31 Drawing Sheets

HYBRID COATINGS PREPARED FROM GLYCIDYL CARBAMATE RESINS

PRIORITY CLAIM

This invention claims the benefit under 35 U.S.C. §119(e) to U.S. Provisional Application No. 60/907,400, filed Mar. 30, 2007, and U.S. Provisional Application No. 60/976,052, filed Sep. 28, 2007, both of which are herein incorporated by reference in their entirety.

GOVERNMENT SUPPORT

This invention was supported by Air Force Office of Scientific Research (AFOSR) Grant number FA9550-05-1-0381. The government has certain rights in this invention.

FIELD OF INVENTION

This invention relates to a coating formulation containing an epoxy-functional binder with carbamate functionality and a blended curing component. The formulations have good thermal stability, adhesion properties, and solvent resistance.

BACKGROUND

Hybrid coatings systems are a route to achieving materials having unique and superior properties that cannot be achieved using only a single component of the hybrid. The sol-gel technique, one of the easy and cost-effective methods to make hybrid coatings, is unique since chemical linkages between the soft organic and the hard inorganic components are established. In this way, one can combine the properties of an organic component such as mechanical toughness and flexibility with the hardness and thermal stability of the inorganic component into a single system. See, e.g. Y. J. Du, M. Damron, G. Tang, H. Zheng, C. J. Chu, J. H. Osborne, Prog. Org, Coat. 41 (2001) 226-232; D. K. Chattopadhyay, K. V. S. N. Raju, Prog. Polym. Sci. 32 (2007) 352-418, herein incorporated by reference in its entirety. In the case of silane based sol-gel systems, the silicon-oxygen bonds of these types of polymers provides the hybrid with a variety of attractive properties. Additionally, due to the hybrid character, sol-gel coatings based on polyurethanes (PUs) or epoxy-amine coatings possess high optical transparency, superior weathering and corrosion resistance, excellent abrasion and impact resistance as well as better adhesive properties than the base material. Depending on the desired field of application, coatings with different thermo-mechanical properties can be obtained due to the versatility in the formulation variables of the organic components, inorganic components and sol-gel processing parameters. The inorganic phase is obtained from the hydrolysis and condensation reactions in the sol-gel process of metal alkoxides of the type $RM(OC_nH_{2n+1})_3$, where R is a suitable organic group and M is Si, Ti, Al, Sn or Zr. The appropriate choice of R enables one to synthesize hybrids with a wide variety of properties. Organosilanes such as 3-aminopropyl trimethoxysilane (APTMS) and N-(2-aminoethyl) 3-aminopropyl trimethoxysilane (AEAPTMS) are widely used precursors of silica in the sol-gel process to obtain ceramer coatings. These can be further modified with a tetrafunctional alkoxysilane such as tetraethylorthosilicate (TEOS).

Alkoxy silane functional polyureas have been synthesized from the reaction of a the isocyanurate trimer of hexamethylene diisocyanate and 3-aminopropyl trimethoxy silane and these have been used to make a moisture curing hybrid coating. See H. Ni, D. J. Aaserudb, W. J. Simonsick Jr., M. D. Soucek, Polymer 41 (2000)57-71; and H. Ni, A. D. Skaja, R. A. Sailer, M. D. Soucek, Macromol. Chem. Phys. 201 (2000) 722-732, both of which are herein incorporated by reference in their entirety. Coatings were also prepared incorporating TEOS in addition to the silane modified polyurea. See H. Ni, A. D. Skaja, M. D. Soucek, Prog. Org. Coat. 40 (2000)175-184; and H. Ni, W. 3. Simonsick, A. D. Skaja, J. P. Williams, M. D. Soucek, Prog. Org. Coat. 38 (2000)97-110, both of which are herein incorporated by reference in their entirety.

A monofunctionalized isocyanurate was prepared from the reaction of one mole of the isocyanurate trimer of hexamethylene diisocyanate and one mole of 3-aminopropyl trimethoxysilane. See H. Ni, A. H. Johnson, M. D. Soucek, J. T. Grant, A. J. Vreugdenhil, Macromol. Mater. Eng. 287 (2002) 470-479; and M. D. Soucek, H. Hai, J. Coat. Technol. 74(933) (2002)125-134, both of which are herein incorporated by reference in their entirety. Hybrid coatings were made from a combination of the monofunctionalized resin, a polyester polyol and TEOS.

A shape memory polyurethane system was synthesized by first preparing a diol from the Michael reaction of two moles of hydroxylethyl acrylate with 3-aminopropyl trimethoxy silane. The diol was then incorporated into a linear polyurethane and then crosslinked by the hydrolysis-condensation of the silane functional groups. See J. Xu, W. Shi, W. Pang, Polymer 47 (2006)457-465, herein incorporated by reference in its entirety.

A hybrid epoxy silica hybrid material was synthesized by mixing glycidoxypropyl trimethoxy silane, a bisphenol-A diglycidyl ether epoxy resin and an amine crosslinker. See S. R. Davis, A. R. Brough, A. Atkinson, J. Non-Crystalline Solids 315 (2003)197-205, herein incorporated by reference in its entirety.

An alkoxysilane functional epoxy resin was prepared by reacting the hydroxyl groups in a bisphenol-A diglycidyl ether epoxy resin with isocyanatopropyl triethoxysilane. See R. C. Chang, C. L. Chiang, Y. C. Chiu, J. Appl. Polym. Sci. 106 (2007)3290-3297, herein incorporated by reference in its entirety. An alkoxysilane functional isocyanurate resin was also prepared from the reaction of triglycidyl isocyanurate with aminopropyl triethoxysilane. The two silane modified resins were then combined along with a polyoxypropylene diamine crosslinker to faint the hybrid sol-gel network.

Glycidyl carbamate (GC) functional oligomers can be synthesized by the reaction of the NCO groups in polyfunctional isocyanates with glycidol. See Chen et al., J. Applied Polymer Science, 51, 1199 (1994); and J. Applied Polymer Science, 52, 1137 (1994), both of which are herein incorporated by reference in their entirety. Chen described the preparation of glycidyl-terminated polyurethane resins. Polyamines were used to crosslink the polymers. Blends of the glycidyl-terminated polyurethane resins with conventional epoxy resins were also prepared and crosslinked with polyamines.

Multifunctional GC oligomers may be prepared from isocyanurate trimers of HDI and biuret adducts of HDI, and are called IGC and BGC, respectively. See P. A. Edwards, G. Striemer, D. C. Webster, Prog. Org. Coat. 57 (2006)128-139; and P. A. Edwards, G. Striemer, D. C. Webster, J. Coat. Technol. Research 2(7) (2005)517-527, both of which are herein incorporated by reference in their entirety. These resins are composed of a mixture of the triisocyanate resin plus additional higher molecular weight oligomers. GC functional oligomers will self-crosslink at elevated temperatures to form coatings with good hardness, flexibility, and adhesion. See P. A. Edwards, G. Striemer, D. C. Webster, Prog. Org. Coat. 57 (2006)128-139, herein incorporated by reference in its entirety. GC functional oligomers can also be crosslinked with polyfunctional amines. See P. A. Edwards, G. Striemer, D. C. Webster, J. Coat. Technol. Research 2(7) (2005) 517-527, herein incorporated by reference in its entirety.

Webster, et al., have also disclosed the synthesis of glycidyl carbamate functional resins where part of the glycidol is replaced by alcohols. See U.S. Provisional Application No. 60/976,072, entitled, "Modified Glycidyl Carbamate Resins" filed on Sep. 28, 2007, herein incorporated by reference in its entirety.

Thus, there is an ongoing need in the art for improved silane-functional epoxy urethane compounds and coating compositions containing these compounds, in particular coating compositions that exhibits good adhesion, abrasion resistance, solvent resistance, and thermal stability. This invention answers that need.

BRIEF DESCRIPTION OF THE FIGURES

FIG. 1-2. Thermal decomposition profile of F-2 with cure time evaluated in $N_2$ atmosphere.

FIG. 1-3. Thermal decomposition profile of (a) F-5 and (b) F-7 with cure time evaluated in $N_2$ atmosphere.

FIG. 1-4. Thermal decomposition profile of F-8 with cure time evaluated in $N_2$ atmosphere.

FIG. 1-5. TGA thermograms of F-11H, F-12H and F-13H in $N_2$ atmosphere.

FIG. 1-6. Isothermal TG curves of F-1 at 180, 200, 220, 240 and 260° C. in $N_2$ atmosphere.

FIG. 1-7. DSC optimization of temperature range for $T_g$ evaluation and enthalpy study.

FIG. 1-8. DSC thermograms of F-11, F-12 and F-13 in $N_2$ environment.

FIG. 1-9. DSC heating thermograms of F-4 in $N_2$ atmosphere with cure time.

FIG. 1-10. Tapping-mode AFM height images of selected hybrid coatings.

FIG. 2-1. TGA curves of (a) F-24 in $N_2$ atmosphere and (b) F-26 with in $N_2$ atmosphere cure time.

FIG. 2-2. Thermogravimetric curves of F-31 at different heating rate studied in (a) $N_2$ environment and (b) air environment.

FIG. 2-3. TGA curves of (a) ancamide 2353 crosslinked room temperature cured, (b) ancamide 805 crosslinked room temperature cured, (c) amicure PACM crosslinked room temperature cured and (d) epicure 3164 crosslinked oven cured hybrid coatings prepared at different epoxy (silane modified GC resin): amine (crosslinker) ratio. The measurements were carried out in $N_2$ environment and H stands for oven cured sample.

FIG. 2-4. TGA thermograms of different ancamide crosslinked hybrid coatings (F-23, F-24 and F-25) prepared from BGC33% Si resin and crosslinked at 1:1 epoxy (BGC33% Si resin) and ancamide amine equivalent weight ratio.

FIG. 2-5. DSC thermograms of (a) F-20 at two different cure time, (b) F-24 at two different cure time, (c) F-26 at three different cure time and (d) F-27 at three different cure time.

FIG. 2-6. DSC thermograms of cured samples (a) F-24, F-37, F-54 and F-58 and (b) F-25, F-33 and F-50, (c) F-26 and F-27 and (d) F-17, F-21, F-30 and F-48.

FIG. 2-7. DSC thermograms of different ancamide crosslinked hybrid coatings prepared from (a) BGC33% Si and (b) BGC20% Si resin. The epoxy equivalent of silane modified resin and amine equivalent ratio of ancamide crosslinkers used in these formulations was 1:1.

FIG. 3-1. GPC results of BGC, BGC10% Si and BGC15% Si resins.

FIG. 3-2. (a) $^1H$ NMR spectra of different samples recorded at 22.5° C., (b) increasing peak intensity of N$\overline{H}$—C=O during the synthesis of BGC resin and (c) disappearance of glycidol OH during the synthesis of BGC resin.

FIG. 3-3. Amide region of the $^1H$ NMR spectra of BGC % 10Si resin as a function of temperature.

FIG. 3-4. The urethane region $^{13}C$ NMR spectra of BGC, BGS10% Si and BGS15% Si resins recorded at 22.5° C.

FIG. 3-5. Thermogravimetric curves of (a) BGC-5 and BGC-8, (b) BGC-5H and BGC-9H in $N_2$ environment.

FIG. 3-6. TGA thermograms of BGC-10 and BGC-10H in $N_2$ environment.

FIG. 3-7. TGA thermograms of (a) oven cured Ancamide 2050 crosslinked BGC10% Si resin at different TEOS loading, (b) room temperature cured Epicure 3164 crosslinked BGC15% Si resin at different TEOS loading, (c) room temperature cured Ancamide 2050 crosslinked BGC15% Si resin at different TEOS loading and (d) room temperature cured Ancamide 2353 crosslinked BGC15% Si resin at different TEOS loading.

FIG. 3-8. DSC thermograms of BGC-10 and BGC-10H in $N_2$ environment.

FIG. 3-9. DSC thermograms of PACM crosslinked oven cured and room temperature cured BGC10% Si-11 and BGC10% Si-12 hybrid coatings evaluated in $N_2$ environment.

FIG. 3-10. DSC thermograms of Epicure 3164 crosslinked oven cured and room temperature cured BGC10% Si-13, BGC10% Si-14 and BGC10% Si-20 hybrid coatings evaluated in $N_2$ environment.

FIG. 3-11. DSC thermograms of Ancamide 2353 crosslinked oven cured and room temperature cured BGC10% Si-15, BGC10% Si-16 and BGC10% Si-21 hybrid coatings evaluated in $N_2$ environment.

FIG. 3-12. DSC thermograms of Ancamide 2050 crosslinked oven cured and room temperature cured BGC10% Si-17, BGC10% Si-18 and BGC10% Si-22 hybrid coatings evaluated in $N_2$ environment.

FIG. 3-13. DSC thermograms of Epicure 3164 crosslinked oven cured and room temperature cured BGC15% Si-23, BGC15% Si-24 and BGC15% Si-25 hybrid coatings evaluated in $N_2$ environment.

FIG. 3-14. DSC thermograms of Ancamide 2050 crosslinked oven cured and room temperature cured BGC15% Si-26, BGC15% Si-27 and BGC15% Si-28 hybrid coatings evaluated in $N_2$ environment.

FIG. 3-15. DSC thermograms of Ancamide 2353 crosslinked oven cured and room temperature cured BGC15% Si-29, BGC15% Si-30 and BGC15% Si-31 hybrid coatings evaluated in $N_2$ environment.

FIG. 3-16. Hardness values of different hybrid coating systems.

SUMMARY OF THE INVENTION

Figure 1:
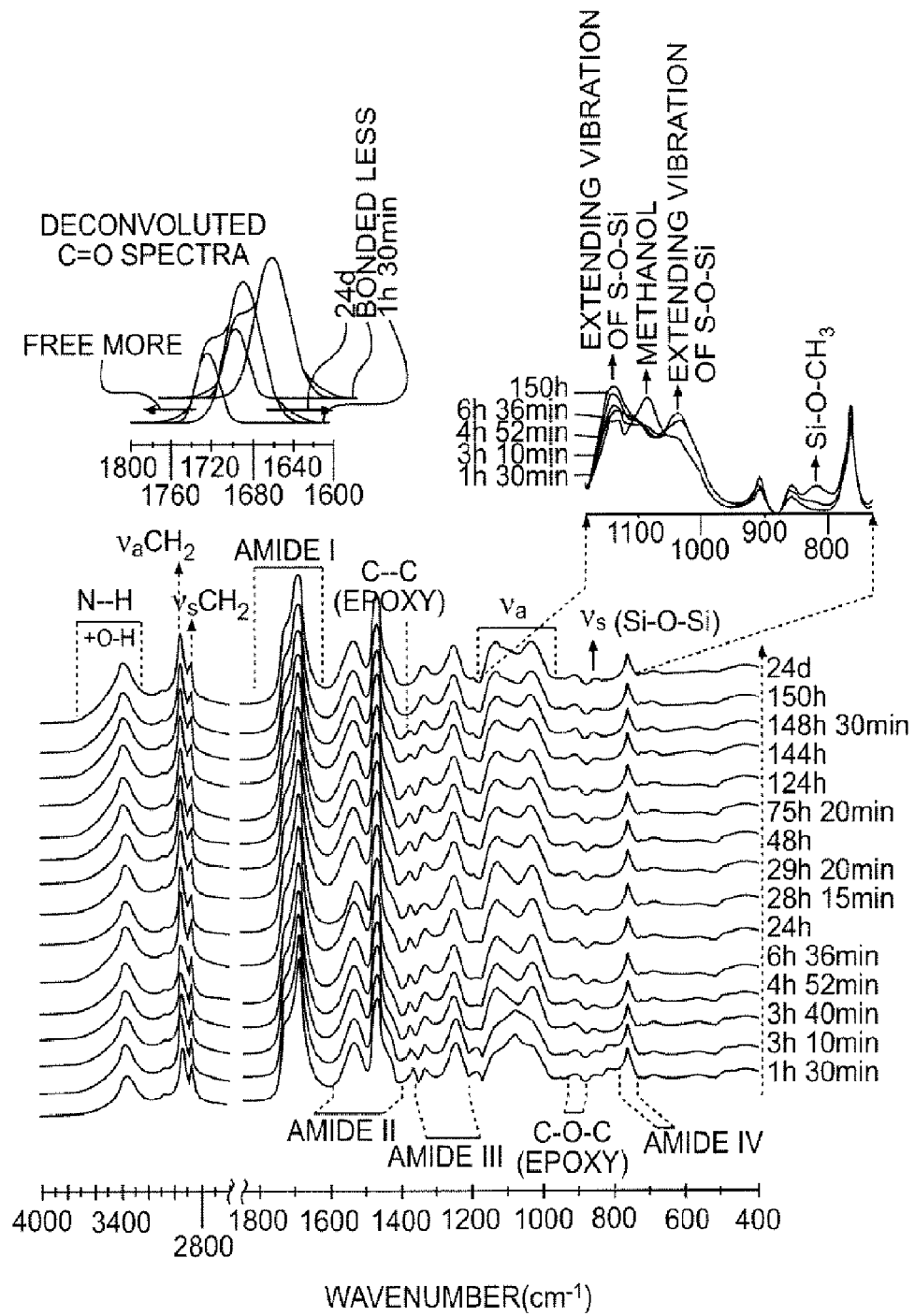
FIG. 1-1. FTIR spectra of F-1 with cure time (bottom) and deconvoluted C=O zone of F-1 with cure time (top).

This invention relates to a silane-functional epoxy urethane compound of Formula (I) or Formula (II), disclosed below.

The invention also relates to A coating composition, comprising an epoxy urethane compound of Formula (I) or Formula (II), disclosed below, and a curing agent. The coatings exhibits good adhesion, abrasion resistance, solvent resistance, and thermal stability. They have various utilities, for instance as a component for an abrasion-resistant material.

The invention also relates to a method of preparing a silane-modified hybrid coating composition, comprising: (a) reacting an isocyanate resin with an amine-terminated silane to produce a silane-modified isocyanate resin; (b) reacting the silane-modified isocyanate resin with glycidol to produce a silane-modified glycidyl carbamate resin; and (c) mixing the silane-modified glycidyl carbamate resin with at least one sol gel precursor and/or at least one amine crosslinker, to produce a silane-modified hybrid coating composition.

The invention also relates to a method of preparing a hybrid coating composition, comprising: (a) reacting an isocyanate resin with glycidol to form a glycidyl carbamate resin; and (b) mixing the glycidyl carbamate resin with at least one sol gel precursor and/or at least one amine crosslinker, to produce a hybrid coating composition.

DESCRIPTION

Coating research and development in 21$^{st}$ century is directed to develop novel hybrid coatings with tunable properties. The basic attraction towards developing novel organic-inorganic hybrid coatings in recent years is due to their unique properties derived from a combination of inorganic and organic components. Sol-gel chemistry provides an easy, cost-effective and excellent way to incorporate an inorganic component into the organic binder. This technology produces transparent, hard and stable coatings with improved thermal and mechanical properties with wide application as abrasion resistant material. Tetraethoxysilane (TEOS) represents a useful inorganic precursor for the sol-gel reaction because of the formed silica network phase separate and its non-compatibility with many polymers.

Glycidyl carbamate chemistry has wide application in coating technology as high performance polymers that contain carbamate functionality and epoxy reactivity while formulating coatings. The technology combines polyurethane and epoxy properties into a single system, which result in improved hardness and toughness. Glycidyl carbamate oligomers can be formulated by the reaction of NCO group in di- or tri-isocyanate with glycidol, which reduce the isocyanate toxicity during application. The advantage of reacting amino group in amine-terminated silane with epoxy group in glycidyl carbamate resin is to incorporate the property of inorganic component e.g., silane into the organic binder. See, e.g., U.S. patent application Ser. No. 11/882,754, filed Aug. 3, 2007, entitled, "Water Dispersible Epoxy Urethane Compounds and Coating Compositions," herein incorporated by reference in its entirety.

Edwards, et al. (Polymer Preprints, 44(1), 144 (2003); Polymer Preprints, 44(1), 54 (2003); Polymeric Materials: Science and Engineering, 90, 455 (2004); and Prog. Org. Coat., 57, 128-139 (2006)), all of which are herein incorporated by reference in their entirety, described the synthesis of multifunctional glycidyl carbamate functional oligomers from polyfunctional isocyanates and glycidol. The self-crosslinking reaction to form coatings with good performance was also described. Edwards, et al. (Polymer Preprints, 45(1), 935 (2004); and JCT Research 2(7), 517-528 (2005)), both of which are herein incorporated by reference in their entirety, described the crosslinking of the multifunctional glycidyl carbamate functional oligomers with polyfunctional amines to form hard and flexible coatings having good solvent resistance. The glycidyl carbamate resins described by Edwards, et al. are the reaction products of multifunctional isocyanates with glycidol. Two such resins are illustrated below and are based on the hexamethylene diisocyanate triisocyanurate trimer (IGC) and biuret trimer (BGC), respectively.

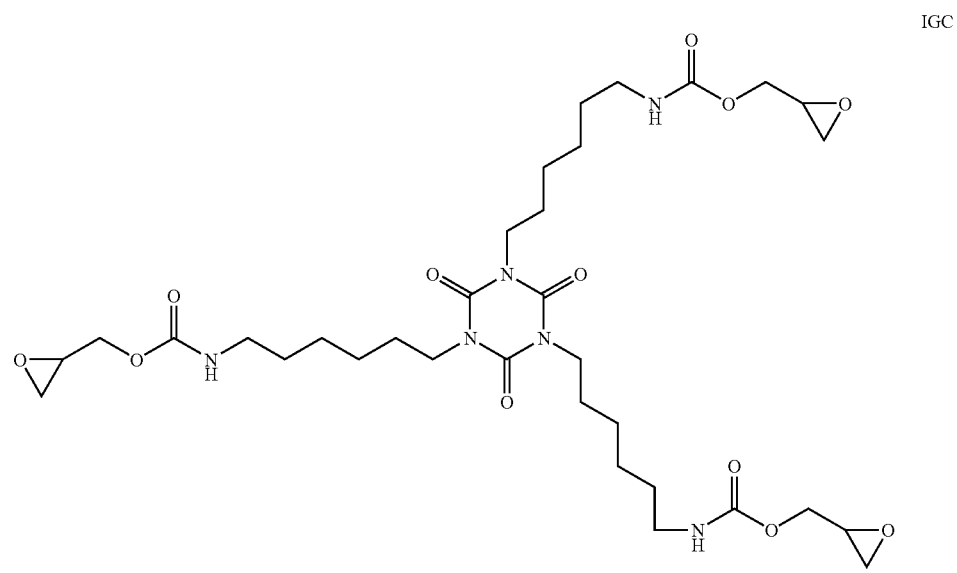

IGC

BGC

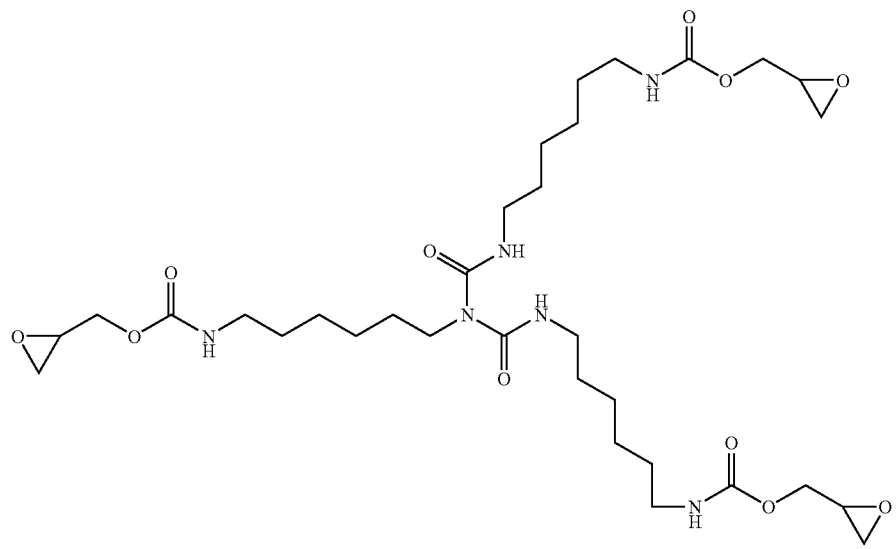

This invention relates to a coating composition containing an epoxy urethane compound and a curing agent. The epoxy urethane compound is preferably a compound of the Formula (I) or Formula (II):

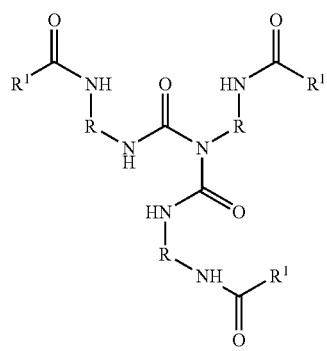

(I)

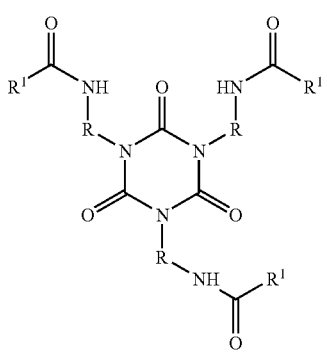

(II)

where R is independently an optionally substituted, divalent $C_1$-$C_{15}$ alkyl, optionally substituted divalent $C_3$-$C_{15}$ cycloalkyl, or a group selected from

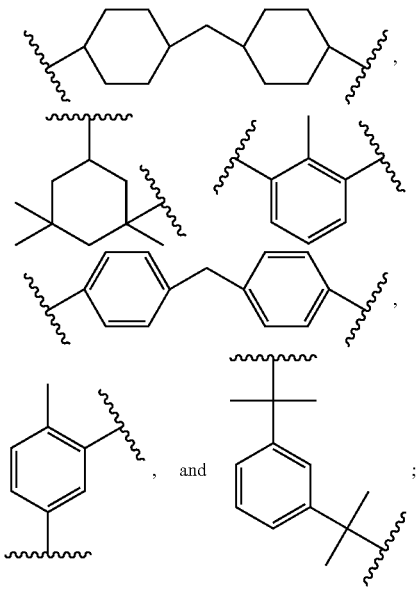

$R^1$ is independently a —NH—$(CH_2)_n$—Si$(OR^2)_3$ group or a

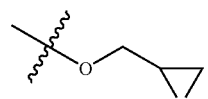

group wherein at least one $R^1$ is a

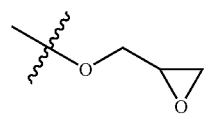

group; $R^2$ is independently a $C_1$-$C_6$ alkyl group; and n ranges from 1 to 5. Coating compositions of the invention may contain mixtures of compounds of formulas (I) and (II).

The structure representing formula (I) is the preferred epoxy urethane compound. The epoxy urethane compound is preferably a silane-functional epoxy urethane compound with a —NH—$(CH_2)_n$—$Si(OR^2)_3$ group present as $R^1$ in an amount of about 2 to about 50 mole %, preferably about 5 mole % to about 40 mole %, and most preferably about 10 to about 33 mole %.

In a preferred embodiment, each $R^1$ is a

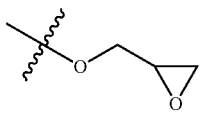

group, making the preferred epoxy urethane compounds of formulas (III) and (IV):

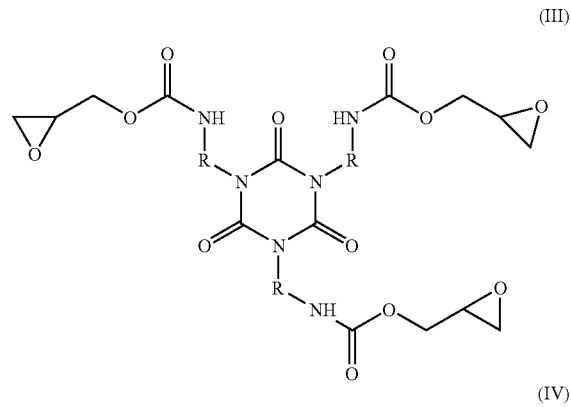

(III)

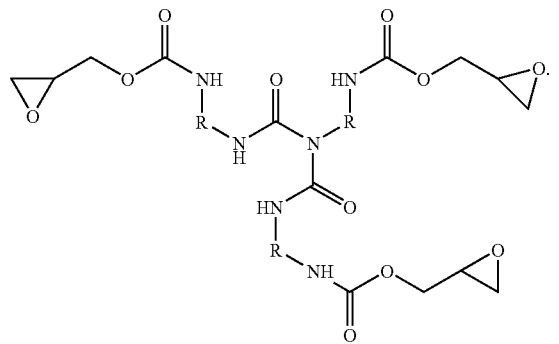

(IV)

Alternatively, it is desirable to have at least one of the $R^1$ groups represented by a —NH—$(CH_2)_n$—$Si(OR^2)_3$ group. Thus, in an another embodiment of the invention, one or two of the $R^1$ groups are represented by the —NH—$(CH_2)_n$—Si$(OR^2)_3$ group.

The R group is preferably a divalent $C_3$-$C_8$ alkyl, and most preferably —$(CH_2)_6$—, $R^2$ is preferably a methyl or an ethyl group, and n is preferably 2-4, most preferably 3.

The curing agent is preferably an amine crosslinker. Alternatively, the curing agent can be a blended curing component that contains at least one sol gel precursor and an amine crosslinker. For coating compositions of the invention employing compounds of formulas (III) or (IV), the curing agent is a blended curing component.

The curing agent serves to crosslink the epoxy urethane. The curing agent may be any curing agent known in the art to cure (or crosslink) epoxy resins. The curing agent may be used in the manner and amount known in the art. Suitable curing agents for use with the system include those typically employed with epoxy resins, such as aliphatic, araliphatic and aromatic amines, polyamides, amidoamines and epoxyamine adducts. The coating may be cured at ambient or elevated (e.g. about 80° C.) temperatures. Amine curing agents typically allow the coating to cure at ambient temperatures.

Suitable amine crosslinkers/curing agents are those which are reactive with the epoxy groups on the glycidyl carbamate resin. Amine curing agents known in the art include, for example, diethylenetriamine, triethylenetetramine, tetraethylene-pentamine, etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononane; 1,12-diaminododecane; 4-azaheptamethylenediamine; N,N"-bis(3-aminopropyl)butane-1,4-diamine, 1-ethyl-1,3-propanediamine; 2,2(4), 4-trimethyl-1,6-hexanediamin; bis(3-aminopropyl)piperazine; N-aminoethylpiperazine; N,N-bis(3-aminopropyl)ethylenediamine; 2,4(6)-toluenediamine; dicyandiamine; melamine formaldehyde; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclohexane; 1,2-diamino-4-cyclohexylcyclohexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl) cyclohexane; and 1-cyclohexyl-3,4-dimino-cyclohexane. As exemplary araliphatic amines, in particular those amines are employed in which the amino groups are present on the aliphatic radical for example m- and p-xylylenediamine or their hydrogenation products as well as diamide diphenylmethane; diamide diphenylsulfonic acid (amine adduct); 4,4"-methylenedianiline; 2,4-bis (p-aminobenzyl)aniline; diethyltoluenediamine; and m-phenylene diamine. The amine curing agents may be used alone or as mixtures.

Preferred amine crosslinkers include Anquamine 419, bis (para-aminocyclohexyl)methane (PACM), diethylene triamine (DETA), 4,4'-methylene dianiline (MDA), p-aminocyclohexyl methane, Ancamide 805, Ancamide 2050, Ancamide 2353, Epicure 3164, Jeffamine D400, Jeffamine D2000, Geramide 2050, and combinations thereof. Stoichiometry ratios of amine to oxirane of the coating compositions may be based on amine hydrogen equivalent weight (AHEW) and on weight per epoxide (WPE).

The amine crosslinker can be added in any amount, dependent on the desired amount of reaction between the amine of the crosslinker and the epoxy groups of the epoxy urethane compound. The ratio of epoxy groups to amine-active hydrogens preferably ranges from about 1.0:0.5 to about 1.0:2.5, more preferably from about 1.0:1.0 to about 1.0:2.0. The amine-active hydrogens are the sum of those from the amine crosslinker and the amine-functional silane.

Any silica sol-gel precursor which will crosslink with the glycidyl groups of the GC resin may be used in the invention.

Preferred sol-gel precursors have the formula $H_2N-R^3-Si(R^4)_3$ or $(R^4O)_4Si$, where $R^3$ is a divalent $C_1$-$C_{15}$ alkyl and $R^4$ is $C_1$-$C_{15}$ alkyl. More preferably, the sol-gel precursor is 3-aminopropyl trimethoxysilane (APTMS), tetraethyl orthosilicate (TEOS), or combinations thereof. The sol-gel precursor may be added in amounts ranging from about 0.1 to about 50 weigh percent, preferably about 1.0 to about 20 weight percent, and most preferably in an amount ranging from about 2 to about 15 weight percent.

Amine-epoxide adducts may also be added to the coating. Suitable amine-epoxide adducts include reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

An aspect of the invention is also directed to a silane-functional epoxy urethane compound of the Formula (I) or Formula (II):

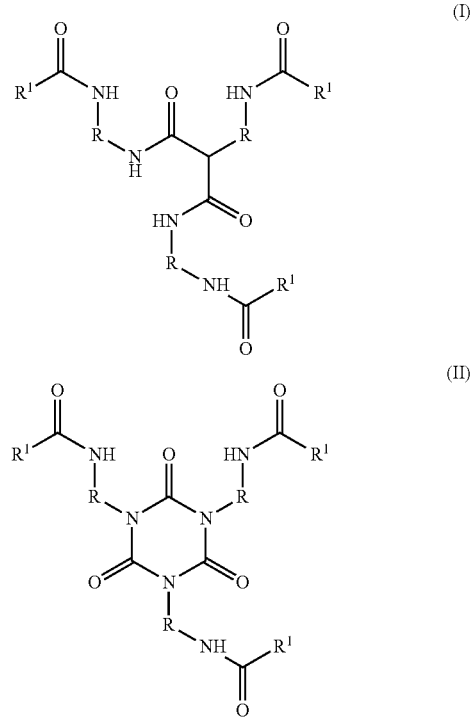

wherein R is independently an optionally substituted, divalent $C_1$-$C_{15}$ alkyl, optionally substituted divalent $C_3$-$C_{15}$ cycloalkyl, or a group selected from

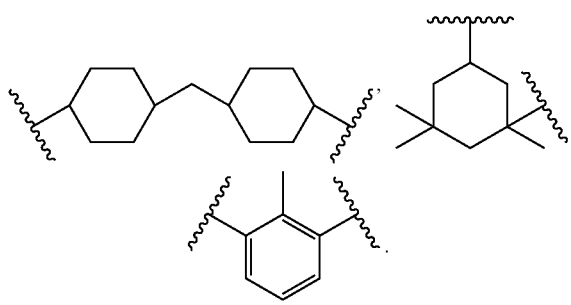

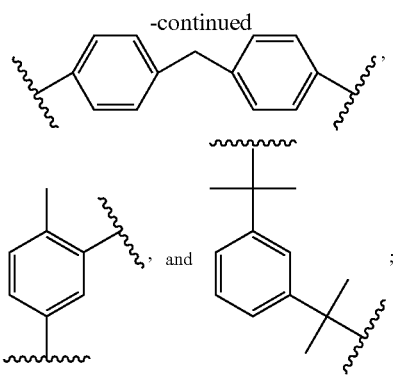

where $R^1$ is independently a $-NH-(CH_2)_n-Si(OR^2)_3$ group or a

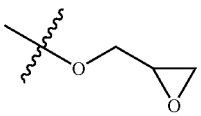

group and wherein at least one $R^1$ is a $-NH-(CH_2)_n-Si(OR^2)_3$ group; $R^2$ is independently a $C_1$-$C_6$ alkyl group; and n ranges from 1 to 5.

In a preferred embodiment, each occurrence of $R^1$ is a $-NH-(CH_2)_n-Si(OR^2)_3$ group; in other embodiments, the $-NH-(CH_2)_n-Si(OR^2)_3$ groups represent only one or two of the $R^1$ substituents. Formula (I) is the preferred formula.

Preferably, $R^2$ is a methyl or ethyl group, n is 2-4 (most preferably 3), and $R^3$ is $-(CH_2)_6-$ or one of the six groups shown above.

This embodiment of the invention is directed to a single silane-functional epoxy urethane compound. In many applications, the compound will be present in bulk form, comprising an assortment of compounds. While each silane-functional epoxy urethane compound falling within the above formula should have a silane functionality (at least one $R^1$ is a $-NH-(CH_2)_n-Si(OR^2)_3$ group), these compounds can be part of a composition comprising compounds that do not contain the silane functionality.

If one of skill in the art desires a composition containing, for example 10-15 mole % silane, the ratio of compounds having at least one $R^1$ is a $-NH-(CH_2)_n-Si(OR^2)_3$ group to compounds having no silane functionality can be adjusted to achieve the desired amount of silane functionality in the composition. For instance, one skilled in the art can synthesize a compound where 10 percent of the isocyanate on the isocyanate resin is reacted with a silane-functional group, such as aminopropyl trimethoxysilane, with the balance of the isocyanates reacted with glycidol. In the examples, these compositions are referred to as BGC10% Si, BGC15% Si, BGC33% Si, etc., to indicate the differing amounts of silane present in the composition.

Accordingly, an embodiment of this invention is directed towards a composition comprising the silane-functional epoxy urethane compound; in particular, a composition where silane-functional $-NH-(CH_2)_n-Si(OR^2)_3$ groups are present in the composition in an amount ranging from about 2 mole % to about 50 mole %, preferably about 5 to about 40 mole %, and most preferably about 10 to about 33 mole %.

The invention also relates to a method of preparing a silane-modified hybrid coating composition, comprising: (a) reacting an isocyanate resin with an amine-terminated silane to produce a silane-modified isocyanate resin; (b) reacting the silane-modified isocyanate resin with glycidol to produce a silane-modified glycidyl carbamate resin; and (c) reacting the silane-modified glycidyl carbamate resin with at least one sol gel precursor and/or at least one amine crosslinker, to produce a silane-modified hybrid coating composition. The amine-terminated silane is preferably 3-aminopropyl trimethoxysilane.

The invention also relates to a method of preparing a hybrid coating composition, comprising: (a) reacting an isocyanate resin with glycidol to form a glycidyl carbamate resin; and (b) mixing the glycidyl carbamate resin with at least one sol gel precursor and/or at least one amine crosslinker, to produce a hybrid coating composition.

Either of these methods may further comprise the step of moisture curing and/or oven curing the hybrid coating. Moisture curing advantageously creates an Si—O—Si network in the silane-modified hybrid coating.

A related aspect to the coating composition, discussed above, the invention also relates to hybrid sol gel precursor coating systems comprising an epoxy-functional binder having carbamate functionality such as a glycidyl carbamate (GC) resin, at least one sol gel precursor, and at least one amine crosslinker. In a preferred embodiment, the invention relates to the preparation of hybrid coating systems from a glycidyl carbamate (GC) resin, sol gel precursors 3-aminopropyl trimethoxysilane (APTMS) and tetraethyl orthosilicate (TEOS), and different amine crosslinkers. The sol gel precursor(s) and the amine crosslinker(s) may be pre-blended before mixing with the GC resin.

The hybrid sol gel precursor coating formulations are capable of moisture cure and self crosslinking. Preferred coatings compositions described here include two sol gel precursors such as APTMS and TEOS. Coating formulations described herein can be moisture cured at ambient condition in the presence of atmospheric moisture for several days or partially heat cured in an oven at 80° C. and then moisture cured to reduce the overall cure time. In other words, the overall cure time for good film performance depends on the cure conditions such as percent humidity and temperature in the atmosphere.

The coating composition of the invention is applicable for use in a wide variety of coating compositions and applications, such as primers, basecoats, clearcoats, two-component systems, anti-chip coating compositions, water borne coatings, solvent borne coatings, coatings for flexible substrates, powder coatings, solventless powder-slurry coatings, solventless liquid coatings, and the like. Furthermore, the aqueous coating composition of the invention may be applied to any substrates, e.g., metal, wood, glass, stone, ceramic materials, concrete, rigid and flexible synthetic resins, textiles, leather and paper. Thus, an embodiment of the invention is directed to a method of coating a substrate, comprising the step of applying the coating composition to any of the above-listed substrates. Preferably, the substrate is a metal substrate, such as an aluminum substrate.

EXAMPLES

Materials

Glycidol was procured from Dixie Chemical (Houston, Tex.) and stored in a refrigerator until the reaction was carried out. Tolonate® HDT and Tolonate HDB-LV were supplied by Rhodia Inc. Tolonate® HDT is a solvent-free medium viscosity aliphatic polyisocyanate (HDI homopolymer; isocyanurate; NCO equivalent weight of 191 g/equiv.) of HDI. Tolonate HDB-LV is 100% solvent free, non-volatile and low viscosity aliphatic polyisocyanate (HDI biuret; NCO equivalent weight of 179 g/equiv.). 3-Aminopropyl trimethoxysilane (APTMS), tetraethyl orthosilicate (TEOS), dibutyltin dilaurate (DBTDL), methyl ethyl ketone (MEK), ethyl 3-ethoxypropionate (EEP; Mfd by Eastman Chemical Company), tetraethoxyorthosilicate, and 4 Å molecular sieves were purchased from Aldrich (Milwaukee, Wis.). N-(2-aminoethyl)3-aminopropyl trimethoxysilane (AEAPTMS) was obtained from Gelest Inc (Morrisville, Pa.). Crosslinkers such as Amicure PACM, Ancamide 2050 and Ancamide 2353 were obtained from Air Products and Chemicals, Inc. (Allentown, Pa.). Used Jeffamine D-400 (polyoxypropylene diamine) is the products of Huntsman (Jefferson Chemicals, Conroe, Tex.). Epicure 3164, a product of Hexion, was obtained from Miller-Stephenson Chemical Company, Inc (Connecticut, USA). t-butyl acetate (TBA) was supplied by Ashland Distribution Co (Columbus, Ohio). TBA, EEP and MEK were freed from moisture using 4 Å molecular sieves (Aldrich) before use.

Measurements

A Nicolet MAGNA-IR 850 Series II FTIR spectrometer was used to study the chemical changes taking place during cure of the coatings. Samples were cast over KBr windows and FTIR spectra between 4000 and 400 cm$^{-1}$ with resolution of 4 cm$^{-1}$ were recorded at room temperature. Sample thickness was regulated in order to obey Lambert-Beer law. A total of 128 interferograms were signal averaged during each FTIR scan. The analysis and peak deconvolution of C=O band was performed on Origin 6.0 software considering peaks as Gaussian with the number of iterations required to get the best fit peaks.

Thermal stability was evaluated using TGAQ500 thermal system from TA instruments. Film samples of 10-20 mg were placed in the sample pan and heated from 25 to 800° C. under $N_2$ (flow rate: 40 mL/min.) at an applied heating rate of 10° C./min. During the heating period, the weight loss and temperature difference were recorded as a function of temperature. The isothermal experiments of the hybrid coatings were carried out at 180, 200, 220, 240 and 260° C. for 180 min.

Calorimetric measurements were performed using a DSC Q1000 instrument from TA instruments. Samples were placed in sealed aluminum pans and initially heated at a heating rate of 10° C./min from −75 to 200° C. in $N_2$ atmosphere (flow rate: 50 mL/min.); then the samples were quenched immediately from 200 to −75° C. to remove the previous thermal history. Then the samples were subsequently rescanned at a heating rate of 10° C./min from −70 to 250° C. The instrument was calibrated with indium standard before the measurements. From these thermograms, the glass-transition temperatures ($T_g$s) were determined.

Atomic force microscopy (AFM) used in the present study was a Dimension 3100® microscope with Nanoscope IIIa controller (Digital Instruments, Inc., California). Experiments were performed in tapping mode at laboratory conditions using silicon probes with spring constant 0.1-0.4 N/m and resonant frequency 17-24 kHz. The setpoint ratio was 0.9. A sample area of 100×100 μm$^2$ was scanned. Nanoscope 5.12r5 software was used for image analysis of the AFM images.

Konig pendulum hardness (ASTM D 4366) of the cured films cast on Al 2024 was performed with a BYK-Gardner pendulum hardness tester and the values are reported in sec. Reported values of hardness are the average of three measurements.

The crosshatch adhesion test (ASTM D 3359-87) was carried out to evaluate the adhesion strength between the interface of sol-gel derived composite coatings and Al 2024 substrate. In this test, the number '5' represents maximum adhesion i.e., when no part of the coating in the tested area are delaminated or peeled off and the number '0' represents very poor adhesion i.e., when the maximum part of the attached area delaminate from the substrate during the test [17].

Water contact angle values at room temperature were determined using a dynamic contact angle analyzer FTÅ125 (First Ten Ångstroms, Portsmouth, Va., USA). FTÅ125 uses a computer-controlled video-captured image of a deionized water drop on 1 cm samples cut from the aluminum panels. For each type of coatings, three contact angle measurements were made and their mean was calculated.

Solvent resistance was evaluated using the methyl ethyl ketone (MEK) double rub test.

The impact resistance of the hybrid coatings was assessed by a falling weight (ASTM D-2794 for reverse impact). The maximum drop height in impact test was 43 in. with a drop weight of 4 lb.

The molecular weights of BGC, BGC10% Si and BGC15% Si were determined using a Waters 2410 GPC equipped with a refractive index detector. Synthesized resins were dissolved in THF at about 0.1 g/10 mL and the experiment was carried out at 1.0 mL/min flow rate with THF as the mobile phase.

NMR studies of GC, BGC10% Si and BGC15% Si were carried out on a JEOL-ECA (400 MHz) NMR spectrometer with an autosampler accessory at different temperatures. A 20 mg sample was dissolved in $CDCl_3$ for $^1H$ NMR and $^{13}C$ NMR study. The data were processed using Delta software package.

Example 1

Synthesis of Glycidyl Carbamate Resin and Coating Formulation

The required amount of Tolonate® HDT was weighed in a reaction kettle. The kettle was equipped with a mechanical stirrer, addition funnel and thermocouple to record the temperature. Heating was started and the addition of glycidol started around 35-40° C. Reaction was continued between 45-55° C. using DBTDL as catalyst. The reaction was periodically monitored by checking the NCO peak using FTIR spectroscopy and stopped when the NCO peak at 2270 $cm^{-1}$ disappeared (Step I; Scheme 1). The synthesized isocyanurate glycidyl carbamate (IGC) resin was used to prepare hybrid coatings from the reaction of the epoxy group in IGC and amine group in APTMS (Step II; Scheme 1), AEAPTMS or PACM. In step III, the silane terminated resin was moisture cured at laboratory temperature and humidity to form the crosslinked Si—O—Si network. Similarly, biuret glycidyl carbamate (BGC) resin was synthesized from Tolonate HDB-LV and glycidol. Later on BGC resin was reacted with different concentration of APTMS and PACM. Finally, silane terminated BGC resins were moisture cured. Table 1-1 represents the chemical composition, equivalent ratio as well as the sample nomenclature of the hybrid coatings prepared. Thin films of 4 mils wet thickness were cast on glass and sanded Al 2024 panels using a draw-down bar with the gap of 8 mils at ambient condition. Al 2024 panels were hand sanded using initially 220 paper, later on with 600 paper and finally cleaned properly with acetone before use.

Results and Discussion of Example 1

In this example, organic-inorganic hybrid coatings from GC functional oligomers and amino-functional trimethoxysilanes were prepared by a systematic three-step reaction process. Initially, glycidyl carbamate functional oligomer IGC and BGC were synthesized from the reaction of HDT with glycidol and HDB with glycidol, respectively. Later on, terminal epoxy groups of glycidyl carbamates IGC and BGC were mixed with $NH_2$-terminated trimethoxysilane and PACM at different stoichiometric ratios under laboratory environmental conditions and thus the organic-inorganic hybrid networks were formed. The formation of the Si—O—Si network takes place by a moisture curing reaction. During the casting of films the reaction between the amine group of silane and epoxy group of GC resin takes place. In principle each active hydrogen in the amine group of the crosslinker is capable of opening and linking to one epoxy group. The nitrogen of the amine enters into the organic network and the branching of the network depends on the number of —$NH_2$ and —NH— groups in the amine molecule. This reaction produces alkoxysilane terminated GC resin and the cure of such system takes place by the diffusion of atmospheric moisture and methanol evaporation. The nucleophilic attack of moisture generates Si—OH groups. The formed Si—OH group act as a nucleophile and the lone pair on oxygen attacks the neighboring alkoxysilane moiety to form Si—O—Si three dimensional networks. Since the amines are basic, they also catalyze the condensation of silanol groups to form the silica network. Therefore, the complete process by which the final inorganic silica phase develops has three steps: (1) the hydrolysis of the alkoxide groups of amine terminated silanes to form silanols, (2) the condensation of the previously formed silanols into silica, and (3) the aggregation of partially condensed silica macromolecules to build up the network. In the presence of PACM, an additional crosslinking reaction also takes place during the course of curing; the nucleophilic attack of the amine in PACM to the epoxy group and formation of —OH groups. The —OH groups formed may further initiate crosslinking from nucleophilic attack with an alkoxysilane group or an epoxy group. As the crosslinking reaction progresses, the size of inorganic silica domains increases and the interaction parameters between the inorganic and organic network formers change. Such changes lead to a transition from an initially homogeneous state into a microphase separated state and the phase morphology is governed by the composition, cure speed and the rate of methanol formation during cure. The final properties of the hybrid nanocomposites depend on the relative amounts and on the morphology of the two component phases in the hybrid coatings, and on the interaction between them.

The formation of the hybrid network is therefore a complicated chemical process and, in particular, the network structure is expected to be determined by the relative rates of formation of the organic and inorganic parts and the linkages between them. Therefore, it should be understood how the changes in structural features during cure and changes in the amount of inorganic network former affect the overall macroscopic properties such as hydrogen bonding association, $T_g$, thermal stability and mechanical properties.

In order to understand the effect of APTMS content on the properties of hybrid coatings prepared from IGC resin, different amount of APTMS crosslinker was used and coatings were prepared by varying the epoxy:amine ratio. The prepared samples were named as F-1 to F-4, where epoxy (IGC): amine (APTMS) ratio increased from 1 to 2 in the series. The effect of different amount of APTMS and PACM crosslinkers in IGC based coatings were analyzed using samples F-5 to F-7, where the equivalent weight ratio of epoxy (IGC):amine (APTMS):amine (PACM) was varied. Similarly, samples F-8 to F-10 were prepared from BGC resin and APTMS at different epoxy (BGC):amine (APTMS) ratio. F-8 to F-10 were characterized to understand the effect of APTMS on BGC based coatings. Samples F-11 to F-13 were prepared by replacing IGC resin in F-5 to F-7 with BGC resin. To study the effect of AEAPTMS content on the properties of IGC based coatings, samples F-14 to F-16 were prepared at different epoxy (IGC resin):amine (AEAPTMS) equivalent weight ratio. In sample F-17, AEAPTMS and PACM was used to study their effect on the coating properties.

FTIR Analysis

FTIR spectroscopy is widely used for characterization of polymers because of its sensitivity to minor variations in polymer structure. In addition, the technique is rapid and nondestructive. Representative FTIR spectra of F-1 (APTMS crosslinked IGC resin with epoxy:amine of 1:1) as a function of cure time is shown in FIG. 1-1. The condensation reaction of the inorganic moiety results in changes in the spectra. A strong absorption band in the range 1000-1200 $cm^{-1}$ is observed in the hybrid and is ascribed to asymmetric stretching vibrations of the Si—O—Si bonds of the silica component. The absorption peak at 1025-1030 $cm^{-1}$ belongs to extending vibration of Si—O—Si. Increasing intensity of this peak shows that the Si—O—Si network is forming with cure time. The other characteristic silica network absorptions at 805 and 445-473 $cm^{-1}$ correspond to the symmetric stretching and bending modes, respectively. Bands at 2937, 2879 and 1190 $cm^{-1}$ correspond to the —$CH_2$— anti-symmetric stretching ($v_aCH_2$), symmetric stretching ($v_sCH_2$) and Si—$CH_2$ stretching vibrations, respectively. The absence of absorbance peak in between 945-970 $cm^{-1}$ for the fully cured sample shows that unreacted silanol groups are absent. The decreasing intensity of the peak at 913 $cm^{-1}$ with cure time shows that the epoxide ring opening reaction from the nucleophilic attack of amino-terminated APTMS to the epoxy groups of IGC resin is taking place during cure. The principal amide absorption bands are classified as: (i) amide I: occurs in the range 1600-1800 $cm^{-1}$ and involves C=O stretching vibration; (ii) amide occurs in the range 1420-1570 $cm^{-1}$ and corresponds to coupling between N—H bending and C—N stretching vibrations; (iii) amide III: occurs in the range 1210-1370 $cm^{-1}$ and contains a large percentage of N—H bending and CN stretching; (iv) amide IV-amide VII: observed at frequencies below 800 $cm^{-1}$ and corresponds to out-of-plane vibrations of the CONH group; (v) amide A and amide B: observed in the high-frequency region between 3000-3600 $cm^{-1}$, arising from a Fermi resonance between N—H stretching and the amide I overtone. Amide A and amide B bands are observed as overlapped with the O—H stretching band, which is believed to be due to the formation of Si—OH during network maturation. Amide III and IV are very complex bands resulting from a mixture of several coordinate displacements. Therefore these bands are only of limited use for the extraction of structural information. The out-of-plane motions are found in amide V, VI and VIII.

The carbonyl stretching vibrations (vC=O) in between 1600-1800 $cm^{-1}$ is composed of free (~1730 $cm^{-1}$) and hydrogen bonded carbonyls (~1690 $cm^{-1}$). Hydrogen bonding interaction reduces the C=O bond strength and results a shift in C=O band stretching frequency to a lower wavenumber region. In order to determine the relative contribution of the different C=O bands to the total carbonyl area and to quantify the extension of the self association through hydrogen bonding of the studied hybrid coating (F-1) with cure time, the C=O stretching vibration region was resolved into two individual components using a curve fitting procedure. Curve fitting is useful for determining the peak positions, widths, heights, and areas of a set of overlapping peaks. The concept of deconvolution is applied when a number of closely associated peaks merge in the FTIR spectrum. The peak separation with deconvolution produces narrow bands characteristic of different secondary structures. Therefore, the overlapped bands within the amide I envelope can be distinguished. The curve fitting procedure was applied to estimate quantitatively the area of each component representing a free and associated C=O structure. In this respect, the second derivative of the FTIR spectra within the zone (i.e., 1600-1800 $cm^{-1}$) was used to identify the exact peak location of free and bonded C=O occurring in the hybrid coatings. Curve fitting is an iterative process and was performed several times to achieve good results. The deconvoluted spectrum of F-1 with two different cure times is shown at the top of FIG. 1-1. The deconvolution process suggests that the hydrogen bonding association within the carbamate groups increases with the cure time.

Thermal Stability

Figures 1, 2:
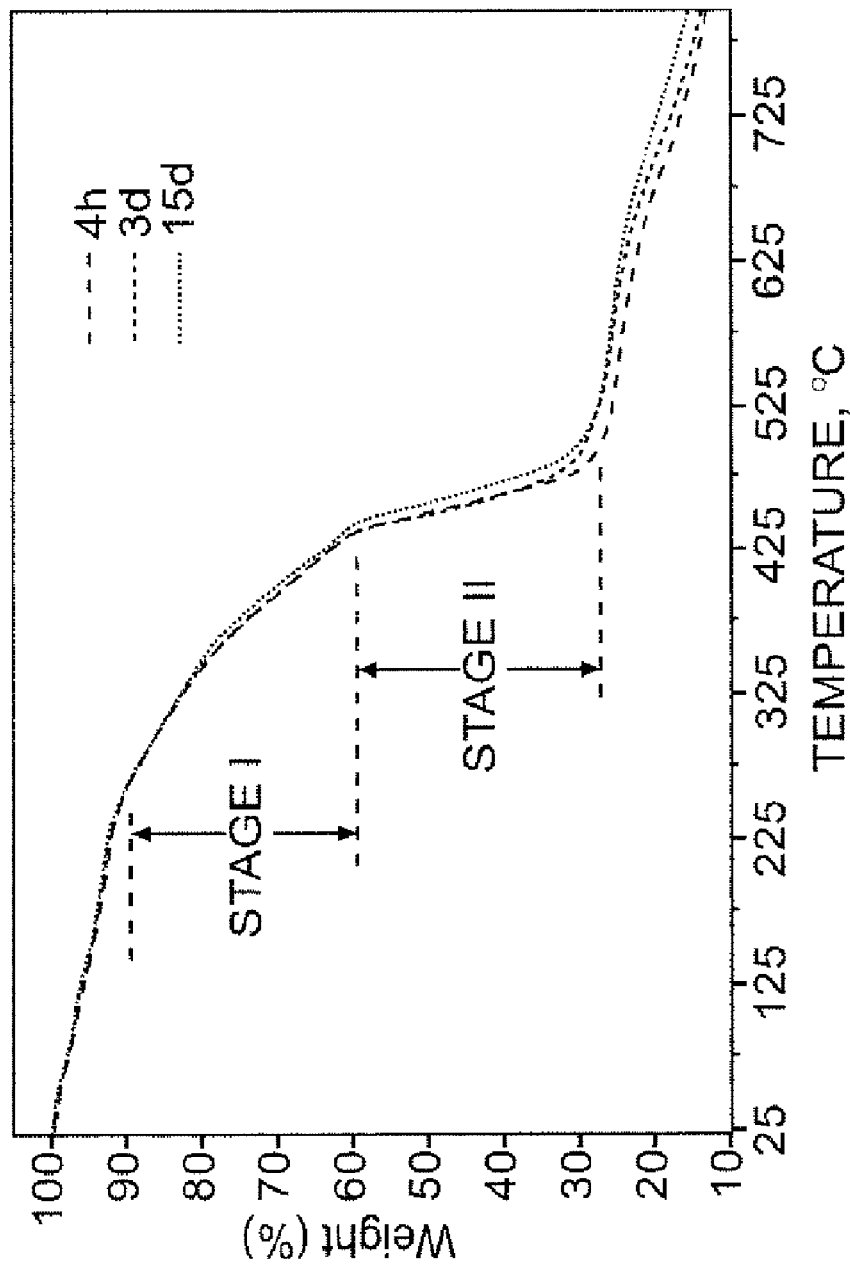

The thermal stability of the hybrid composite coatings has been studied using the standard thermal analysis technique, TGA. TGA traces of the cured hybrid coatings provide information about their thermal stability and thermal degradation behavior. FIG. 1-2 shows the TGA thermograms in nitrogen atmosphere of the hybrid coating F-2 as a function of cure time. Thermal degradation of coating F-2 exhibits a two-stage process with increasing thermal stability during cure. Below 225° C., there is a small weight change, corresponding to the evaporation of solvent and further condensation of silica. Similarly, the thermal stability of other samples increases with cure time. FIGS. 1-3(a) and 1-3(b) shows the increase in thermal stability with cure time of F-5 and F-7, respectively. FIG. 1-4 shows the increase in thermal stability of F-8 (prepared from BGC resin) with cure time. A close comparison of the TGA thermograms of hybrid coatings prepared from IGC and BGC resins shows that: (1) both of these hybrid coating shows a two step decomposition profile and (2) BGC based hybrid coatings show a steep fall with a high slope as the first step in the decomposition profile.

The characteristic thermal decomposition temperatures of all of the completely cured hybrid coatings are reported in Table 1-2. The values of $T_{1on}$ (initial decomposition temperature for the first step of decomposition), $T_{2on}$ (initial decomposition temperature for the second step of decomposition), $T_{1max}$ (temperature of maximum rate of weight loss for the first step), $T_{2max}$ (temperature of maximum rate of weight loss for the second step), $T_{en}$ (final decomposition temperature) and percentage weight remaining at 200° C. are shown. The temperatures at the maximum weight loss rate ($T_{1max}$ and $T_{2max}$) were taken from the peak values of the DTGA thermograms. Thermal decomposition data of different systems suggests that the synthesized hybrid coatings are sufficiently stable with weight loss of less than 10 wt percent at 200° C. The onset decomposition temperatures ($T_{1on}$) of all the studied system were higher than 250° C.

FIG. 1-5 shows the TGA thermograms of heat cured samples F-1H, F-12H and F-13H. The $T_{1on}$, $T_{2on}$, $T_{en}$ and % wt loss values at 200° C. of F-11H, F-12H and F-13H were 268.2, 463.4, 515.6° C. and 8 wt %; 265.3, 460.6, 508.0 and 9.5 wt %; and 262.5, 453.0, 502.3 and 11 wt %, respectively. The characteristic thermal decomposition values of F-11H, F-12H and F-13H as well as FIG. 1-5 show that thermal stability improves with increasing amount of the inorganic network former APTMS. This could be due to the fact that a higher amount of inorganic precursor formed stable three dimensional Si—O—Si networks (bond dissociation energy of Si—O bond is higher than that of C—C and C—O bonds) and increased the characteristic decomposition temperatures of the sample. Additionally, the formed silica network induces a protective barrier against thermal decomposition for organic species.

The isothermal TGA curves in nitrogen of F-1 at 180, 200, 220, 240 and 260° C. are shown in FIG. 1-6. The weight loss of F-1 after evaluating isothermally at 180° C. for 180 min was around 8 percent, suggesting sufficient stability of the hybrid coatings at the evaluating condition. The hybrid materials also showed a higher char content (or reduced weight loss) at 625° C. as APTEMS content increased.

DSC Analysis

DSC is a thermal analysis method that is widely used to study the glass transition temperature and enthalpy of different transitions in polymer materials. In this example, $T_g$s were determined as the midpoint of the transition of the second scan. FIG. 1-7 shows the DSC profile of cured sample F-1 using two different methods in $N_2$ atmosphere. When the sample was heated to 150° C. @10° C. min$^{-1}$ and rescanned after cooling, the $T_g$ was 77° C.; whereas a second scanning of the same sample after quenching from 200° C. gives the $T_g$ values of 94.0° C. (200° C. was reached using the heating rate of 10° C. min$^{-1}$). This could be due to a combination of several factors such as (a) loss of residual solvents, (d) further crosslinking in the extra heating period, (d) some extent of sample degradation at 200° C., etc. Additionally, the first scan of the samples showed a broad endothermic transition in between 40-200° C., possibly due to the factors such as: (1) breakdown of hydrogen bonding and other weak London forces, and (2) loss of residual solvent if any in the sample. This transition was not complete in the method Log I and hence enthalpy values of such transition is difficult to estimate. Therefore, in order to quantitatively calculate the $\Delta H$ values of such transition and to understand the variation of $\Delta H$ with cure time, method Log II was optimized. The reported $T_g$ values in Table 1-3 of the different hybrid coatings are based on the evaluation using method Log II. The $T_g$ values of IGC based coatings F-1, F-2, F-3 and F-4 were 94.0, 92.7, 88.5 and 86.2° C., respectively suggesting that with increasing APTMS content $T_g$ increases. A similar phenomenon was observed for BGC based coatings F-8, F-9 and F-10 with a high $T_g$ for F-8 and a low $T_g$ in the series for F-10. For AEAPTMS based coatings also in the series F-14, F-15 and F-16, an increasing $T_g$ with increasing inorganic network former was observed. This phenomenon could be due to the restriction of chain motion in view of the formation of larger size inorganic domains with the increase in the content of the sol-gel precursor. FIG. 1-8 shows the DSC thermograms of F-11, F-12 and F-13, where both APTMS and PACM were used to crosslink the BGC resin. In these coatings, an increasing in $T_g$ values was observed with increasing APTMS content. A comparison of the $T_g$ values among IGC and BGC based hybrid coatings prepared from APTMS crosslinker shows that IGC based composites possess a higher $T_g$. For instance, the $T_g$ values of F-1 (94° C.)>F-8 (89.6° C.), F2 (92.7° C.)>F-9 (89.4° C.) and F-3 (88.5° C.)>F-10 (85.6° C.) could be attributed to the presence of the isocyanurate ring structure in the IGC resin. However, a similar trend of a higher $T_g$ for IGC based coatings prepared from APTMS and PACM crosslinker in comparison to the corresponding BGC based coatings was not observed. This could be due to the complication in crosslinking mechanism, phase separation, alteration of hydrogen bonding and inorganic domain structure with the addition of an additional crosslinker PACM. A comparison of $T_g$ values between F-4 (86.2° C.) and F-6 (89.9° C.), F-10 (85.6° C.) and F-11 (101° C.) as well as between F-16 (90.6° C.) and F-17 (92.9° C.) suggests that the PACM could have helped to increase the crosslink density of the film and resulted in an increasing $T_g$. The DSC thermograms of different hybrid coatings showed a broad endothermic peak in the range 25 and 200° C. The broadness of the peak is associated with the non-crystalline nature of the sample. Representative DSC thermograms with cure time of sample F-4 is shown in FIG. 1-9. FIG. 1-9 shows that increasing cure time from 1 d 4 h to 10 d 12 h has resulted an increase in the transition enthalpy ($\Delta H$) from 126.9 Jg$^{-1}$ to 167.4 Jg$^{-1}$. This phenomenon is believed to be due to the increased association of polar groups such as carbamate linkage through hydrogen bonding with increasing cure time. Such association produces increasing intra- and inter-molecular attraction and hence a progressively increasing amount of thermal energy is needed during the course of cure to overcome the energy barrier in the thermal transition. However, for different hybrid coatings, a systematic increase in the transition enthalpy during the cure was not observed. The fact may be attributed to the decrease in the crystallinity and reduction of molecular mobility as a result of imposing restriction on the ordering phenomenon through hydrogen bonding inside the polymer due to increase in the crosslinking density. During this curing period little or no change in $T_g$ values was observed.

Mechanical Properties

The Konig pendulum hardness test was performed on the Al 2024 supported coatings and the results are tabulated in Table 1-3. The results suggest that hardness values increase with increasing inorganic network former concentration. For instance, the hardness values of F-1, F-2, F-3 and F-4 were 155, 151.3, 151 and 142.6 sec, respectively. Similarly for other systems an increasing surface hardness with increasing alkoxysilane content was observed. Therefore, the incorporation of increased amount of inorganic network former in the present sol-gel system effectively increases the surface hardness. The increase in hardness for the GC-silane hybrid system can be explained by increasing network density, caused by silica cluster formation around the endgroups of the GC resin. The adhesion test was determined on acetone cleaned Al 2024 panels and sanded Al 2024 panels and observed that the adhesion was considerably enhanced from 0 to 4 from untreated Al 2024 to sanded Al 2024 panels. This phenomenon can be attributed to the increased surface bonding in view of the increased effective surface area in the sanded Al 2024 panels. The increasing surface roughness during sanding increases effective surface area of the Al 2024 panel. In Table 1-3, the reported crosshatch adhesion values are for the sanded Al 2024 panels. The MEK double rub resistance of the all the hybrid coatings were higher than 400 suggests that they have very good solvent resistance properties. It was observed that the water contact angles ranged from 59 to 75° for various hybrid coatings prepared using IGC and BGC resin. However, a regular trend of water contact angle with the content of the sol-gel precursor used was not observed.

AFM Analysis

Tapping mode AFM was used for evaluating the polymer surface morphology. FIG. 1-10 shows tapping mode AFM images of the selected hybrid films in air. The tapping mode AFM is known to probe the viscoelastic properties of the surfaces since the tip can slightly penetrate a soft surface in contrast to harder inorganic rich regions. The heterogeneity of the viscoelastic behavior of the material surface with two qualitatively different main areas in the images can be ascribed to regions of lower energy dissipation in the material or bright zones that corresponds to silica-rich region formed by the sol-gel process and the dark areas that corresponds to more inelastic organic part in the hybrid.

Conclusions for Example 1

In this example, different moisture cured organic-inorganic hybrid glycidyl carbamate-silica coatings were successfully prepared using 3-aminopropyl trimethoxysilane and N-(2-aminoethyl)3-aminopropyl trimethoxysilane as sol-gel precursors. The influences of the nature and quantity of silica precursors and organic components on the structural properties of the hybrid coatings were established. FTIR spectra confirmed the formation of Si—O—Si network structure in the hybrid films. The thermal stability of the synthesized hybrid coatings at different curing time and with increasing sol-gel precursor content was evaluated. All the TGA thermograms showed mainly a two step decomposition profile with a small weight loss below 225° C. Thermal stability of the hybrid coatings increased with increasing sol-gel precursor content. DSC was used to study the effect of structural variables on the $T_g$ values. The results suggest that the thermal stability, $T_g$ and mechanical properties of the hybrid coatings depends on the amount of inorganic network former. $T_g$ showed no significant changes with cure time. Konig pendulum hardness values increased with increasing amino silane content. In the adhesion test, all the samples exhibited excellent adhesion on sanded Al 2024 panels. The MEK double rub resistance of all the hybrid coatings were higher than 400. The AFM results reported here suggest that the phase separation behavior and formation of inorganic domains on the surface of the hybrid films.

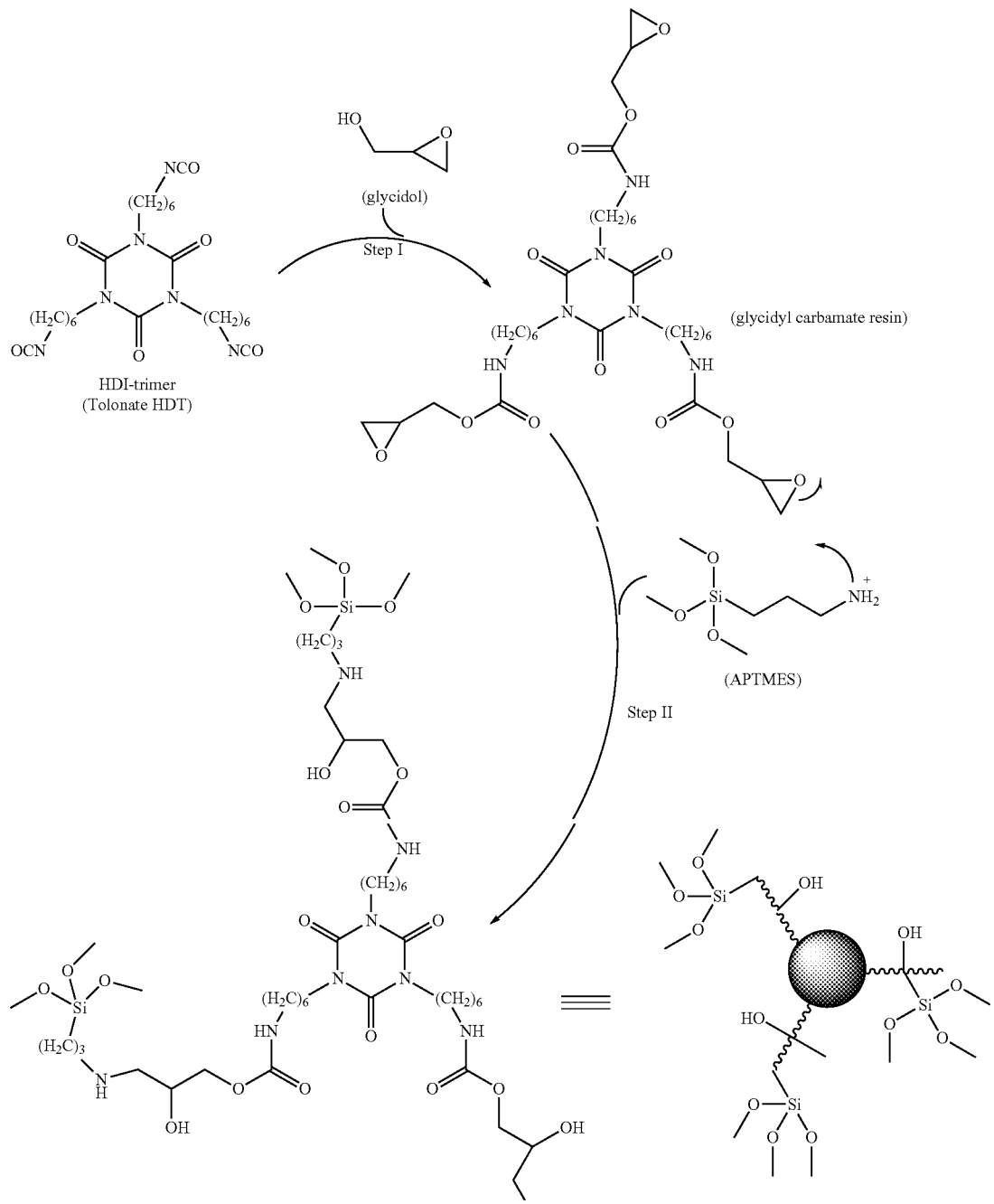

Scheme 1. Schematic diagram of the formation of crosslinked network from isocyanurate glycidyl carbamate resin (IGC) and amine terminated silane (APTMS).

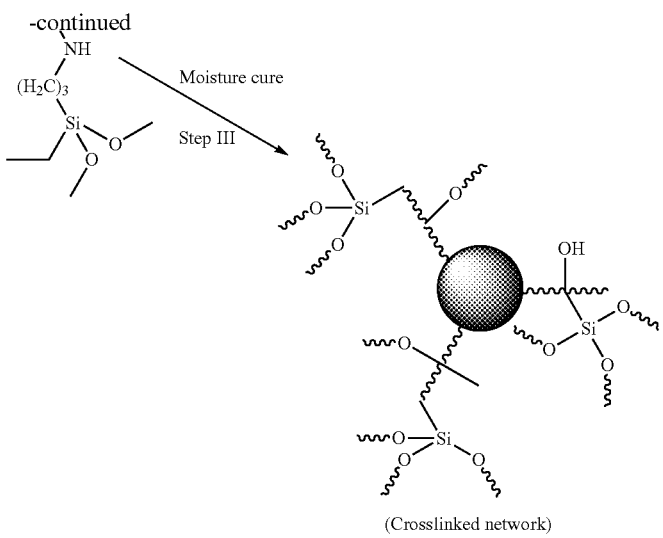

(Crosslinked network)

TABLE 1-1

Reactants used to prepare the hybrid PU coatings and their equivalent ratios.

| Sample name | GC resin | Silane | Cross-linker | epoxy (GC): amine (silane) | epoxy (GC): amine (silane): amine (PACM) |
|---|---|---|---|---|---|
| F-1 | IGC | APTMS | | 3:3 | |
| F-2 | | APTMS | | 3:2.5 | |
| F-3 | | APTMS | | 3:2 | |
| F-4 | | APTMS | | 3:1.5 | |
| F-5 | | APTMS | PACM | | 3:2:1 |
| F-6 | | APTMS | PACM | | 3:1.5:1.5 |
| F-7 | | APTMS | PACM | | 3:1:2 |
| F-8 | BGC | APTMS | | 3:3 | |
| F-9 | | APTMS | | 3:2.5 | |
| F-10 | | APTMS | | 3:2 | |
| F-11 | | APTMS | PACM | | 3:2:1 |
| F-12 | | APTMS | PACM | | 3:1.5:1.5 |
| F-13 | | APTMS | PACM | | 3:1:2 |
| F-14 | IGC | AEAPTMS | | 3:3 | |
| F-15 | | AEAPTMS | | 3:2 | |
| F-16 | | AEAPTMS | | 3:1.5 | |
| F-17 | | AEAPTMS | PACM | | 3:1.5:1.5 |

TABLE 1-2

Characteristic thermal decomposition temperatures of the hybrid coatings.

| Sample | $T_{1on}$ | $T_{1max}$ | $T_{2on}$ | $T_{2max}$ | $T_{en}$ | % weight remaining at 200° C. |
|---|---|---|---|---|---|---|
| F-1 | 262.5 | 403.5 | 446.4 | 471.1 | 503.2 | 92.80 |
| F-2 | 265.5 | 398.5 | 441.8 | 462.1 | 505.2 | 92.58 |
| F-3 | 262.8 | 405.5 | 444.6 | 467.1 | 501.5 | 92.72 |
| F-4 | 266.4 | 408.6 | 447.3 | 463.1 | 505.2 | 92.40 |
| F-5 | 264.6 | 395.5 | 440.9 | 468.1 | 496.0 | 93.91 |
| F-6 | 270.1 | 400.5 | 437.2 | 458.0 | 497.8 | 92.79 |
| F-7 | 268.3 | 400.5 | 431.7 | 454.0 | 498.7 | 91.85 |
| F-8 | 252.7 | 318.8 | 440.9 | 447.9 | 507.9 | 91.00 |
| F-9 | 253.6 | 314.7 | 439.1 | 464.1 | 503.3 | 91.09 |
| F-10 | 250.8 | 320.8 | 439.1 | 463.1 | 507.0 | 91.61 |
| F-11 | 268.2 | 357.3 | 462.0 | 483.5 | 508.0 | 92.00 |
| F-12 | 266.3 | 352.0 | 460.6 | 483.3 | 506.1 | 90.50 |
| F-13 | 264.4 | 351.6 | 456.8 | 481.4 | 504.2 | 88.51 |
| F-14 | 254.5 | 392.4 | 444.6 | 459.0 | 513.4 | 90.54 |
| F-15 | 253.6 | 394.5 | 440.0 | 459.0 | 507.9 | 91.75 |
| F-16 | 252.1 | 396.5 | 439.7 | 458.0 | 497.6 | 91.76 |
| F-17 | 252.7 | 396.4 | 431.9 | 447.2 | 491.6 | 92.52 |

TABLE 1-3

Properties of different hybrid coatings.

| Sample name | Tg (from DSC in ° C.) | Konig pendulum hardness (sec) | Adhesion | MEK double rub | Water contact angle (°) |
|---|---|---|---|---|---|
| F-1 | 94.0 | 155.0 | 4B | >400 | 69.0 |
| F-2 | 92.7 | 151.3 | 4B | >400 | 69.1 |
| F-3 | 88.5 | 151.0 | 4B | >400 | 70.9 |
| F-4 | 86.2 | 142.6 | 4B | >400 | 67.3 |
| F-5 | 95.8 | 140.3 | 4B | >400 | 63.1 |
| F-6 | 89.9 | 137.0 | 4B | >400 | 67.2 |
| F-7 | 77.1 | 124.6 | 4B | >400 | 59.7 |
| F-8 | 89.6 | 138.0 | 4B | >400 | 64.6 |
| F-9 | 89.4 | 129.6 | 4B | >400 | 72.1 |
| F-10 | 85.6 | 128.3 | 4B | >400 | 70.7 |
| F-11 | 101.0 | 135.0 | 4B | >400 | 64.7 |
| F-12 | 99.0 | 114.0 | 4B | >400 | 59.1 |
| F-13 | 96.1 | 99.0 | 4B | >400 | 67.6 |
| F-14 | 102.3 | 159.3 | 4B | >400 | 69.9 |
| F-15 | 93.8 | 160.6 | 4B | >400 | 72.0 |
| F-16 | 90.6 | 151.6 | 4B | >400 | 74.6 |
| F-17 | 92.9 | 146.6 | 4B | >400 | 61.6 |

Example 2

Synthesis of Silane Modified GC Resin

Required amount of Tolonate® HDB-LV was weighed in a reaction kettle. The kettle was equipped with a mechanical stirrer, addition funnel and a thermo-couple to record the temperature inside the bulk of the kettle. At room temperature part of the available NCO groups in HDB was slowly reacted with APTMS (Step I; Scheme 2) and later on the unreacted NCO groups were converted to epoxy end group by the reaction with glycidol at 45-55° C. (Step II; Scheme 2). The reaction in step II was continued until the complete disappearance of NCO peak at 2270 cm$^{-1}$ in the FTIR spectra was observed. Resin were prepared using t-BA and EEP solvents. The synthesized silane modified GC resin was stored in glass bottle.

Formulation of Coatings from Silane Modified GC Resin and Amine Crosslinkers

The synthesized silane modified GC resins were mixed with appropriate amount of different amine crosslinker such as Amicure PACM, Ancamide 805, Ancamide 2050, Ancamide 2353, Epicure 3164, Genamide 2000, Jeffamine D-400 and cast on glass and sanded Al-2024 panels at ambient condition using a draw-down bar with the gap of 8 mils at ambient condition. The epoxy equivalent of modified GC resin and amine equivalent of crosslinker was varied to study their effect. Later on, formulated coatings were kept at laboratory environmental conditions for the network maturation. Table 2-1 represents the chemical composition, equivalent ratio as well as the sample nomenclature of different hybrid coatings prepared from silane modified GC resins.

Results and Discussion of Example 2

In this example, O—I hybrid coatings from silane modified GC resins and different amine crosslinkers were prepared by a systematic three-step reaction process. Initially, 33% and 20% of the available NCO groups in HDB was reacted with APTMS and the unreacted NCO groups of APTMS modified GC resin were capped with epoxy end groups by the reaction with glycidol. The synthesized APTMS modified BGC resins were named as BGC33% Si and BGC20% Si, where 33 and 20 represent 33 and 20% silane modification, respectively. Later on, terminal epoxy groups of silane modified GC resins BGC33% Si and BGC20% Si were mixed with different amine crosslinkers such as PACM, Ancamide-805, Ancamide-2050, Ancamide-2353, Epicure-3164 etc under laboratory environmental conditions and allowed to moisture cure for more than 20 days. Network formation takes place from the two basic reactions: (a) crosslinking of amine group of the crosslinker with the epoxy group of the silane modified GC resin and (b) Si—O—Si bond formation by the atmospheric moisture. Hydrolysis of the methoxy groups connected to the Si atom in silane modified GC resins takes place by the nucleophilic attack of atmospheric moisture and subsequent condensation reaction produces three-dimensional branched silica network with nominal stoichiometry $SiO_{1.5}$. Additionally, during solid state polymerization, grafting between the epoxide network and silica structures also takes place by condensation of silanol groups with the secondary C—OH group formed from the epoxide-amine reaction. The network formation takes place with the liberation of water and methanol molecules. In principle, each active hydrogen in the amine group of the crosslinker is capable of opening and linking to one epoxy group at room temperature. The nitrogen of the amine enters into the organic network and the branching of the network depends on the number of —$NH_2$ and —NH— groups in the amine crosslinker. Matejka et al. described that the presence of an acid catalyst accelerate the hydrolysis of the alkoxysilane moiety and the condensation reaction of the alkoxide is significantly promoted by the presence of a basic catalyst. L. Matejka et al. Polymer (1998) 40:171, herein incorporated by reference in its entirety. The added amine crosslinkers has a relatively high basicity and thus acts as a basic catalyst for the condensation reaction of the silane alkoxide to form the silica network. Formation of such type of hybrid network is a complicated chemical process, where network structure being determined by the relative rates of formation of the organic and inorganic parts and the linkages between them. The nature of chemical interaction between the two phase during sol-gel processing and network growth therefore plays a role for the phase separation process to takes place. Additionally, the chemical structure of a crosslinking agent is also a variable parameter that may favorably affect the coating properties.

Thermal Stability

Figures 1, 2, 3, 3A:
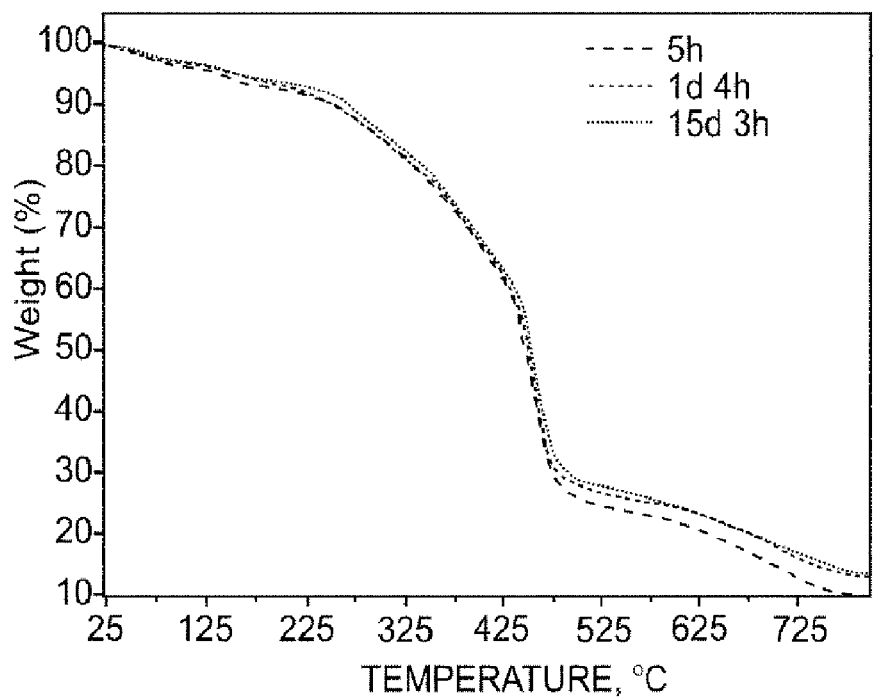
Figures 1, 2, 3, 3B:
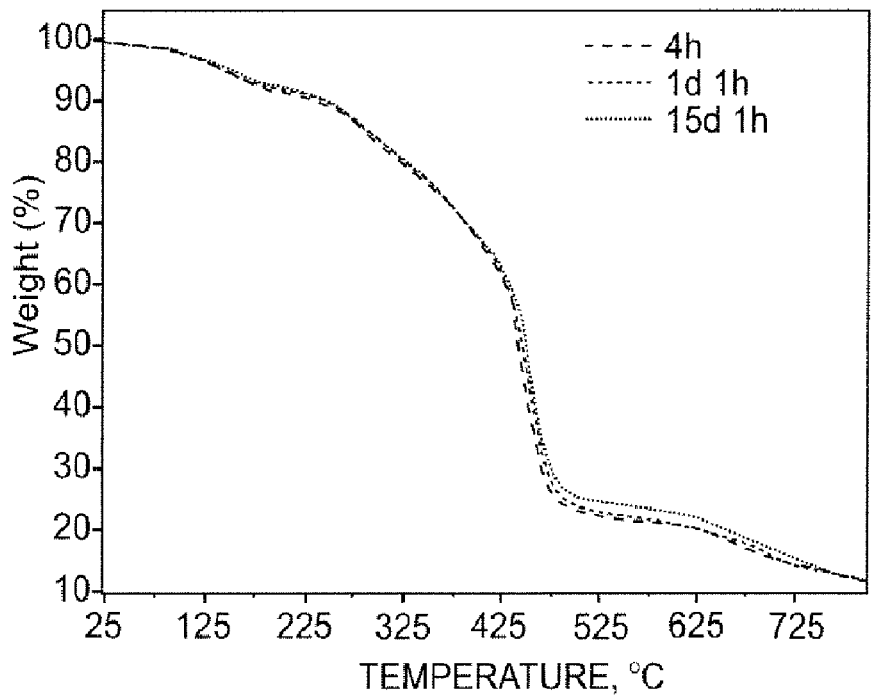
Figures 1, 2, 3, 4:
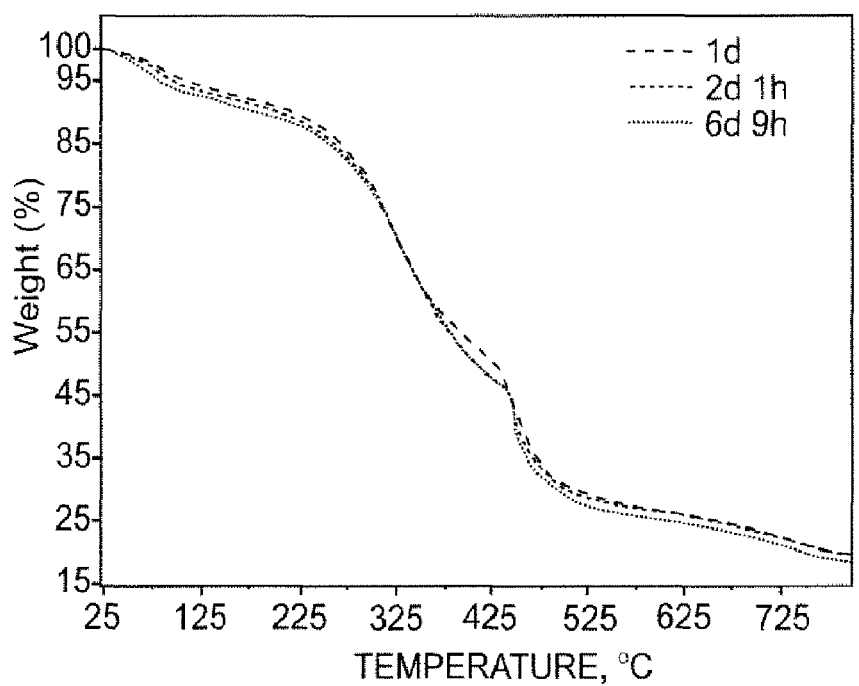
Figures 1A, 2:
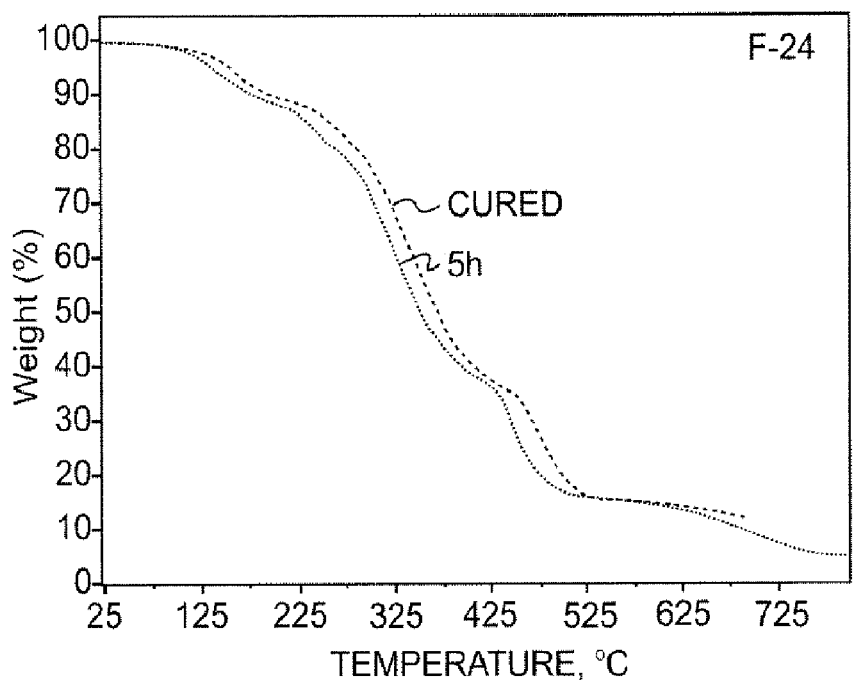
Figures 1B, 2:
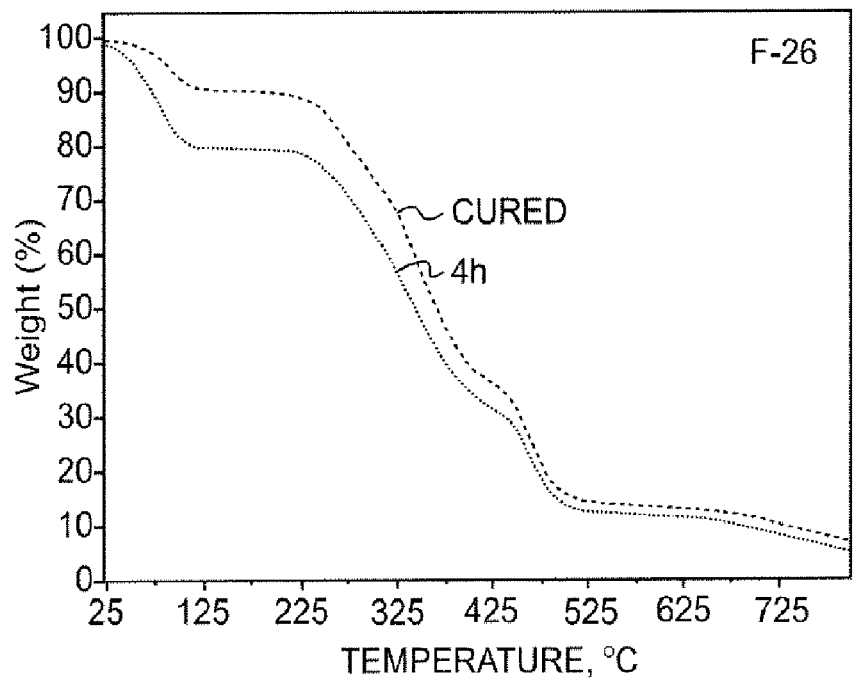
Figures 2, 2A:
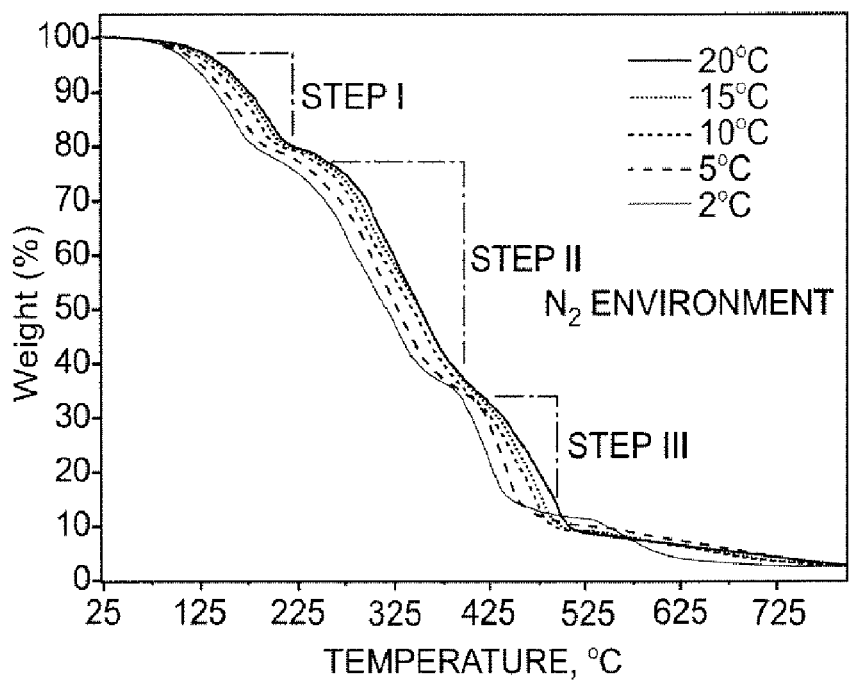
Figures 2, 2B:
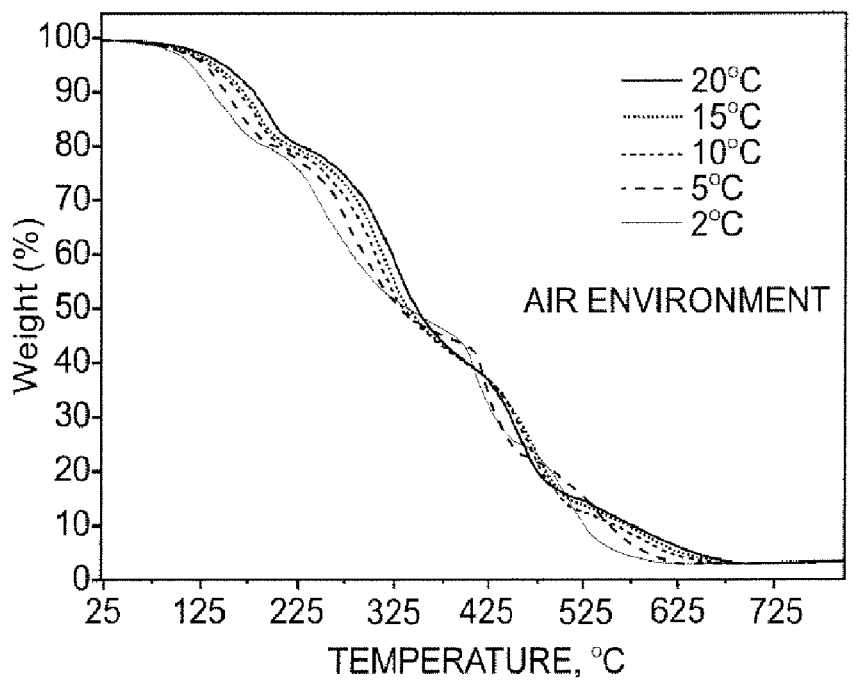
Figures 2, 3, 3A:
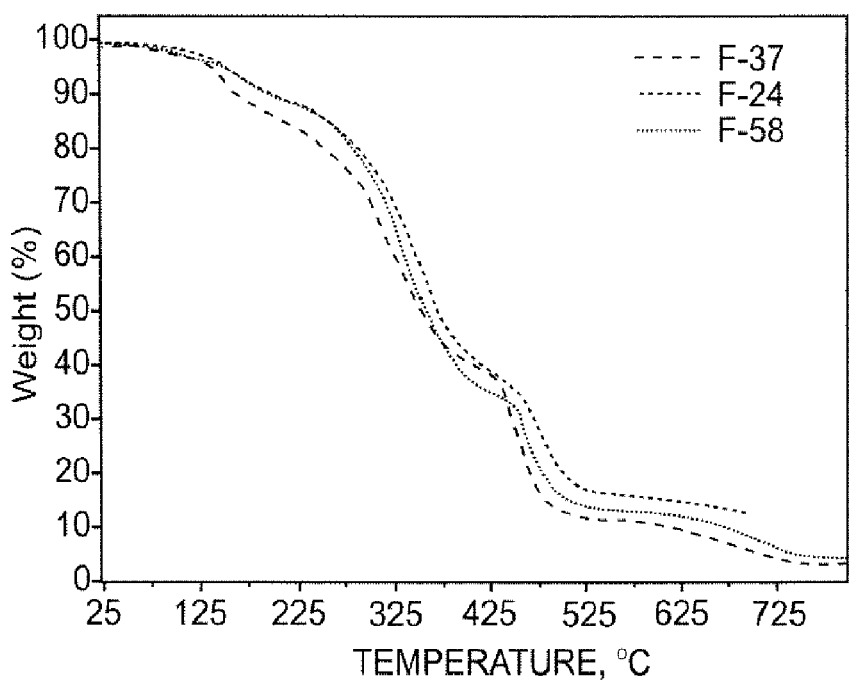
Figures 2, 3, 3B:
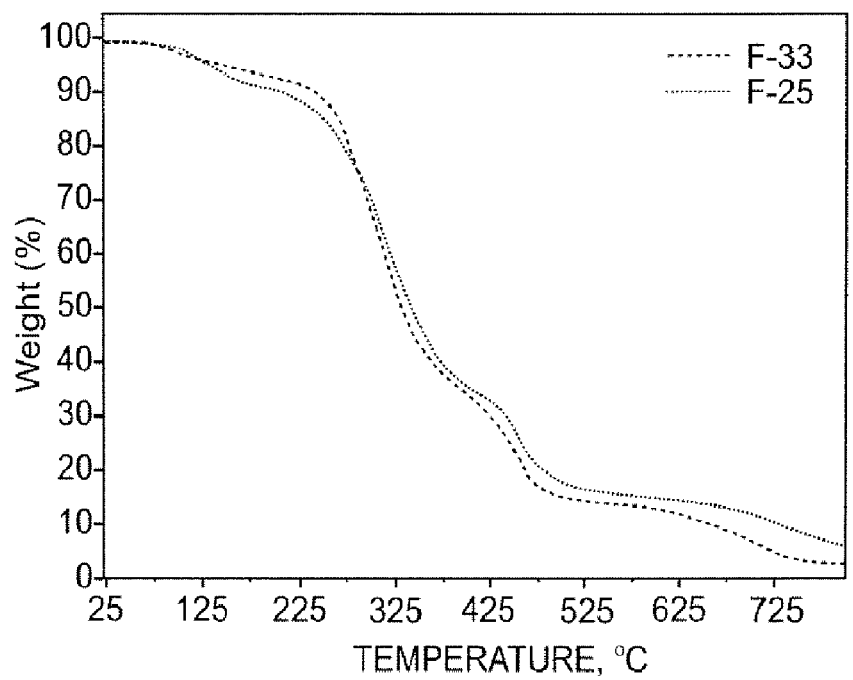
Figures 2, 3, 3C:
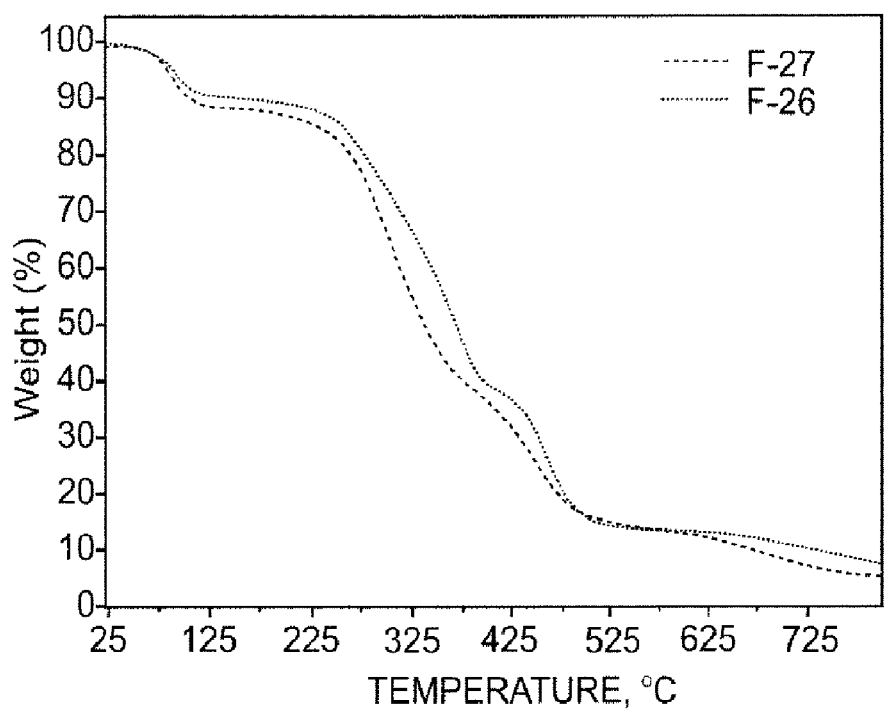
Figures 2, 3, 3D:
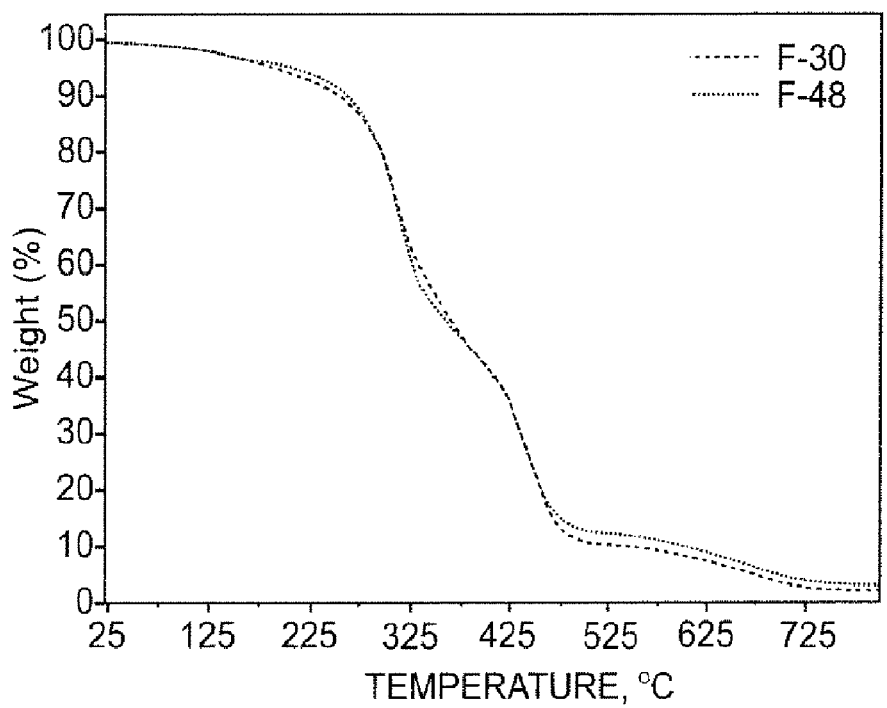
Figures 2, 3, 4:
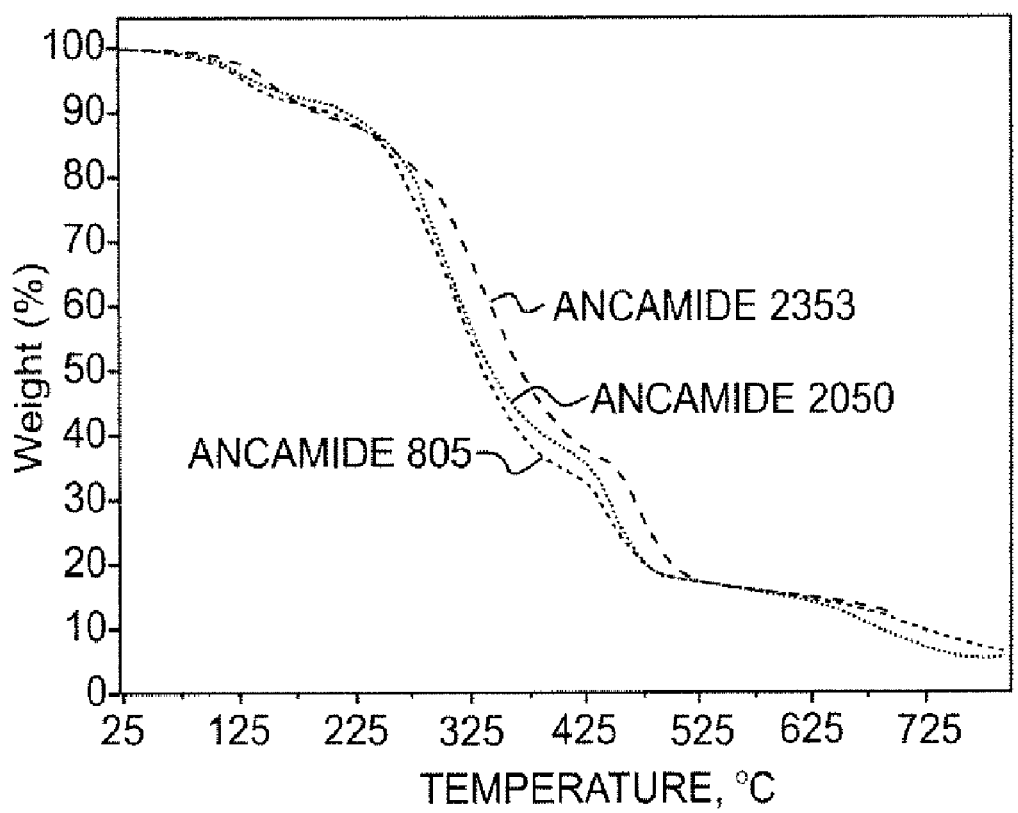
Figures 2, 3, 4, 5, 5A:
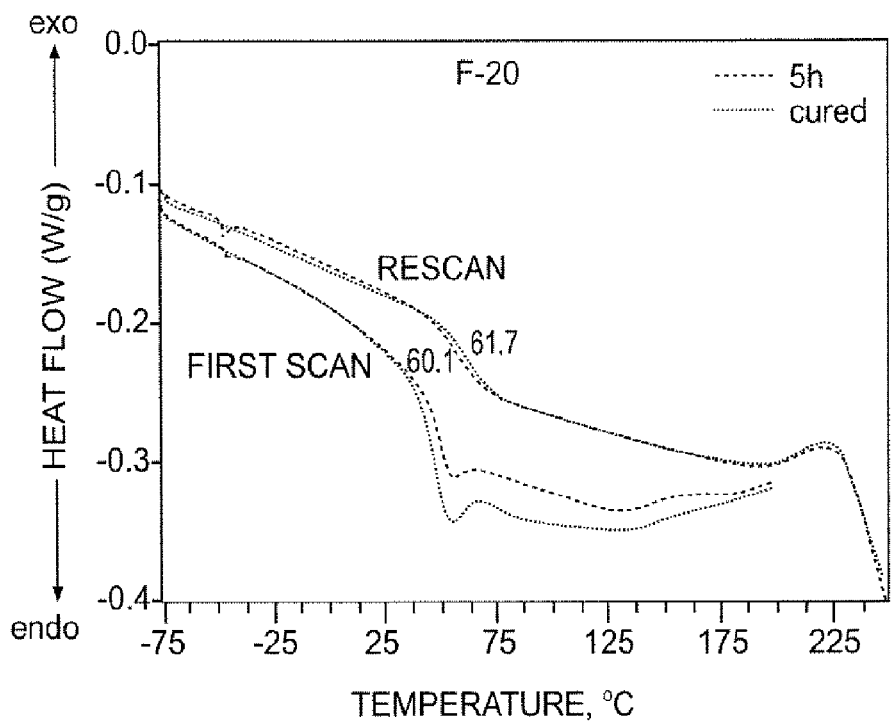
Figures 2, 3, 4, 5, 5B:
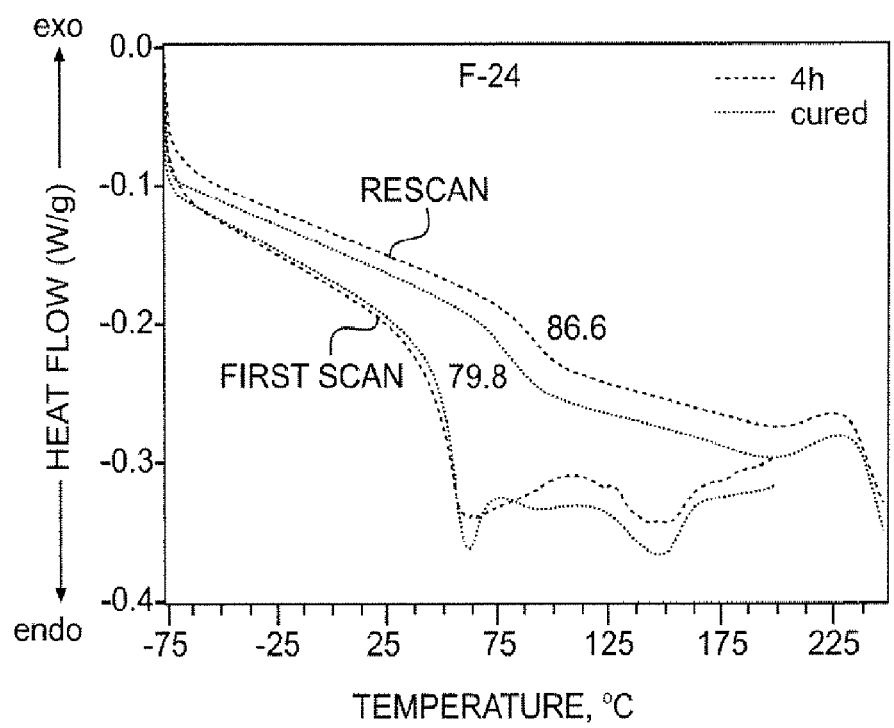
Figures 2, 3, 4, 5, 5C:
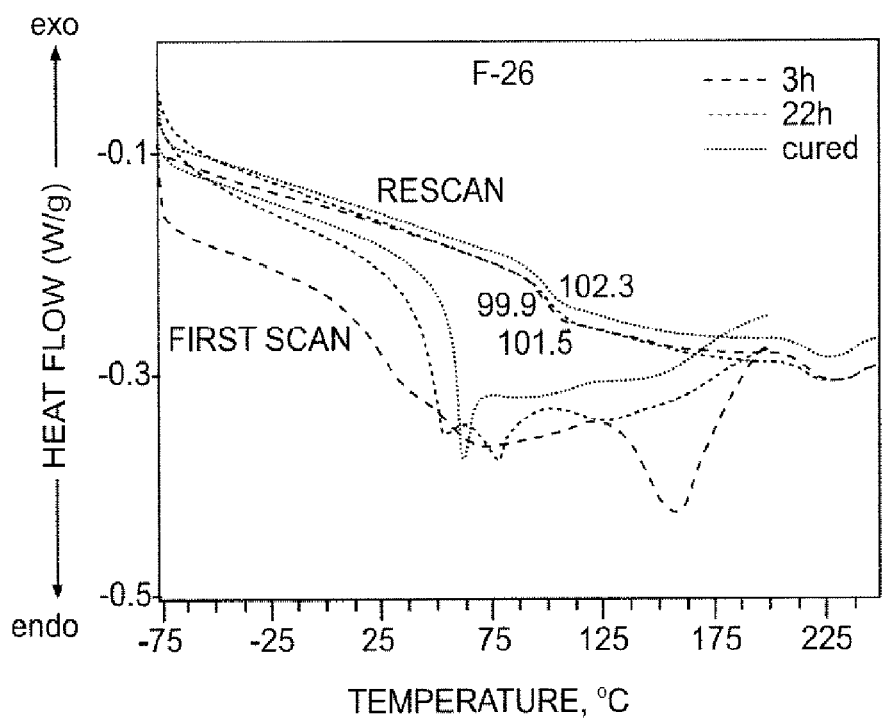
Figures 2, 3, 4, 5, 5D:
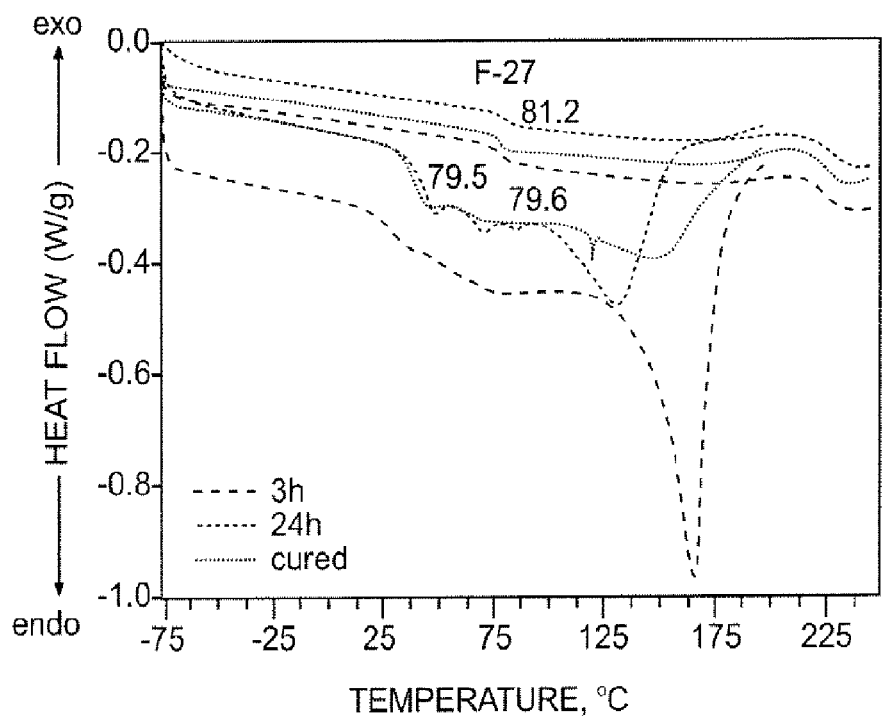
Figures 2, 3, 4, 5, 6, 6A:
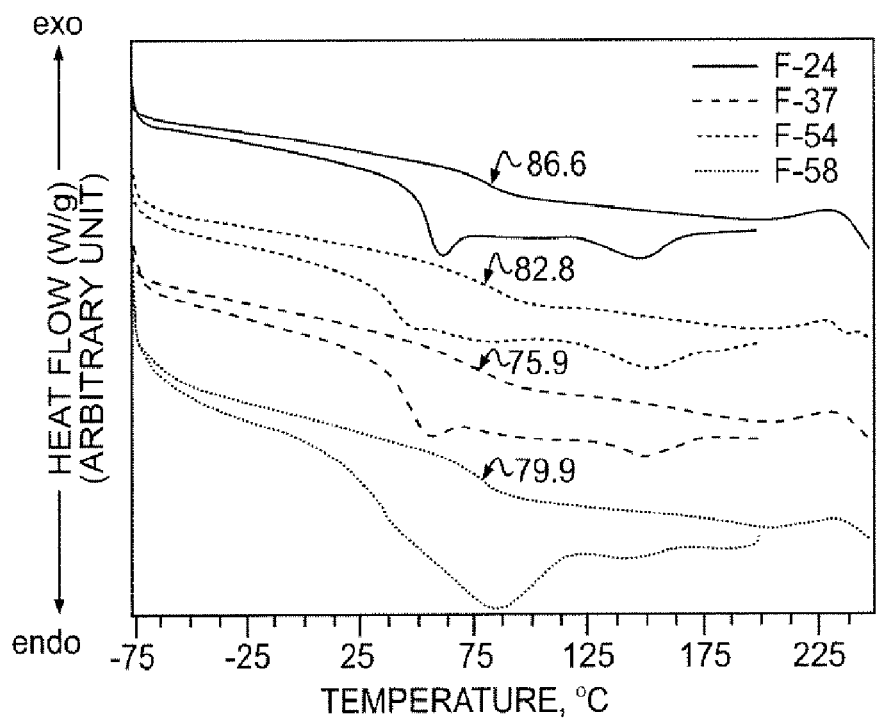
Figures 2, 3, 4, 5, 6, 6B:
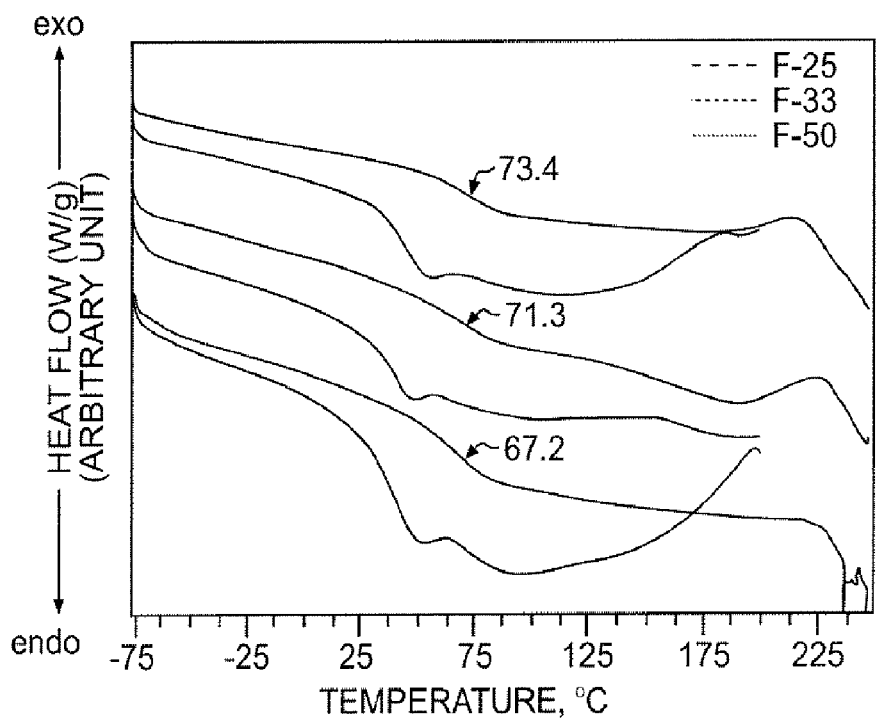
Figures 2, 3, 4, 5, 6, 6C:
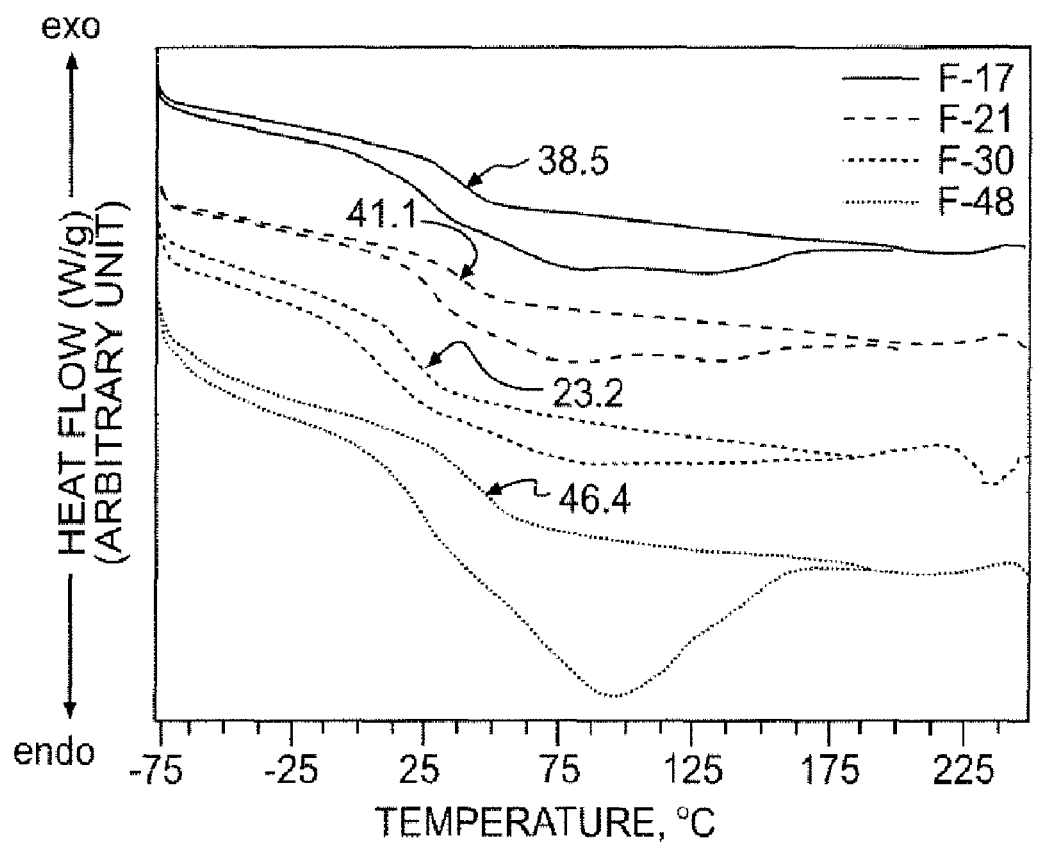
Figures 2, 3, 4, 5, 6, 7, 7A:
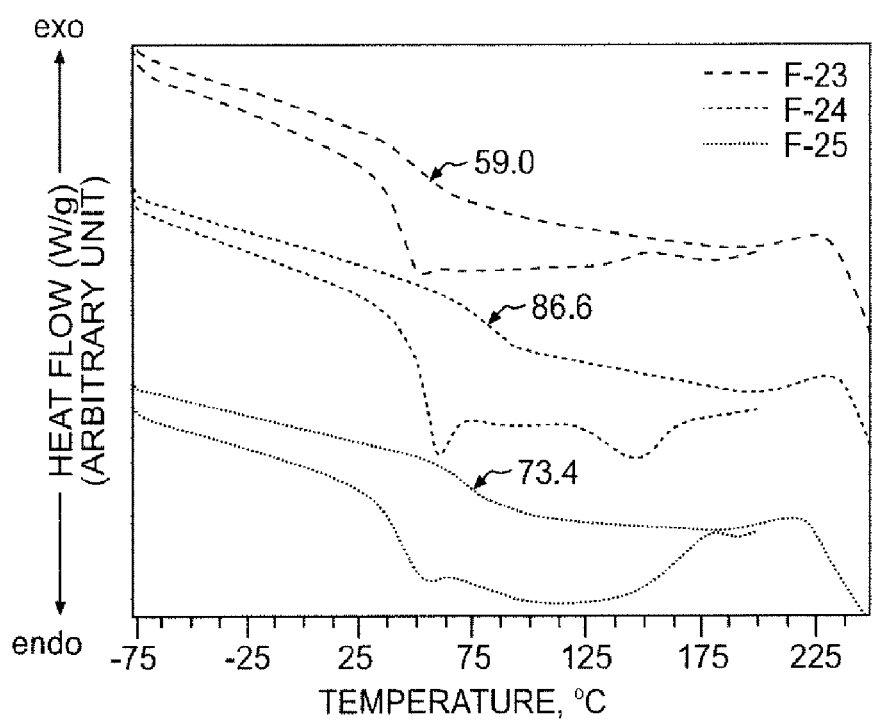
Figures 2, 3, 4, 5, 6, 7, 7B:
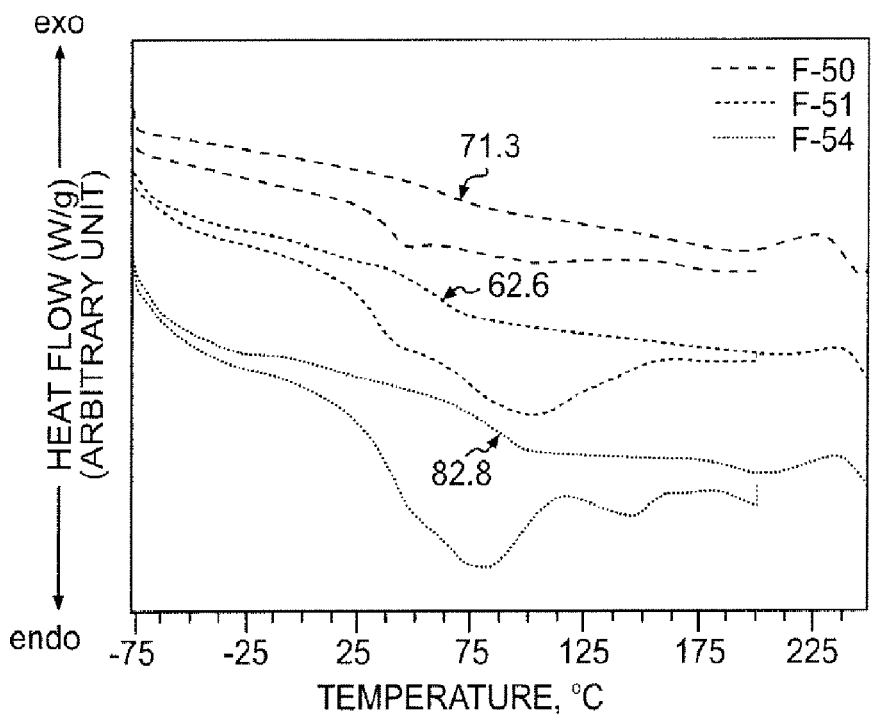

Thermal stability is a general term used to describe the change of material properties as a function of temperature. FIG. 2-1(a) shows the TGA analysis curve of F-24 with cure time. The weight loss of these hybrid coatings that contain silane and/or silicones usually starts through the loss of volatiles retained in the hybrid on account of incomplete polycondensation reactions of the residual silanol in the 100-250° C. range. The degradation of the hybrids showed a maximum in the 250-525° C. range, associated with the degradation of the organic moiety, as well as of the Si—C bonds of the siloxane component. F-24 showed three step decomposition profile with the first step starts at 125° C. and ends at 186° C. and the weight loss values at the first step corresponds to 9.7% and 8.6%, respectively for samples cured after 5 h and fully cured. The $T_{1ON}$, $T_{1MAX}$, $T_{2ON}$, $T_{2MAX}$, $T_{EN}$ values of the sample after 5 h of cure and more than 20 d of cure were 239.7, 336.9, 439.7, 447.9, 490.9 and 248.3, 351.1, 460.6, 469.1, 515.6° C., respectively. These values suggest that the network maturation during cure results an enhancement in the thermal stability of F-24. Similarly, a considerable enhancement in thermal stability of F-26 [FIG. 2-1(b)] was observed during the network maturation. The thermal stability of F-31 at different heating rate in $N_2$ and air environments are shown in FIGS. 2-2(a) and 2-2(b), respectively. As expected, an increase in the heating rate reduces the diffusion efficiency of the gases evolved during the sample degradation and thereby reduces the decomposition rate; as a result the thermal stability improved. FIG. 2-3(a) shows the TGA thermograms of different Ancamide 2353 crosslinked hybrid coatings prepared at different epoxy (silane modified GC resin):amine (Ancamide 2353) equivalent weight ratio. FIG. 2-3(a) suggests a higher thermal stability of the film derived from epoxy (silane modified GC resin):amine (Ancamide 2353) ratio of 1:1. This fact may be attributed to the 1:1 ratio of the reactants that could have resulted an increased crosslink density in the hybrid network. FIG. 2-3(b) shows the Ancamide 805 crosslinked room temperature cured hybrid coatings F-25 and F-33 prepared at 1:1 and 1:8 epoxy (silane modified GC resin):amine (PACM) ratio using BGC33% Si and BGC20% Si resin, respectively. This result showed that coatings prepared from at BGC33% Si with 1:1 epoxy:amine (Ancamide 805) ratio was more stable after 300° C. onwards. FIG. 2-3(c) shows the TGA thermograms of Amicure PACM crosslinked room temperature cured hybrid coatings prepared at 1:1 and 1:2 epoxy (BGC33% Si resin):amine (PACM) ratio and supports the earlier observation of decreasing thermal stability with increasing epoxy:amine equivalent weight ratio. FIG. 2-3(d) shows the TGA thermograms of Epicure 3164 crosslinked oven cured (represents by adding H at the end of sample name) hybrid coatings prepared at two different epoxy (BGC20% Si resin):amine (crosslinker) ratio of 1:1 and 1:1.8. The char yield values of F-30H and F-48H at 600° C. were 8.6 and 10.4 wt %, respectively. Therefore, an increasing epoxy (BGC20% Si resin):amine (Epicure 3164) ratio from 1:1 to 1:1.8 resulted an increase in the char yield value of the hybrid coatings at 600° C. FIG. 2-4 shows the effect of different Ancamide crosslinkers on the thermal stability of amine crosslinked BGC33% Si resin crosslinked at 1:1 epoxy (BGC33% Si resin) and Ancamide amine equivalent weight ratio. This figure shows that Ancamide 2353 gives good thermally stable coating.

DSC Analysis

In this example, all the reported $T_g$ values in Table 2-2 were evaluated from the rescan spectra. During the evaluation of sample in the first scan, a broad endothermic transition in between 40-200° C. was observed. The broadness of the peak is associated with the non-crystalline nature of these samples. This transition was associated with (1) loss of residual methanol and water in the sample, and (2) breakdown of intra- and inter-molecular C=O—H—N hydrogen bonding forces in the sample. FIG. 2-5(a) shows the DSC thermograms of F-20 after 5 h and 20 d of curing. During this time, the $T_g$ values changes from 60.1 to 61.7° C. FIG. 2-5(b) shows the DSC thermograms of F-24 after 4 h and 20 d of curing. During this time, the $T_g$ values of F-24 changes from 79.8 to 86.6° C. FIG. 2-5(c) shows the DSC thermograms of F-26 after 3 h, 22 h and 20 d of curing. During this time, the $T_g$ of the sample F-26 does not change much. This could be due to the fact that, during the first scan as the temperature increased from 25-200° C., the unreacted Si—OH groups may condense themselves and forms Si—O—Si linkages. Additionally, during this heating time, the unreacted epoxy groups also react with the available —NH$_2$ groups in the amine crosslinker. Therefore, the degree of cure was unintentionally increased during the first scan of DSC experiments. This resulted an increased $T_g$ values and makes the $T_g$ closer to the fully cured sample. FIG. 2-5(d) represents the DSC thermograms of F-27 at three different curing time, namely after 3 h, 24 h and 20 d. A good correlation of the change in ΔH values was not observed during the first scan in all the studied samples with the cure time. This is largely due to the two opposing factors, namely (1) increased hydrogen bonding association during cure results an increasing the transition enthalpy with cure time and (2) decreasing amount of available Si—OH groups, methanol and water of condensation inside the film during cure results decreasing the transition enthalpy with cure time. FIG. 2-6(a) shows the DSC thermograms of cured samples F-24, F-37, F-54 and F-58. The $T_g$ values of F-24, F-54, F-58 and F-37 were 86.6, 82.8, 79.9 and 75.9° C., respectively, suggesting that a higher APTMS content in F-24 increased the $T_g$ values and a change in epoxy:amine equivalent weight ratio of silane modified resin and amine crosslinker from the ideal 1:1 ratio reduces the $T_g$ of the hybrid system. This phenomenon is attributed to the good crosslinking density of the hybrid films formulated at 1:1 ratio of epoxy equivalent of silane modified resin and amine equivalent of amine crosslinker as mentioned earlier. FIG. 2-6(b) shows the DSC thermograms of cured samples F-25, F-33 and F-50, The $T_g$ values of F-25, F-50 and F-33 were 73.4, 71.3 and 67.2° C., respectively. The $T_g$ values showed that the higher APTMS content in F-25 result an higher $T_g$. This phenomenon could be due to the restriction of chain motion in view of the formation of increased amount of Si—O—Si network as a result of use of higher amount of APTMS in hybrid coatings prepared from BGC33% Si resin. The $T_g$ values of F-26 and F-27 shown in Table 2-2 were 102.3 and 81.2° C., respectively supporting the earlier studies of decreasing $T_g$ value with increasing epoxy:amine equivalent weight ratio of silane modified resin (BGC33% Si) and amine crosslinker from 1:1 to 1:2. Similarly, in FIG. 2-6(e), the $T_g$ value of F-48 was higher than F-30. However, as expected with increasing APTMS content in sample F-17 and F-21 than F-48, the $T_g$ values of F-17 and F-21 were not higher than that of cured F-48 sample. This could be due to the incomplete curing for samples F-17 and F-21. FIG. 2-6(c) also showed that the $T_g$ value of film prepared using EEP (F-21) solvent was higher than the corresponding films (F-17) prepared using t-BA solvent. The effect of different Ancamide crosslinker on the $T_g$ values are shown in FIGS. 2-7(a) and 2-7(b). The $T_g$ values of F-23, F-24 and F-25 were 59.0, 83.6 and 73.4° C., respectively. The $T_g$ values of F-50, F-51 and F-54 were 71.3, 62.6 and 82.8° C., respectively. These results suggest that Ancamide 2353 crosslinked coating have good crosslink density and hardness. A comparison of $T_g$ values of different hybrid coatings showed in Table 2-2 suggests that Epicure 3164 crosslinked coatings possess less $T_g$ and are more flexible, whereas Amicure PACM and Ancamide 2353 crosslinked coatings showed a high $T_g$ values in a series of different crosslinkers.

Mechanical Properties

The Konig pendulum hardness test was performed on the Al 2024 supported coatings and the results are tabulated in Table 2-2. The hardness values of F-26 and F-27 were 170.3 and 146 sec, respectively, suggesting that coatings prepared with 1:1 equivalent ratio of BGC33% Si resin and Amicure PACM possess a higher hardness than the sample prepared using 1:2 equivalent ratio. The hardness values of F-23, F-24 and F-25 were 122.3, 162.6 and 112 see, respectively. These values suggest that Ancamide 2353 crosslinker produce hard coatings in the series. Similarly, the hardness values in the series F-50, F-51 and F-54 with different ancamine crosslinker also suggests a similar kind of behavior of high hardness for Ancamide 2353 crosslinked coatings. A comparison in hardness values of different coatings prepared using different epoxy equivalent ratio of silane modified resins and amine equivalent ratio of amine crosslinker used shows the order: F-17>F-48>F-30>F-56; F-18>F-50>F-33; F-24>F-19>F-54>F-58; F-23>F-51>F-34>F-57 and F-16>F-15>F-49>F-31. These values are consistent with the earlier studies of similar $T_g$ and thermal stability trend. A comparison of hardness values in a particular series with different amine crosslinkers showed that Epicure 3164 produces flexible coatings, whereas Amicure PACM and Ancamide 2353 crosslinker gives hard coatings. A comparison of hardness values of coatings prepared from different percentage of silane modified resin showed that BGC33% Si resin produces hard coatings in comparison to the corresponding coatings prepared from BGC20% Si resin. This is largely due to the fact that the incorporation of increased amount of inorganic network former effectively increases the surface hardness. The reverse impact test of different hybrid coatings was determined on the hand sanded Al 20204 panels and the results are reported in Table 2-2. All the Epicure 3164 crosslinked hybrid coatings showed good impact resistance than the other amine crosslinked coatings. The adhesion test was determined on acetone cleaned Al 2024 panels and hand sanded Al 2024 panels. The reported crosshatch adhesion values in Table 2-2 were evaluated on hand sanded Al 2024 coated panels. The adhesion values of all the coatings showed in between 3B-5B. In particularly, all the Epicure 3164 crosslinked coatings showed very good adhesion of 4B-5B, whereas Amicure PACM crosslinked coating posses a relatively less adhesion of 3B on sanded Al 2024 panels. A considerable enhancement of adhesion was observed for coatings applied on hand sanded Al 2024 panels rather than using the acetone treated Al 2024 panels. This phenomenon can be attributed to the increased surface bonding in view of the increased effective surface area in the sanded Al 2024 panels. The increasing surface roughness during sanding increases effective surface area of the Al 2024 panel. The MEK double rub resistance of the all the hybrid coatings were higher than 400 suggests that they have very good solvent resistance properties.

Conclusions of Example 2

The silane based nanostructured hybrid coatings were synthesized successfully by sol-gel method. The hybrid networks prepared from organic and inorganic precursors showed structure and properties dependent on the type of the precursor and amine crosslinker used. TGA thermograms of the hybrid coatings showed three distinct stages of weight loss, where the first step corresponds to the loss of methanol and water of condensation that resides inside the coating. Second and third step of decomposition corresponds to the organic and inorganic matrix and is largely affected by the structural composition in the hybrid. In many cases, the thermal stability of samples improved with cure time due to the increased crosslink density. Thermal stability is also depends on the method of evaluation and an increase in heating rate increase the thermal stability of F-31. Thermal stability of F-31 also depends on the environment on which it is evaluated. A higher thermal stability for the hybrid coatings prepared from BGC33% Si was observed as compared to samples prepared from BGC20% Si resin. These results suggest that the change in epoxy and amine equivalent weight ratio of the silane modified resin and different amine crosslinkers, respectively affect the thermal stability and $T_g$ values of the hybrid coatings. The $T_g$ values suggests that Epicure 3164 produces flexible coatings whereas Amicure PACM and Ancamide 2353 gives hard coatings. This result was also supported by the hardness test. The reverse impact resistance of different coatings exhibited samples flexible nature. In the adhesion test, all the samples exhibited good adhesion on sanded Al 2024 panels. The MEK double rub resistance of all the hybrid coatings were higher than 400.

TABLE 2-1

Various reactants used to prepare the hybrid PU coatings along with their equivalent ratios.

| Sample name | Components (eqiv. ratio) | Resin | Crosslinker | Epoxy (modified GC): amine (crosslinker) | Solvent used during coating formulation |
|---|---|---|---|---|---|
| F-15 | HDB-LV, APTMS, Glycidol (3:1:2) | BGC33%Si | Amicure PACM [1H equiv.] | 1:1 | t-BA |
| F-16 | | | Amicure PACM [2H equiv.] | 1:2 | |
| F-17 | | | Epicure 3164 | 1:1 | |
| F-18 | | | Ancamide 805 | | |
| F-19 | | | Ancamide 2353 | | |
| F-20 | | | Ancamide 2050 | | |
| F-21 | | | Epicure 3164 | | EEP |
| F-23 | | | Ancamide 2050 | | |
| F-24 | | | Ancamide 2353 | | |
| F-25 | | | Ancamide 805 | | |
| F-26 | | | PACM | | |
| F-27 | | | PACM | 1:2 | |
| F-28 | | | Jeffamine D400 | 1:1 | |
| F-30 | HDB-LV, APTMS, | BGC20%Si | Epicure 3164 | 1:1.8 | |
| F-31 | Glycidol | | Amicure PACM | | |
| F-33 | (3:0.6:2.4) | | Ancamide 805 | | |
| F-34 | | | Ancamide 2050 | | |
| F-35 | | | Jeffamine D400 | | |
| F-36 | | | Jeffamine D2000 | | |
| F-37 | | | Ancamide 2353 | | |
| F-48 | HDB-LV, APTMS, | | Epicure 3164 | 1:1 | t-BA |
| F-49 | Glycidol | | Amicure PACM | | |
| F-50 | (3:0.6:2.4) | | Ancamide 805 | | |
| F-51 | | | Ancamide 2050 | | |
| F-52 | | | Jeffamine D400 | | |
| F-54 | | | Ancamide 2353 | | |
| F-55 | | | Geramide 2000 | | |
| F-56 | | | Epicure 3164 | | |
| F-57 | HDB-LV, APTMS, | | Ancamide 2050 | 1:0.5 | t-BA |
| F-58 | Glycidol | | Ancamide 2353 | | |
| F-61 | (3:0.6:2.4) | | Ancamine DETA | | |

TABLE 2-2

Properties of different hybrid coatings prepared.

| Sample name | Konig pendulum hardness (sec) | MEK- (double rub) | Impact (Reverse: in·lb) | Adhesion | Tg (from DSC in °C.) | Coatings thickness in μm (measured on Al-2024) | Appearance |
|---|---|---|---|---|---|---|---|
| F-15 | 107.2 | >400 | 60 | 3B | — | 0.054-0.086 | White (not good) |
| F-16 | 147.6 | >400 | 60 | 3B | — | 0.145-0.186 | White (not good) |
| F-17 | 66 | >400 | 104 | 5B | 38.5 | 0.074-0.113 | Transparent (medium) |
| F-18 | 110.3 | >400 | 88 | 4B | 72.7 | 0.128-0.138 | White (not good) |
| F-19 | 145.6 | >400 | 78 | 4B | 83.2 | 0.096-0.129 | Transparent (not good) |
| F-20 | 130 | >400 | 78 | 4B | 61.7 | 0.081-0.101 | Transparent (medium) |
| F-21 | 112 | >400 | 104 | 5B | 41.1 | 0.054-0.088 | Transparent (good) |
| F-23 | 122.3 | >400 | 80 | 4B | 59.0 | 0.102-0.131 | Transparent (good) |
| F-24 | 162.6 | >400 | 80 | 4B | 86.6 | 0.019-0.029 | Transparent |
| F-25 | 112 | >400 | 84 | 4B | 73.4 | 0.093-0.119 | Transparent (film shrink during cure) |
| F-26 | 170.3 | >400 | 80 | 3B | 102.3 | 0.114-0.142 | White (not good) |
| F-27 | 146 | >400 | 78 | 3B | 81.2 | 0.083-0.143 | White (medium) |
| F-28 | 136.3 | >400 | 88 | 3B | 37.7 | 0.055-0.068 | Transparent (medium) |
| F-30 | 45 | >400 | 120 | 4B | 23.2 | 0.102-0.129 | Good transparent film |
| F-31 | 117 | >400 | 88 | 3B | 79.4 | 0.082-0.110 | White film (film shrink during cure) |
| F-33 | 96 | >400 | 80 | 3B | 67.2 | 0.096-0.144 | Good transparent film |
| F-34 | 96 | >400 | 80 | 3B | 62.0 | 0.039-0.054 | film |
| F-35 | 128 | >400 | 64 | 3B | 23.4 | 0.038-0.068 | Good transparent film |
| F-36 | 48 | >400 | 68 | 3B | — | 0.062-0.110 | Transparent film |
| F-37 | 109.6 | >400 | 80 | 3B | 75.9 | 0.088-0.102 | Good transparent film |
| F-48 | 50 | >400 | 104 | 5B | 46.4 | 0.062-0.130 | Good transparent film |
| F-49 | 122 | >400 | 88 | 4B | 89.5 | 0.078-0.112 | Good transparent film |
| F-50 | 108 | >400 | 78 | 4B | 71.3 | 0.102-0.122 | white |
| F-51 | 122 | >400 | 80 | 4B | 62.6 | 0.068-0.124 | Good transparent film |
| F-52 | 98 | >400 | 60 | 3B | 59.4 | 0.072-0.109 | Good transparent film |
| F-54 | 142 | >400 | 76 | 4B | 82.8 | 0.061-0.114 | Good transparent film |
| F-55 | 56 | >400 | 68 | 3B | 87.4 | 0.12-0.149 | Transparent film |
| F-56 | 42 | >400 | 128 | 4B | 68.7 | 0.083-0.104 | Good transparent film |
| F-57 | 78 | >400 | 64 | 3B | 79.1 | 0.081-0.110 | Good transparent film |
| F-58 | 122 | >400 | 80 | 3B | 79.9 | 0.055-0.075 | Good transparent film |
| F-61 | 70 | >400 | 72 | 3B | 90.7 | 0.055-0.068 | Film did not form properly |
| F-30H | 26.6 | >400 | 172 | 4B | 20.2 | 0.036-0.049 | Good transparent film |
| F-48H | 119 | >400 | 100 | 5B | 45.8 | 0.59-0.104 | Good transparent film |
| F-49H | 115.6 | >400 | 80 | 4B | 84.8 | 0.123-0.144 | Good transparent film |
| F-50H | 110 | >400 | 80 | 4B | 64.0 | 0.81-0.121 | Good transparent film |
| F-51H | 130.6 | >400 | 70 | 4B | 69.5 | 0.059-0.075 | Good transparent film |
| F-52H | 143.3 | >400 | 72 | 3B | 53.6 | 0.083-0.098 | Good transparent film |
| F-54H | 149.3 | >400 | 80 | 4B | 79.3 | 0.013-0.044 | Good transparent film |
| F-55H | 62 | >400 | 68 | 3B | 64.1 | 0.081-0.098 | Transparent film |

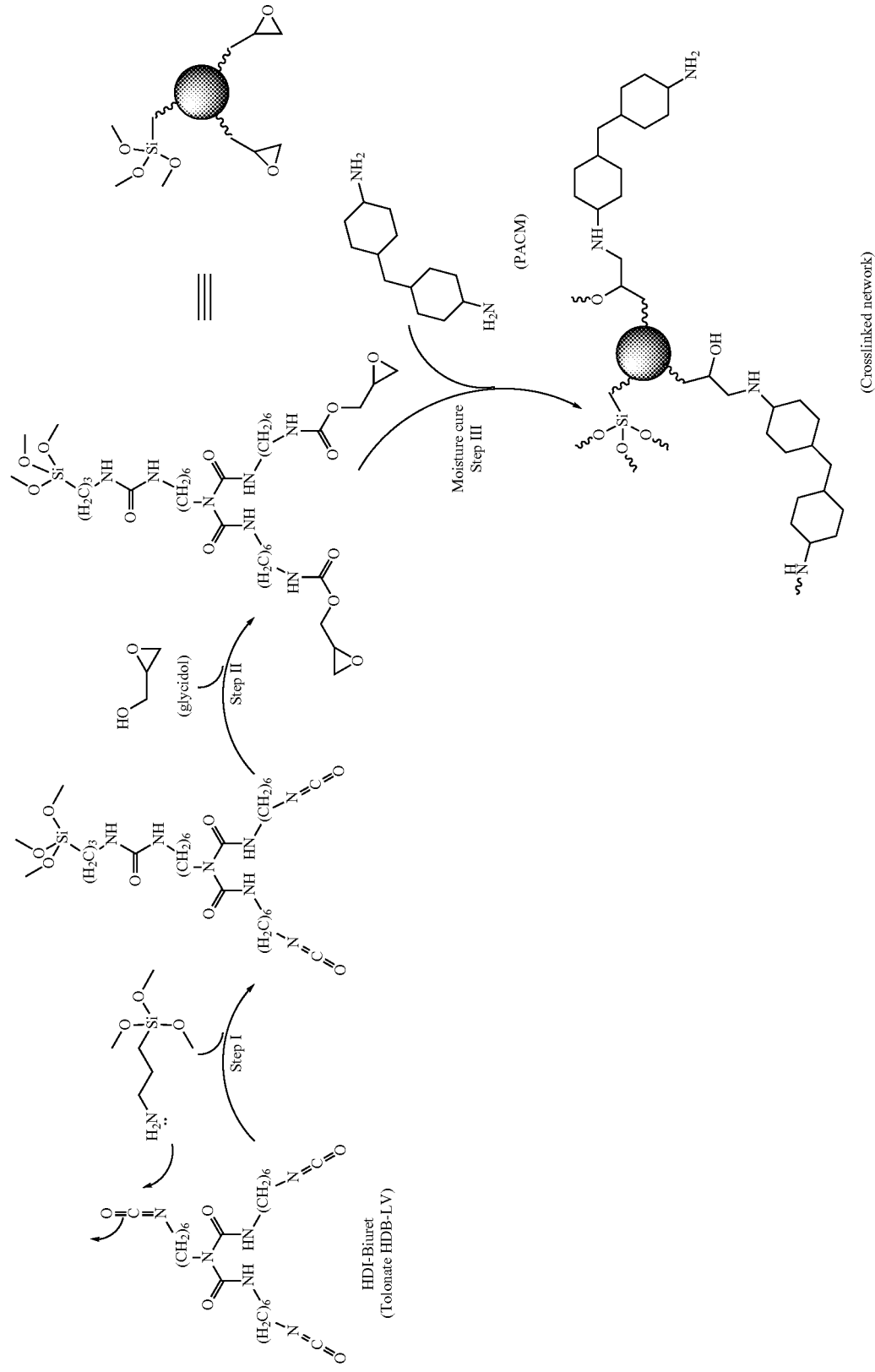
Scheme 2. Schematic diagram of the formation of crosslinked network from silane modified glycidyl carbamate resin and amicure PACM.

Example 3

Synthesis of GC Resin

Required amount of Tolonate® HDB-LV was weighed in a reaction kettle. The kettle was equipped with a mechanical stirrer, addition funnel, nitrogen inlet and a thermocouple to record the temperature inside the bulk of the kettle. BGC resin was synthesized using Tolonate® HDB-LV and glycidol as reported elsewhere [Step I of Scheme 3-1]. On the other hand, silane modified BGC resin was synthesized as follows: at room temperature part of the available NCO groups in HDB was slowly reacted with APTMS (Step I; Scheme 3-2) and later on the unreacted NCO groups were converted to epoxy end groups by the reaction with glycidol at 45-55° C. using DBTDL catalyst (Step II; Scheme 3-1). The reaction was carried out in the presence of 1:1 wt ratio of EEP and TBA solvent blend. The reaction in step II was continued until the complete disappearance of NCO peak in FTIR was observed. The synthesized 10% and 15% silane modified resins were named as BGC10% Si and BGC15% Si, respectively. The percentage silane modification was carried out based on the available NCO groups in HDB. All the synthesized resins were stored in glass bottle.

Coating Formulation

The synthesized BGC and silane modified GC resins BGC10% Si and BGC15% Si were reacted with different amine crosslinkers in the presence of TEOS. Coatings prepared using BGC resin were named using the initial BGC with numbering corresponds to the different crosslinker. Coatings prepared using BGC10% Si and BGC15% Si were named with their initial followed by numbering corresponding to different amine crosslinker. Coatings were casted on clean glass and sanded Al-2024 panels at ambient condition using a draw-down bar with the gap of 8 mils. Later on, formulated coatings were kept at laboratory environment conditions for the network formation. Table 3-1 and Table 3-2 represent the chemical composition, equivalent ratio as well as the sample nomenclature of different hybrid coatings prepared from BGC resin and silane modified BGC resin, respectively.

Results and Discussion of Example 3

FIG. 3-1 shows the GPC results of BGC, BGC10% Si and BGC15% Si resins. The $M_n$ and polydispersity values of the synthesized resin were varied from 1852-2159 and 1.74-1.92, respectively. The $^1H$ NMR spectra of different samples recorded at 22.5° C. are shown in FIG. 3-2. The $^1H$ NMR peak assignments are as follows: $^1H$ NMR [FIG. 3-2(a)]: δ=8.2-8.4 ppm (urethane NH), δ=7.1-7.25 ppm {N—(C=O)—NH—(CH$_2$)$_6$}, δ=4.25 ppm (H$^e$: methylene proton), δ=3.7 ppm (H$_a$), δ=3.1 ppm (H$_c$), δ=2.95 ppm (H$_d$: methylene proton), 1.2-1.3 ppm {—(CH$_2$)$_6$—}.

Figures 1, 3:
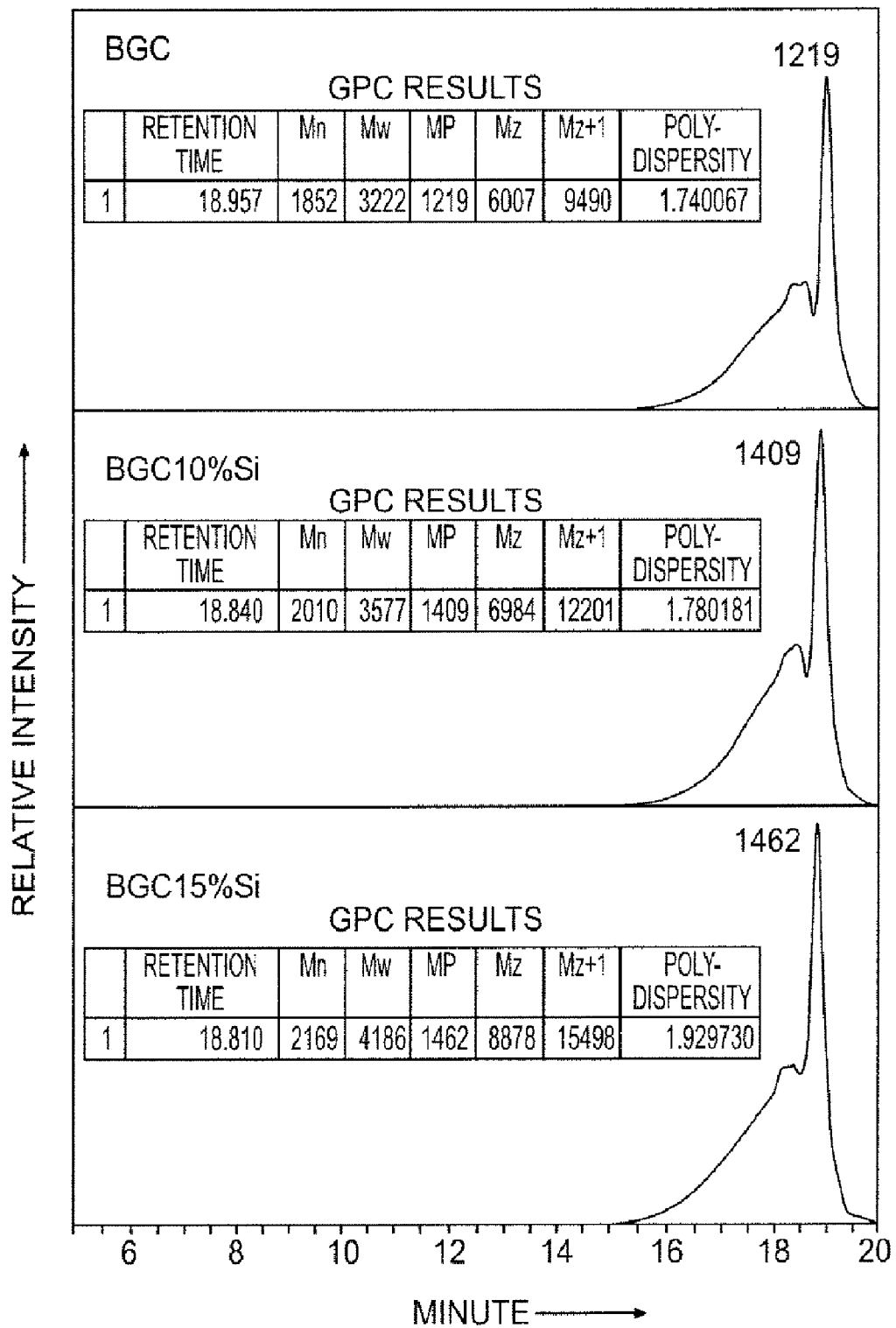
Figures 2A, 2B, 2C, 3:
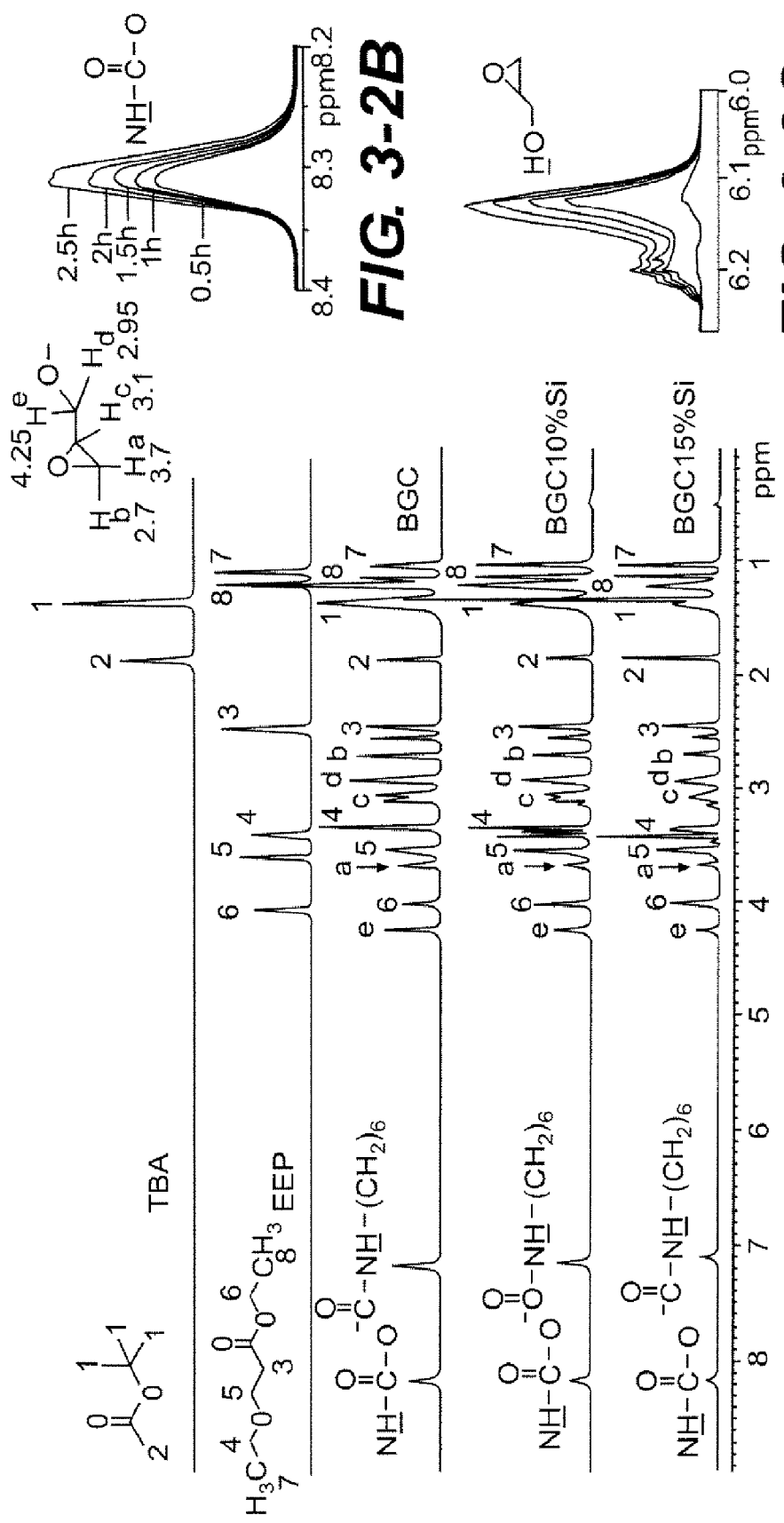
Figure 3:
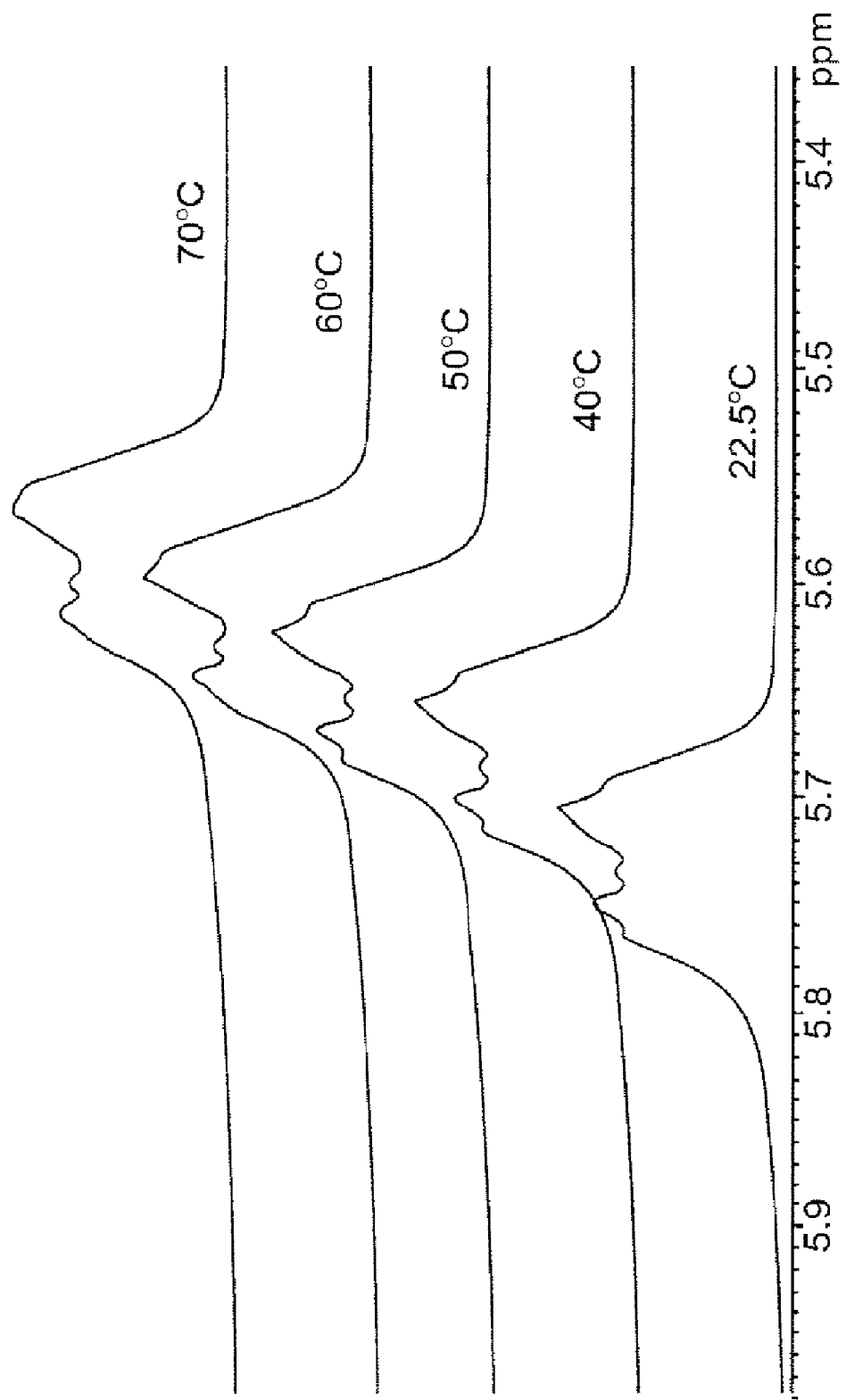
Figures 3, 4:
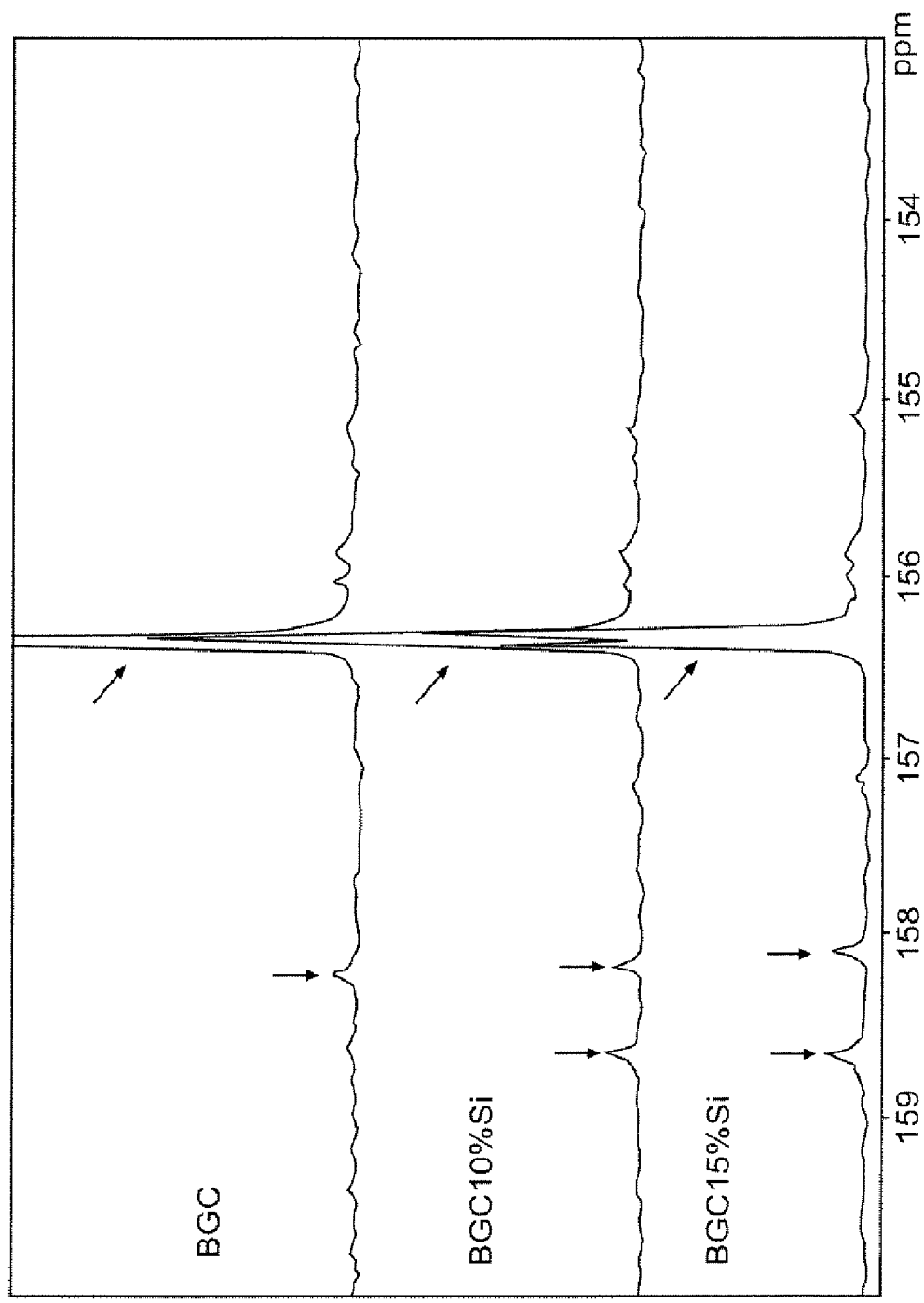
Figures 3, 4, 5, 5A:
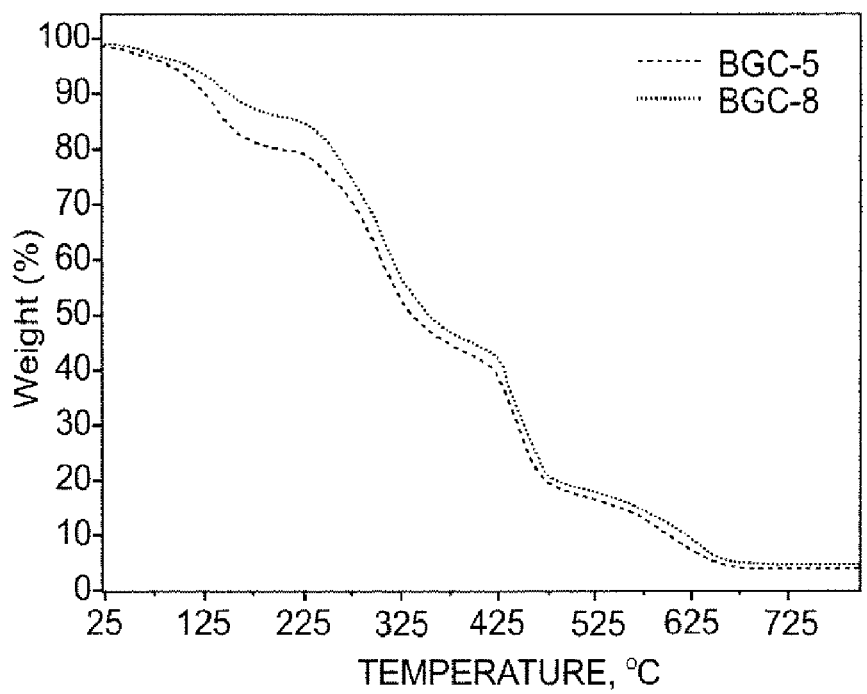
Figures 3, 4, 5, 5B:
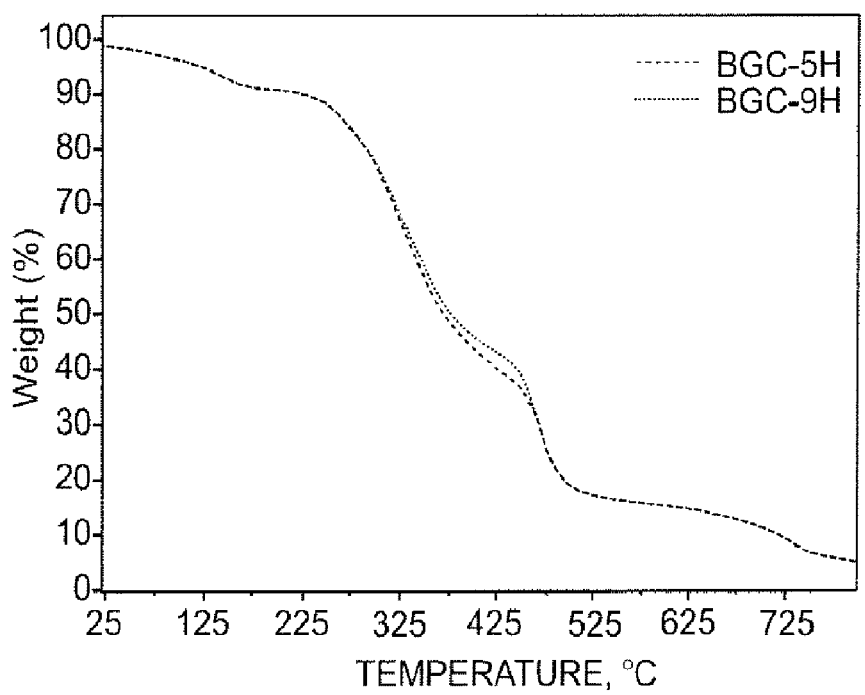
Figures 3, 4, 5, 6:
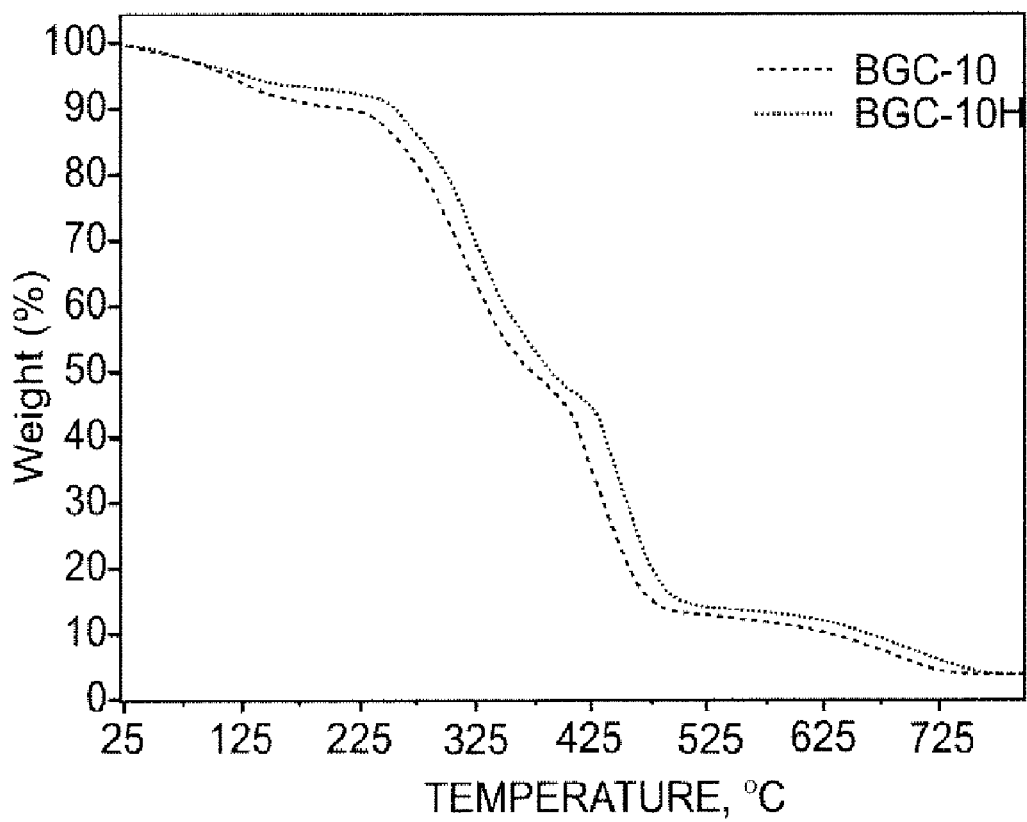
Figures 3, 4, 5, 6, 7, 7A:
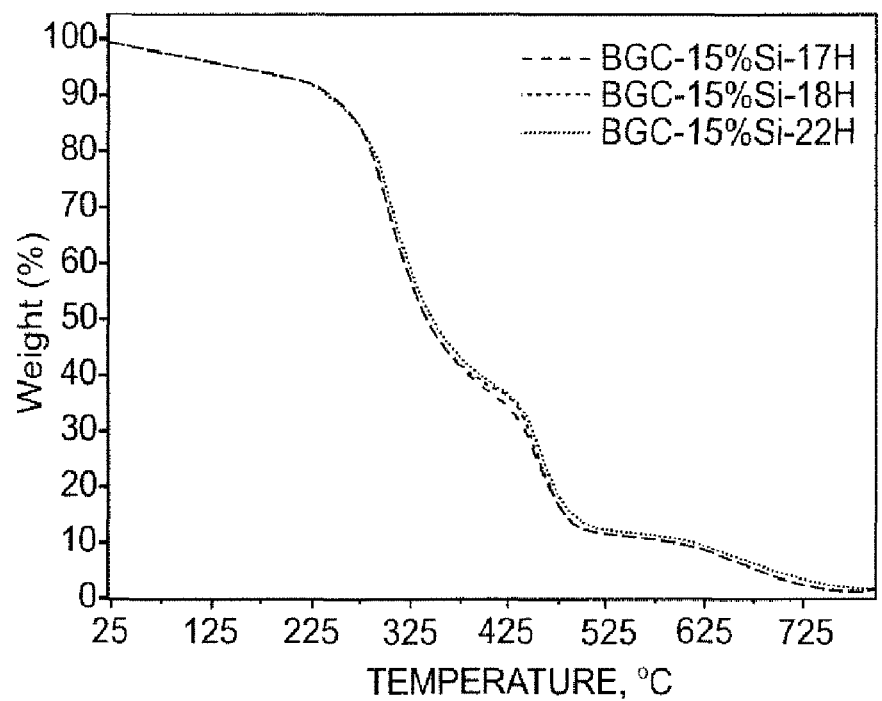
Figures 3, 4, 5, 6, 7, 7B:
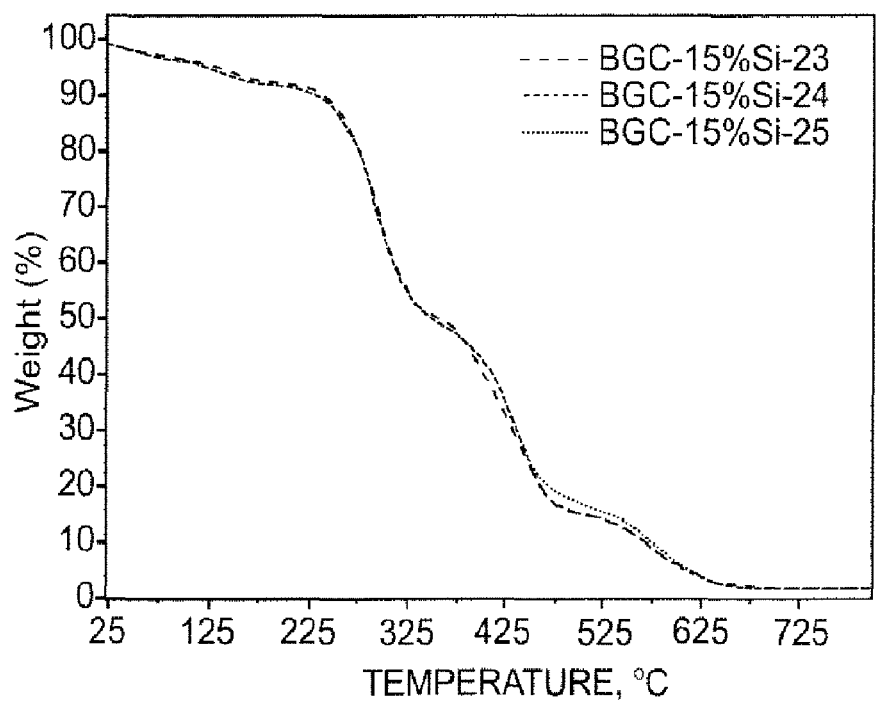
Figures 3, 4, 5, 6, 7, 7C:
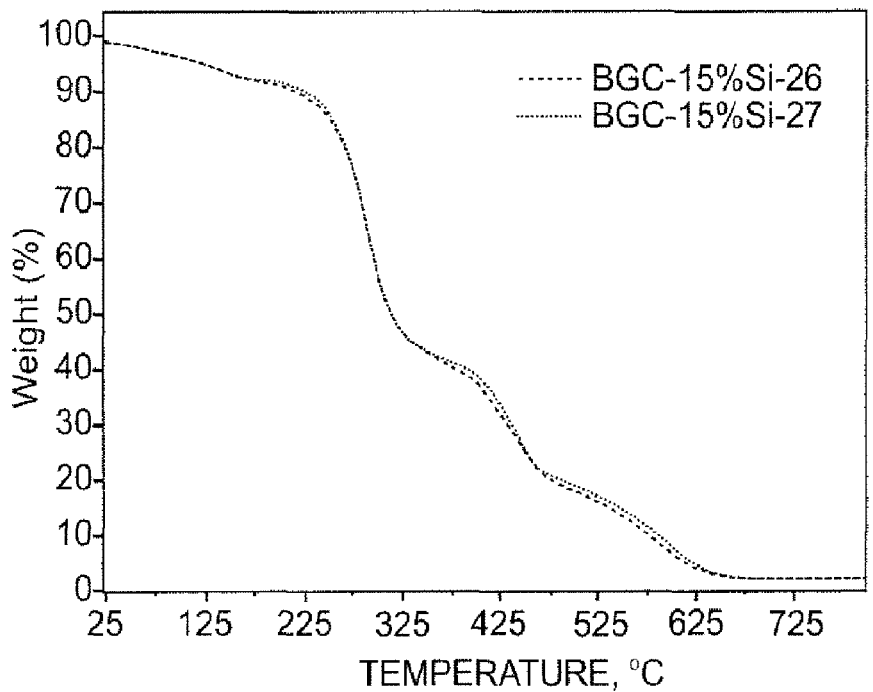
Figures 3, 4, 5, 6, 7, 7D:
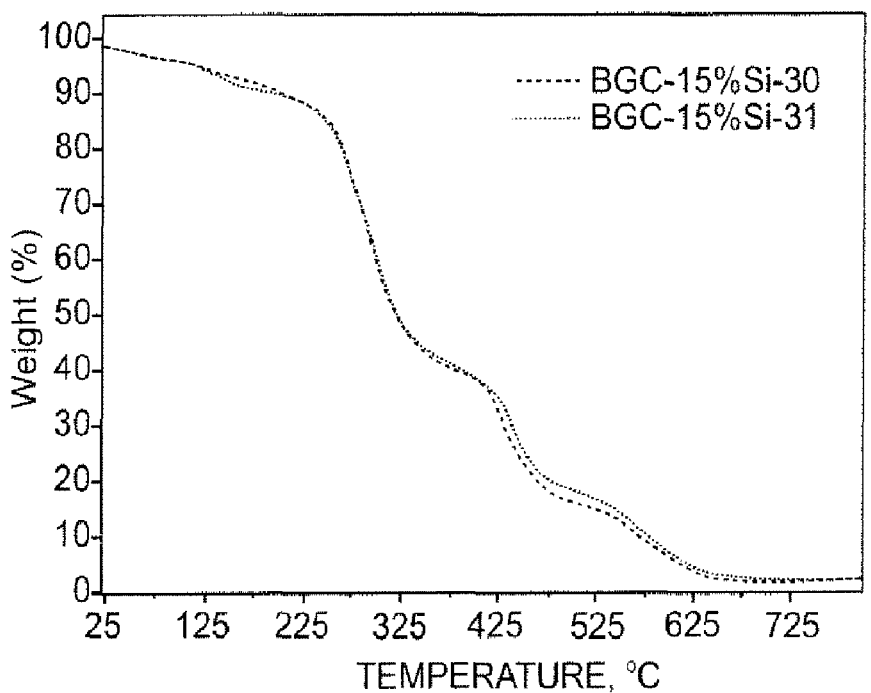
Figures 3, 4, 5, 6, 7, 8:
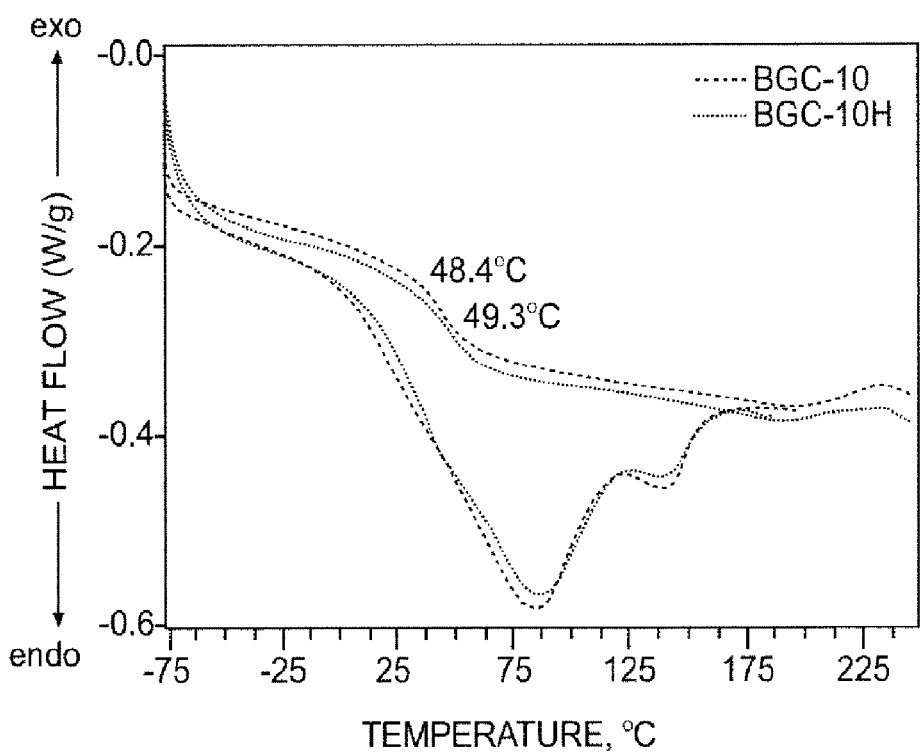
Figures 3, 4, 5, 6, 7, 8, 9:
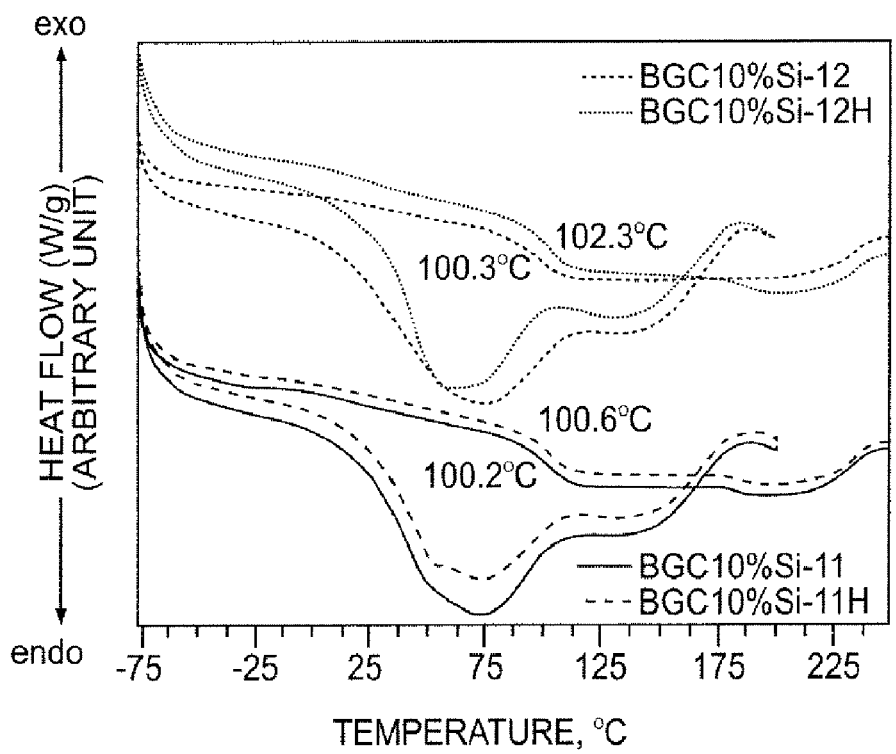
Figures 3, 4, 5, 6, 7, 8, 9, 10:
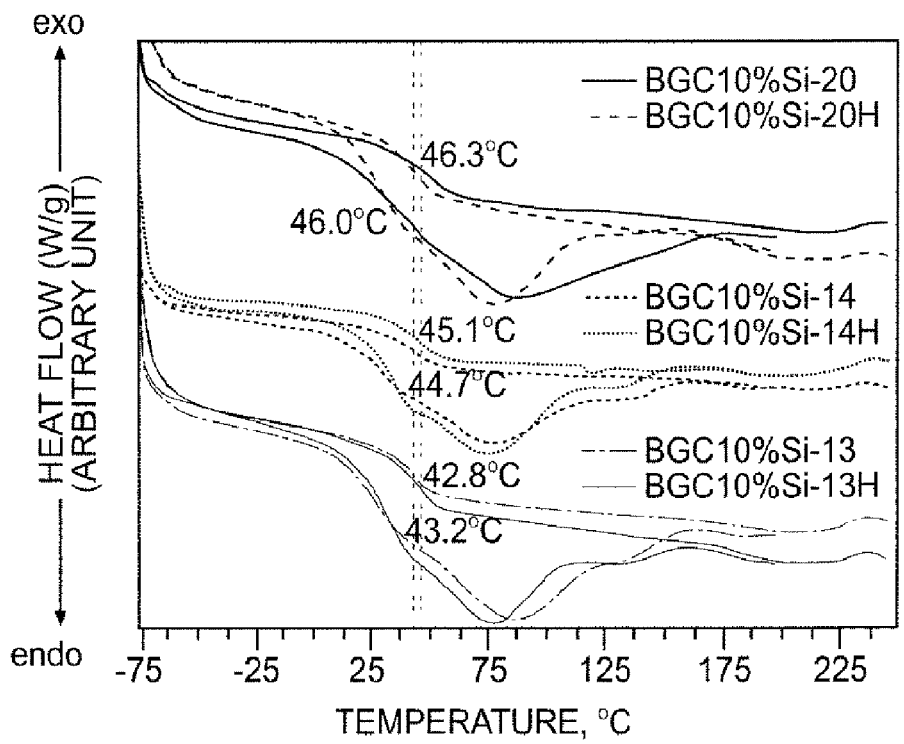
Figures 3, 4, 5, 6, 7, 8, 9, 10, 11:
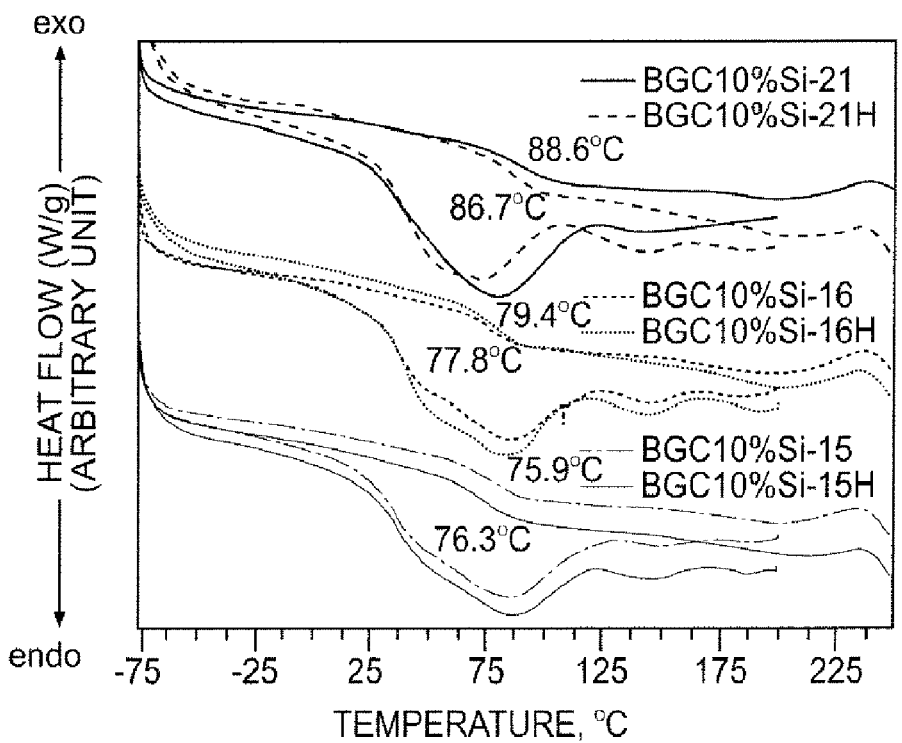
Figures 3, 4, 5, 6, 7, 8, 9, 10, 11, 12:
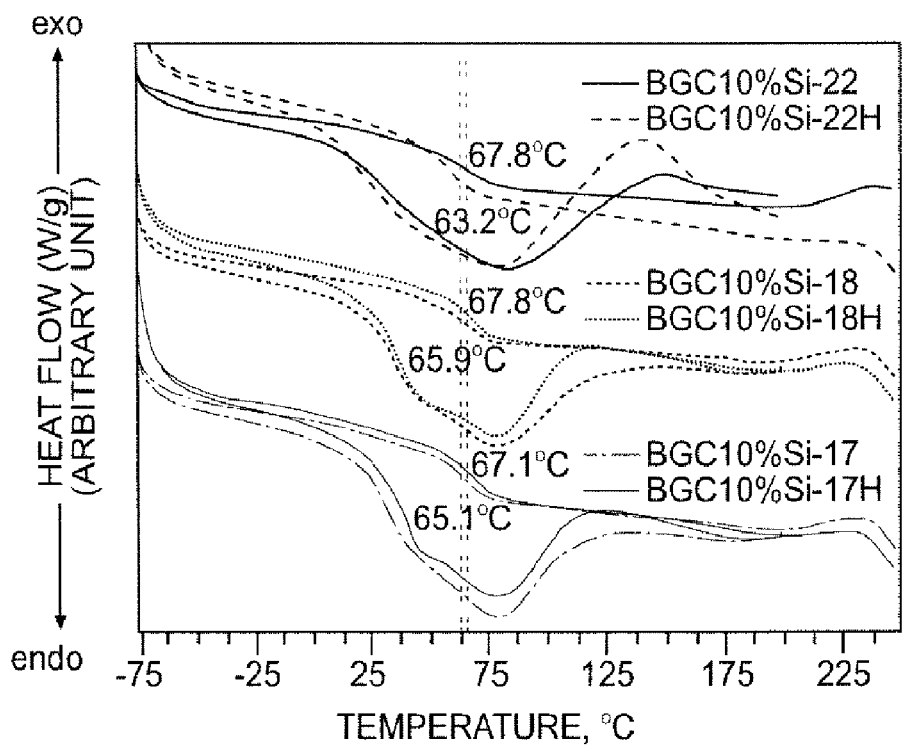
Figures 3, 4, 5, 6, 7, 8, 9, 10, 11, 12, 13:
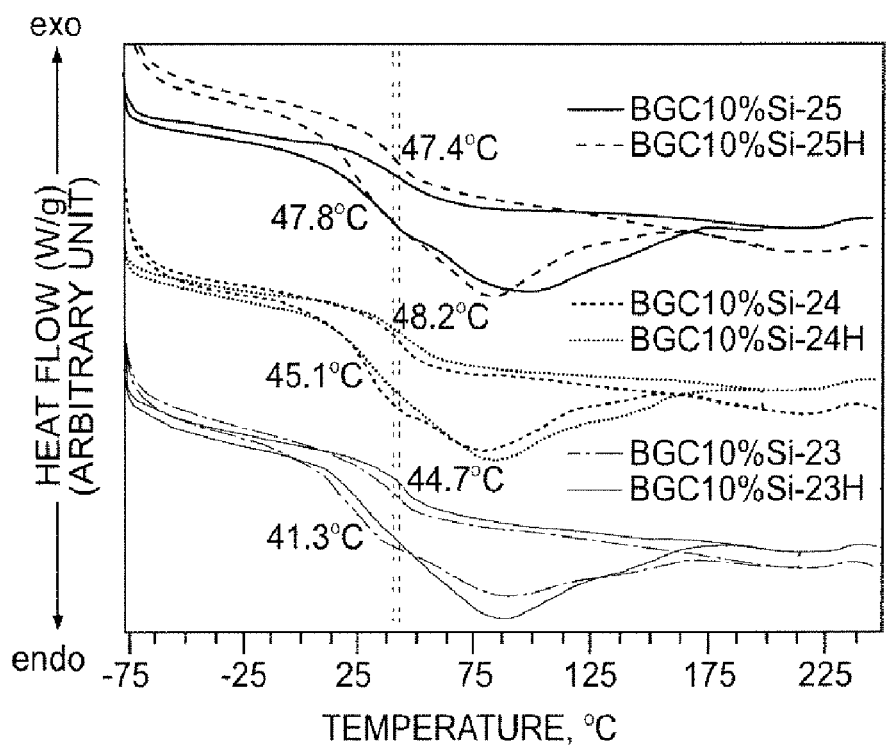
Figures 3, 4, 5, 6, 7, 8, 9, 10, 11, 12, 13, 14:
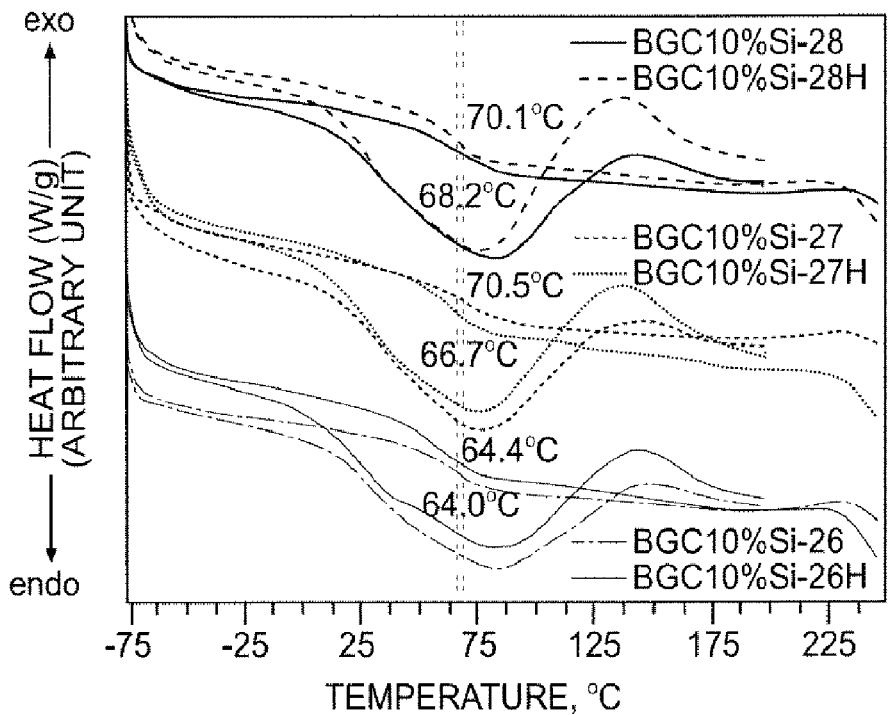
Figures 3, 4, 5, 6, 7, 8, 9, 10, 11, 12, 13, 14, 15:
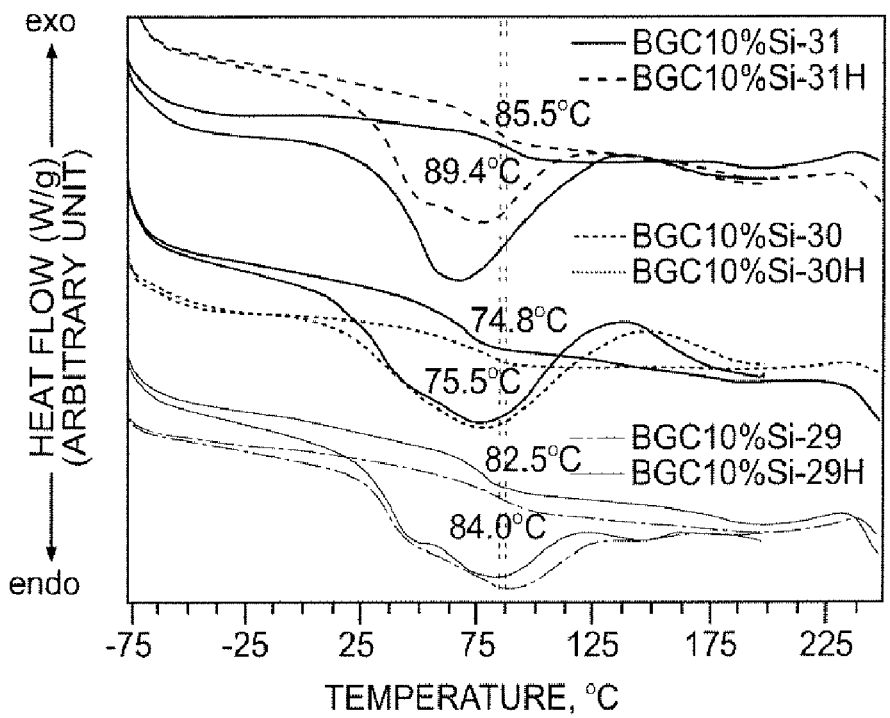
Figures 3, 4, 5, 6, 7, 8, 9, 10, 11, 12, 13, 14, 15, 16:
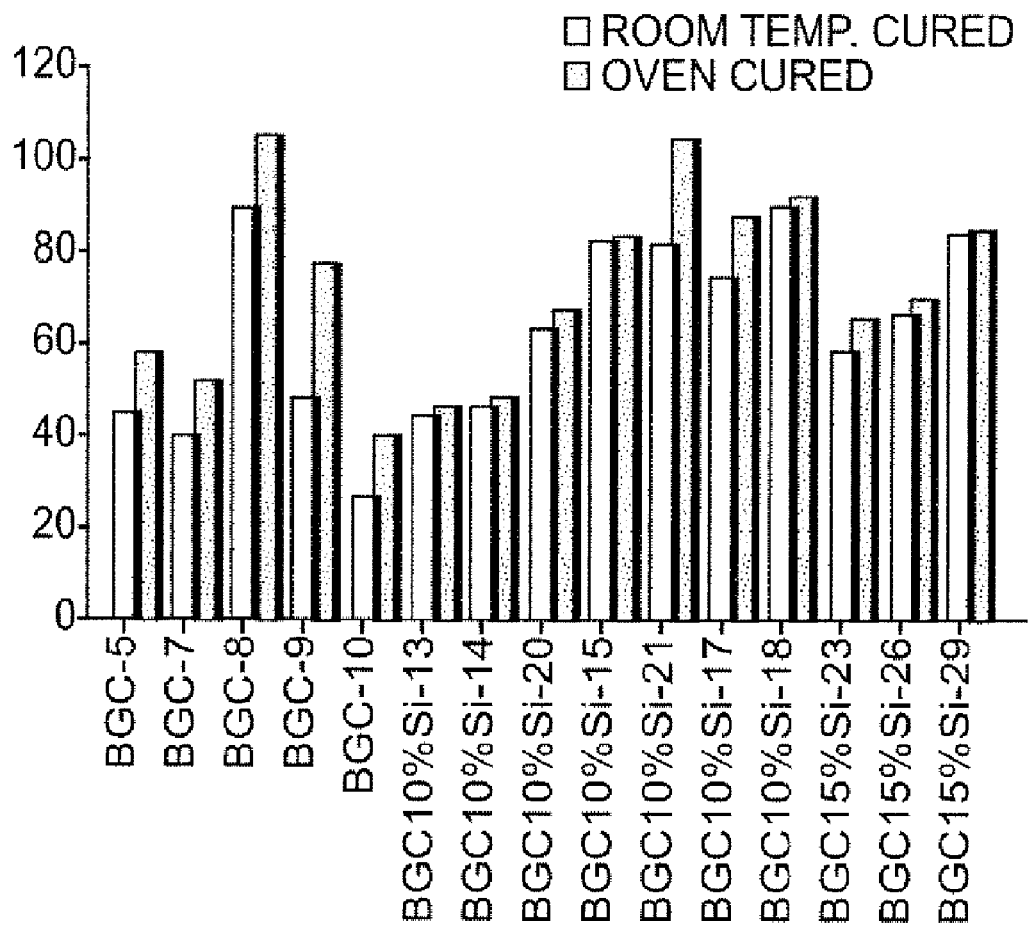

As the reaction proceed, the peak intensity of the formed urethane proton at 8.2-8.4 ppm increases as shown in FIG. 3-2(b), while the peak intensity of —OH group of glycidol at 6.13 ppm decreases [FIG. 3-2(c)]. FIG. 3-3 shows the amide region of the $^1H$ NMR spectra of BGC10% Si as a function of temperature (i.e., at 22.5, 40, 50, 60 and 70° C.). The amide regions consist of hydrogen bonded and free N—H groups. As expected, increasing the temperature for recording the $^1H$ NMR spectra results in an upfield shift of the resonances. This is largely due to the fact that, the N—H groups in GC resins are mainly hydrogen-bonded and the hydrogen bonding breaks with increasing temperature. The protons involved in H-bonds are deshielded, and because the H-bond breaks as the temperature is increased, their resonances shift upfield. As the peak shifting was observed for the entire amide region, it can be concluded that all, or almost all, types of N—H groups in BGC10% Si are associated with hydrogen bonding. The urethane region $^{13}C$ NMR spectra of BGC, BGC10% Si and BGC15% Si resins recorded at 22.5° C. are shown in FIG. 3-4 and suggest the presence of two different NHC=O for BGC resin and three different NHC=O for BGS10% Si and BGS15% Si resins.

Synthesized BGC, BGC10% Si and BGC15% Si were used to formulate different O—I hybrid coatings. O—I hybrid coating were obtained by the epoxy-amine addition reaction followed by hydrolysis-condensation reactions of the alkoxysilane end-groups. During the preparation of O—I hybrid coatings, two types of polymer network buildup processes are anticipated. First, inorganic Si—O—Si three dimensional network structures are formed by the sol-gel process. The reactive alkoxy groups of APTMS and TEOS undergo hydrolytic and polycondensation reactions, where TEOS and APTMS act as an inorganic network former and a coupling agent, respectively. The hydrolysis led to the formation of Si—OH bonding, with alcohol release. On the other hand, a condensation reaction produces water or alcohol as by-products with the formation of siloxane (Si—O—Si) bonds. Second, the organic polymer network is formed by the reaction between epoxy groups of the synthesized resin with the amino groups of (1) APTMS and (2) amine crosslinker. In this case, amines play a double role, because they catalyze the inorganic condensation reactions and participate in the formation of the organic networks via reactions with the epoxies. Therefore, the formation of the hybrid takes place via a complicated chemical process, where the network structures are determined by the relative rates of formation of the organic and inorganic parts and the linkages between them. The morphology of hybrid is affected by the phase separation process that takes place during the film formation process. Additionally, the structure of the organic epoxy-amine network can be influenced by the molecular weight ($M_{cross}$) and functionality of the amine crosslinker ($f_{cross}$). Decreasing $M_{cross}$ and increasing $f_{cross}$ results in increasing the crosslinking density of the coatings. Therefore, altering the proportions of the inorganic and organic materials in the starting composition, varying the molecular weight and functionality of amine crosslinker as well as curing time of the resultant coatings enables a wide range of O—I hybrid materials to be produced using this novel sol-gel method. The molar proportion between the NH$_2$ and the epoxy groups used was 1:1. In this case, the reaction of an epoxy group with a primary amine initially produces a secondary alcohol and a secondary amine. The secondary amine, in turn, can also react with an epoxy group to give a tertiary amine and two secondary hydroxyl groups. However, primary amines react approximately twice as fast as secondary amines and the overall reaction rate of an amine with an epoxy resin is also influenced by the steric hindrance. The basic synthetic diagrams for the preparation of different hybrid coatings are shown in Scheme 3-1 and Scheme 3-2. The appearance of the obtained hybrid coating materials was transparent.

The infrared spectra of the hybrid materials (not shown) were characterized by a broad absorption centered at 3370 cm$^{-1}$ associated with the ν(O—H) of the alcohol formed (resulting from the reaction between the epoxide and amine groups) and residual Si—OH groups produced by the hydrolysis of the alkoxysilanes. In addition, a shoulder at 3270 cm$^{-1}$ was related with ν(N—H) of the formed secondary amine. In the CH$_2$ stretching region, the two main bands around 2920 and 2880 cm$^{-1}$ are attributed to CH$_2$ antisymmetric ($CH_2$, $v_{asym}$) and $CH_2$ symmetric stretching ($CH_2$, $v_{sym}$), respectively. A strong absorption band in the range 1000-1200 $cm^{-1}$ is observed in the hybrid and is ascribed to asymmetric stretching vibrations of the Si—O—Si bonds of the silica component. The absorption peak at 1025-1030 $\mu m^{-1}$ belongs to extending vibration of Si—O—Si. Increasing intensity of this peak shows that the Si—O—Si network is forming with cure time. The other characteristic silica network absorptions at 805 and 445-473 $cm^{-1}$ correspond to the symmetric stretching and bending modes, respectively. The decreasing intensity of peak at 913 $cm^{-1}$ with cure time shows that the epoxide ring opening reaction from the nucleophilic attack of amino-terminated APTMS and amine crosslinker to the epoxy groups of BGC resin is taking place during cure. The other characteristic bands observed are: (i) amide I (1600-1800 $cm^{-1}$; C=O stretching vibration), (ii) amide II (1420-1570 $cm^{-1}$; coupling between N—H bending and C—N stretching vibrations), (iii) amide III (1210-1370 $cm^{-1}$; N—H bending+CN stretching), (iv) amide IV-amide VII (<800 $cm^{-1}$; out-of-plane vibrations of the CONH group). Amide III and IV are very complex bands resulting from a mixture of several coordinate displacements. Therefore these bands are only of limited use for the extraction of structural information. The out-of-plane motions are found in amide V, VI and VIII.

Thermal Stability

Figures 1, 2, 3, 4, 5:
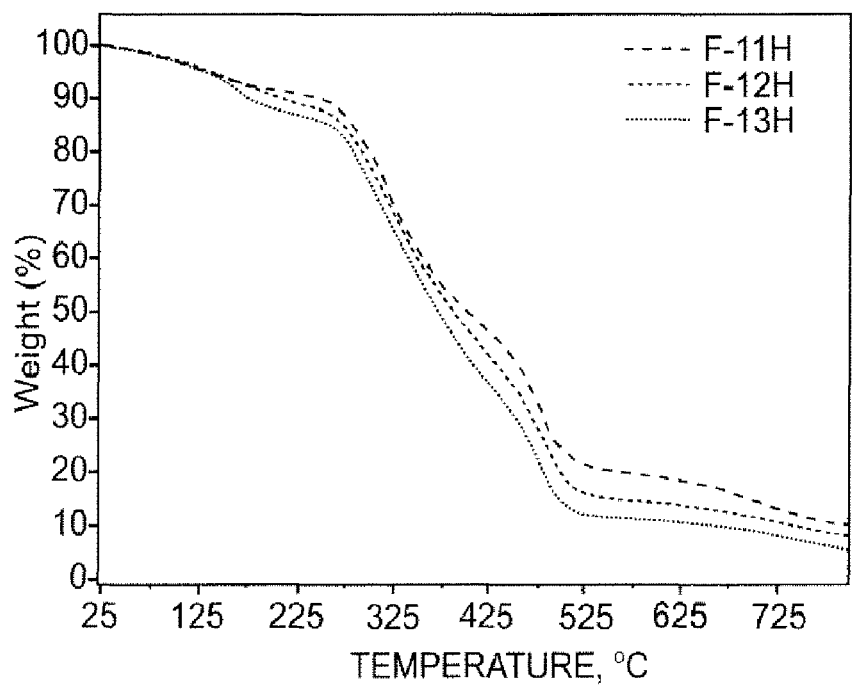
Figures 1, 2, 3, 4, 5, 6:
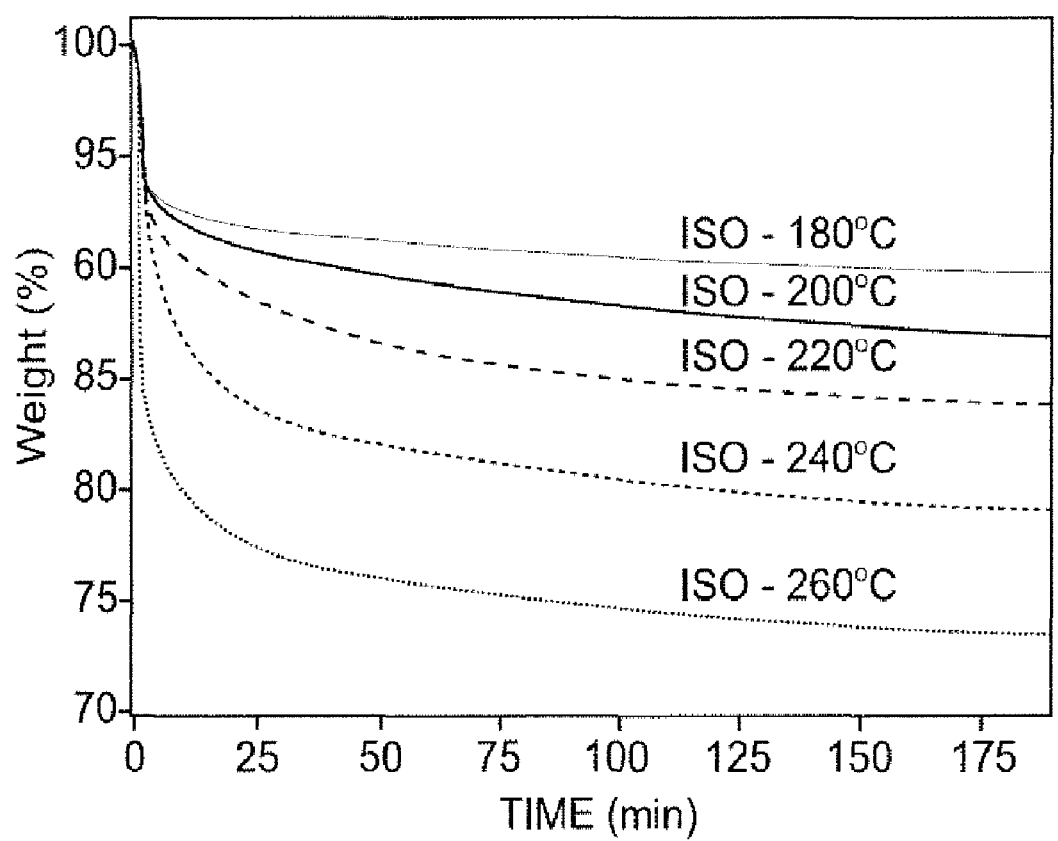
Figures 1, 2, 3, 4, 5, 6, 7, 7A:
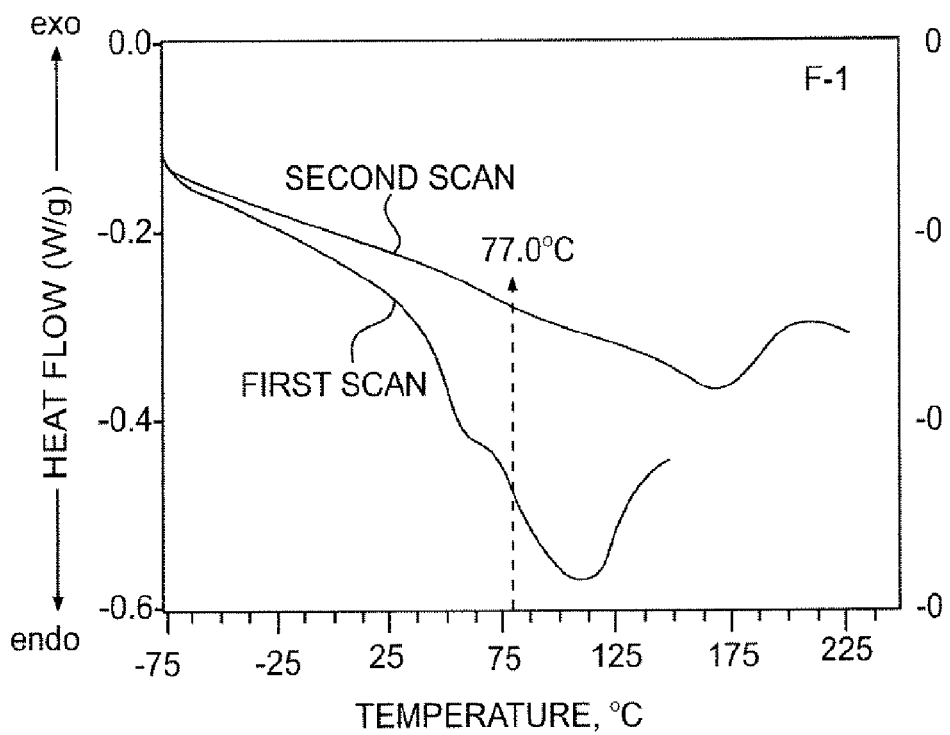
Figures 1, 2, 3, 4, 5, 6, 7, 7B:
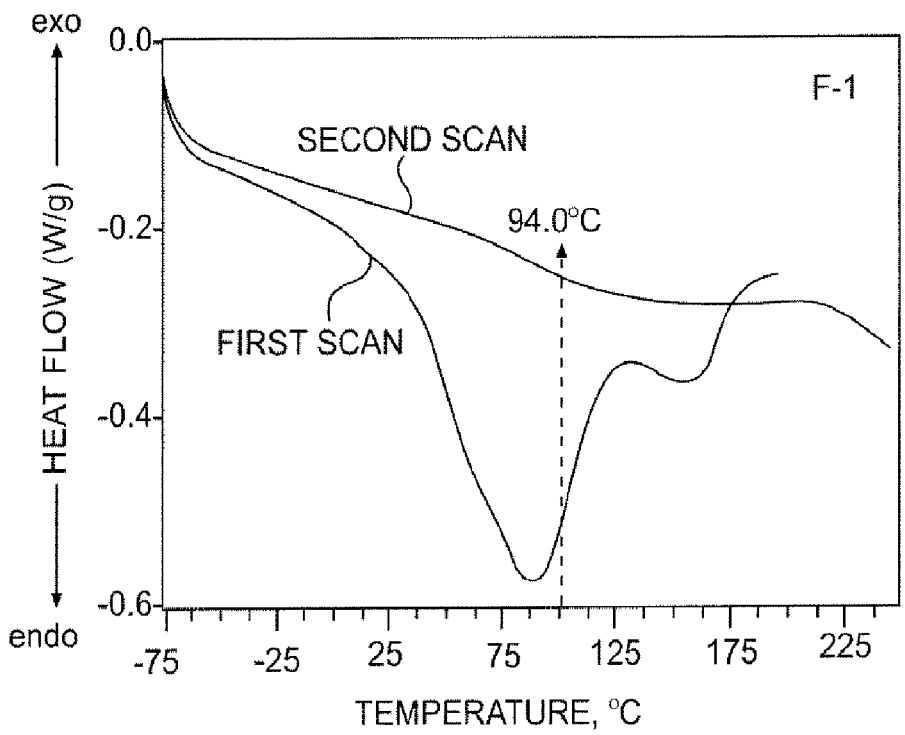
Figures 1, 2, 3, 4, 5, 6, 7, 8:
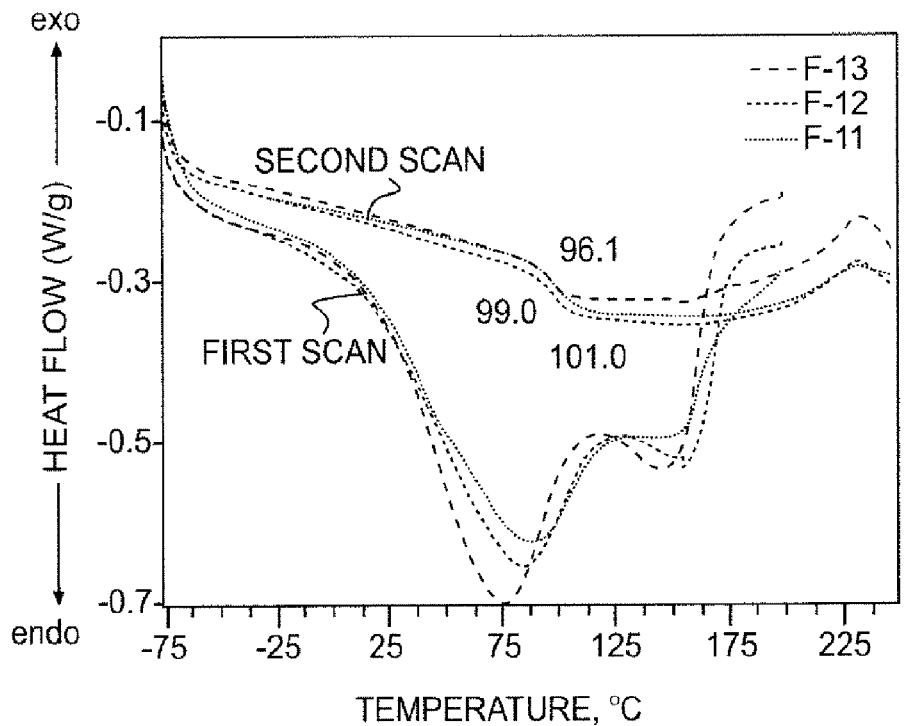
Figures 1, 2, 3, 4, 5, 6, 7, 8, 9:
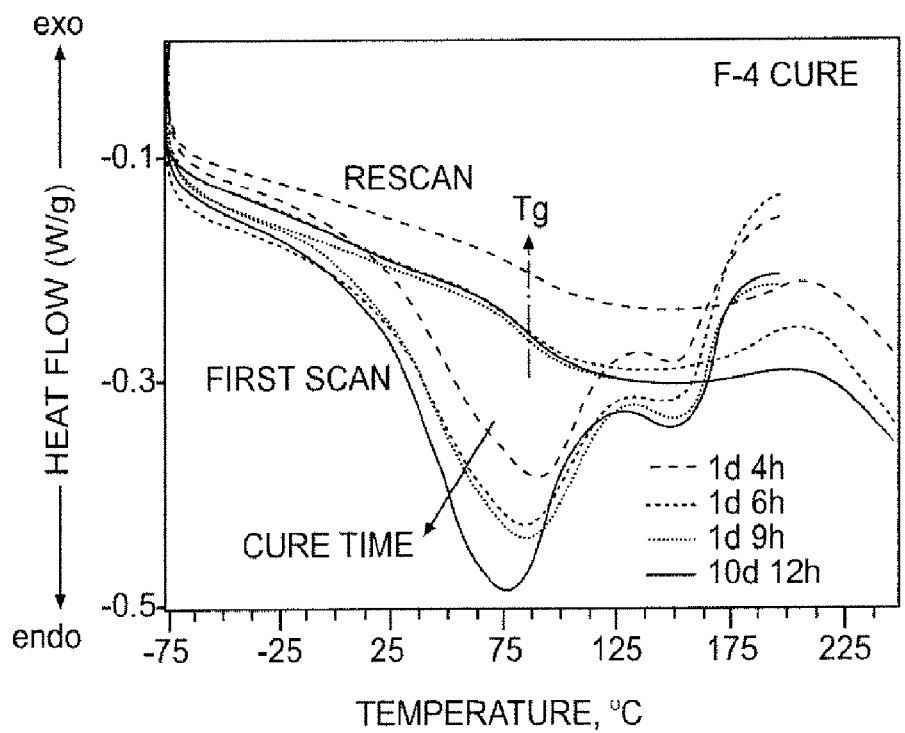
Figures 1, 2, 3, 4, 5, 6, 7, 8, 9, 10:
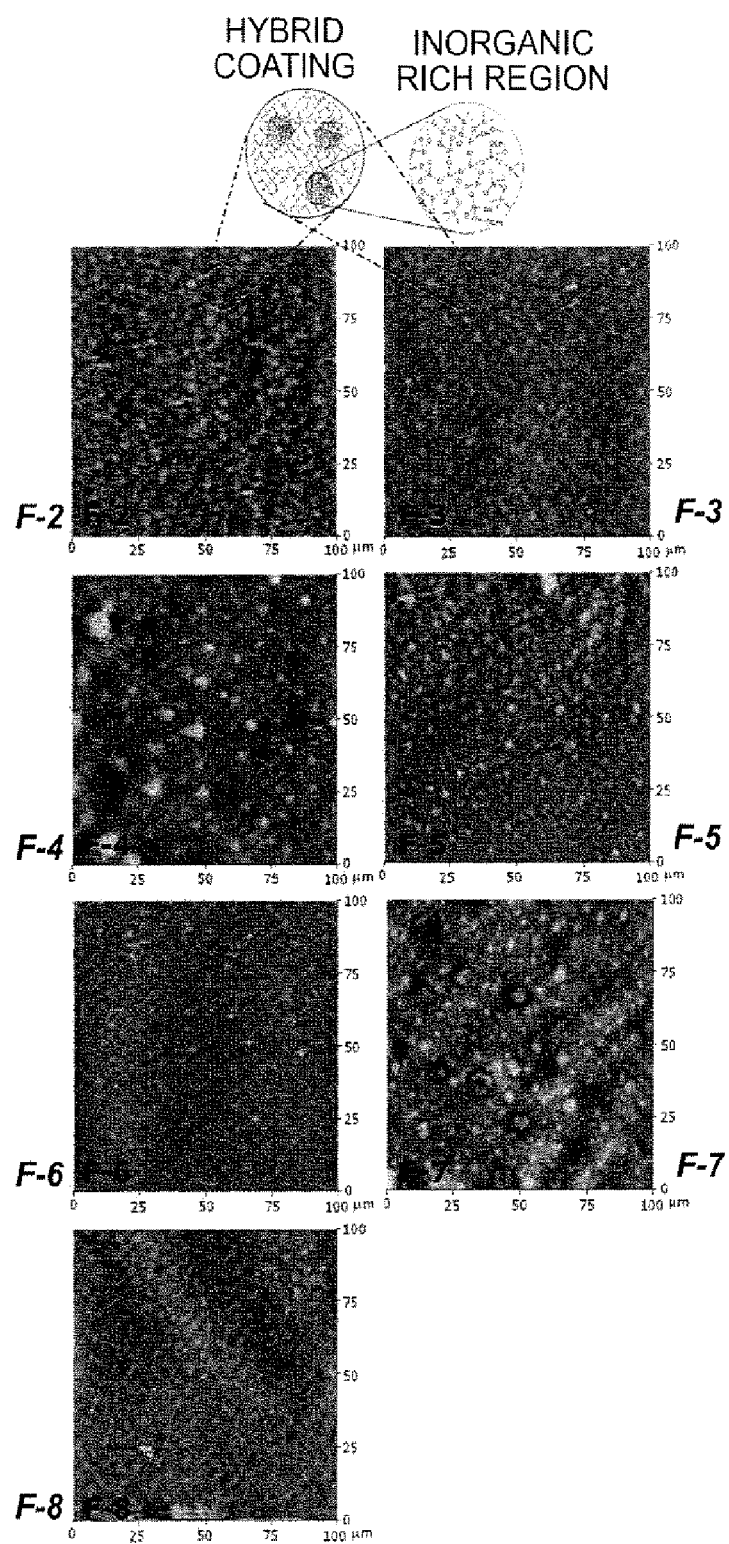

TGA is one of the techniques commonly used for the rapid evaluation of the thermal stability of different materials, and it also indicates the decomposition of polymers at various temperatures. TGA was carried out to estimate the thermal stability of the hybrid coatings synthesized. The TGA curves shown in FIG. 3-5 showed a three step decomposition profile. For the hybrid coatings that were analyzed, the weight loss below 200° C. is attributed to the evaporation of volatiles retained in the hybrid on account of incomplete polycondensation reactions of the residual silanol, while the broad stage of the weight loss within 200-600° C. might be ascribed to the random decomposition of the polymer chains. A comparison of thermal degradation profile shown in FIG. 3-5(*a*) suggests that coatings prepared from Ancamide 2353 crosslinker was more stable than that of prepared from Ancamide 2050 crosslinker. A comparison of thermals stability between oven cured Ancamide 2050 crosslinked BGC resin at two different TEOS content [FIG. 3-5(*b*)] shows that a higher amount of TEOS in sample BGC-9H resulted slight improvement in higher thermal stability than BGC-5H with a lower TEOS content. FIG. 3-6 shows the TGA thermograms of Epicure 3164 crosslinked BGC resin prepared in two different procedures. BGC-10 was cured at laboratory temperature and humidity for more than 20 d before the analysis was carrier out, while BGC-10H was oven cured at 80° C. for an hour after the tack free of the film. Later on, the oven cured sample BGC-10H was kept at laboratory conditions for more than 5 d before the TGA experiment was carried out. This suggests that the oven cured sample possess a high thermal stability in comparison to room temperature cured sample BGC-10. This could be due to the initiation of secondary reactions such as reactions of secondary amines or secondary alcohols with the epoxy groups produced from the epoxy-amine reaction. Additionally, during solid state polymerization at high temperature, grafting between the epoxide network and silica structures also takes place by condensation of silanol groups with the secondary C—OH group formed from the epoxide-amine reaction. Therefore, at high temperature the reactivity of secondary reactions increased and this produced highly crosslinked structures with higher thermal stability. FIG. 3-7(*a*) shows the TGA thermograms of oven cured Ancamide 2050 crosslinked BGC10% Si resin at different TEOS loading. FIG. 3-7(*b*) shows the TGA thermograms of room temperature cured Epicure 3164 crosslinked BGC15% Si resin at different TEOS loading. FIG. 3-7(*c*) shows the TGA thermograms of room temperature cured Ancamide 2050 crosslinked BGC15% Si resin at different TEOS loading and FIG. 3-7(*d*) shows the TGA thermograms of room temperature cured Ancamide 2353 crosslinked BGC15% Si resin at different TEOS loading. In all these TGA thermograms, a slight increase in thermal stability and char yield reduced weight was observed loss at high temperature with increasing TEOS content in the sample. These results are consistent with earlier studies, where researchers observed a similar increase in thermal stability with increasing inorganic network former concentration in the hybrid system.

DSC Analysis

In this example, all the reported $T_g$ values in Table 3-1 and Table 3-2 were evaluated from the rescan spectra. During the evaluation of sample in the first scan, a broad endothermic transition in between 40-200° C. was observed. This endothermic peak could be due to the vaporizing of volatile products such as $H_2O$ and alcohol of condensation that formed during the first heating scan according to the aforementioned reaction scheme. Additionally, the breakdown of intra- and inter-molecular C=O—H—N hydrogen bonding forces in the sample also contribute to this endothermic transition. FIG. 3-8 shows the DSC thermograms of BGC-10 and BGC-10H sample. The Tg values of BGC-10 and BGC-10H were 48.4 and 49.3° C., respectively. The higher $T_g$ value of oven cured sample BGC-10H could be due to the possible secondary reactions and higher crosslinking density of the sample as discussed above in thermal stability analysis. FIG. 3-9 shows the DSC thermograms of PACM crosslinked oven cured and room temperature cured BGC10% Si-11 and BGC10% Si-12 samples evaluated in $N_2$ environment. The $T_g$ values of BGC10% Si-11, BGC10% Si-11H, BGC10% Si-12 and BGC10% Si-12H were 100.2, 100.6, 100.3 and 102.3° C., respectively. These values suggest a little improvement in $T_g$ values for oven cured samples that that of room temperature cured samples. An increasing TEOS content in BGC10% Si-12 from BGC10% Si-11 also resulted a little enhancement in the $T_g$ value. FIG. 3-10 shows the DSC thermograms of Epicure 3164 crosslinked oven cured and room temperature cured BGC10% Si-13, BGC10% Si-14 and BGC10% Si-20 hybrid coatings evaluated in $N_2$ environment. The $T_g$ values of BGC10% Si-13, BGC10% Si-14 and BGC10% Si-20 were 42.8, 45.1 and 46.3° C., respectively. These values suggest that the $T_g$ increases with increasing the TEOS content in the sample. FIG. 3-11 shows the DSC thermograms of Ancamide 2353 crosslinked oven cured and room temperature cured BGC10% Si-15, BGC10% Si-16 and BGC10% Si-21 hybrid coatings evaluated in $N_2$ environment. The $T_g$ values of BGC10% Si-15, BGC10% Si-16 and BGC10% Si-21 were 75.9, 77.8 and 88.6° C., respectively. FIG. 3-12 shows the DSC thermograms of Ancamide 2050 crosslinked oven cured and room temperature cured samples BGC10% Si-17, BGC10% Si-18 and BGC10% Si-22 evaluated in $N_2$ environment. The $T_g$ values of BGC10% Si-17, BGC10% Si-18 and BGC10% Si-22 were 67.1, 67.8 and 67.8° C., respectively. FIG. 3-13 shows the DSC thermograms of Epicure 3164 crosslinked oven cured and room temperature cured samples BGC15% Si-23, BGC15% Si-24 and BGC15% Si-25 evaluated in $N_2$ environment. The $T_g$ values of BGC15% Si-23, BGC15% Si-24 and BGC15% Si-25 were 41.3, 45.1 and 47.8° C., respectively. FIG. 3-14 shows the DSC thermograms of Ancamide 2050 crosslinked oven cured and room temperature cured samples BGC15% Si-26, BGC15% Si-27 and BGC15% Si-28 evaluated in $N_2$ environment. The $T_g$ values of BGC15% Si-26, BGC15% Si-27 and BGC15% Si-28 were 64.0, 70.5 and 68.2° C., respectively. FIG. 3-15 shows the DSC thermograms of Ancamide 2050 crosslinked oven cured and room temperature cured samples BGC15% Si-29, BGC15% Si-30 and BGC15% Si-31 evaluated in $N_2$ environment. The $T_g$ values of BGC15% Si-29, BGC15% Si-30 and BGC15% Si-31 were 84.0, 75.5 and 89.4° C., respectively. With few exception, almost in all of these DSC thermograms, an increase in $T_g$ values were observed with (1) increasing TEOS content in the sample and (2) allowing the secondary reactions by keeping the samples in the oven. An increase in Tg values on increasing the TEOS content in the hybrid formulations can be explained on the basis of an increase of constraints on the segmental motion of the polymeric chains due to the formation of the silica domains. A comparison of $T_g$ values shown in Table 3-1 and Table 3-2 with different amine crosslinkers used showed that Epicure 3164 gives flexible coatings, whereas PACM and Ancamide 2353 produces hard coatings with higher $T_g$ values.

Mechanical Properties

Mechanical properties of the coatings such as Konig pendulum hardness, crosshatch adhesion, impact resistance are shown in Table 3-1 and Table 3-2. These tests were carried out on the cured coatings applied to sanded Al 2024 panels. FIG. 3-16 shows the hardness values of different hybrid coatings and suggests that the hardness values of oven cured samples were higher than that of room temperature cured samples. In many samples, an increase in the hardness values with increasing TEOS content was observed in the sample. For instance, the hardness values of BGC10% Si-13, BGC10% Si-14 and BGC10% Si-20 were 44, 46 and 63 sec., respectively. The increase in hardness for the BGC-silane hybrid system can be explained by increasing network density, caused by silica cluster formation around the end-groups of the GC resin. Crosshatch adhesion values of all the coatings were in the region of 3B-4B suggest a good adhesion on sanded Al 2024. The reverse impact resistances of all the Epicure crosslinked coatings were >172, suggesting their flexible nature and properties. The impact resistance of Ancamide 2353 and PACM crosslinked coatings were lower compared to the other amine crosslinked coatings. A comparison of impact resistance values of Ancamide crosslinked coatings shown in Table 3-1 with that of Table 3-2 shows that the impact resistance of the coatings produced in Scheme 3-2 were higher. The reverse impact resistance values of BGC-4, BGC-5 and BGC-9 were 60, 64 and 88, respectively, suggesting that increasing TEOS content results in an enhancement in impact resistance. A similar observation was also noticed in the series BGC10% Si-15, BGC10% Si-16 and BGC10% Si-21; and in BGC10% Si-17, BGC10% Si-18 and BGC10% Si-22. The MEK double nib resistance of all the hybrid coatings as shown in Table 3-1 and Table 3-2 were higher than 400. Table 3-1 and Table 3-2 also showed the contact angle for the hybrid films prepared from BGC resin and silane modified BGC resin, respectively. The water contact angles of all the post-cured hybrid coatings casted on glass plates were in the range 65.1-81.1.

Conclusions for Example 3

Optically transparent organic-inorganic hybrid coating materials using HDB, glycidol, APTMS and TEOS as precursors have been successfully prepared by the sol-gel process. The molecular weight and polydispersity of the synthesized resin BGC, BGC10% Si and BGC15% Si were determined using GPC experiment. $^1$H NMR studies confirmed the structure of the synthesized resins. The disappearance of glycidol OH peak and formation of NH—C═O peak during the liquid state reaction was monitored with time. $^1$H NMR experiments of BGC %10Si resin at different temperatures was carried out to understand the behavior of the polymers with temperature. The effect of change in hydrogen bonding in the BGC %10Si resin with temperature resulted in peak shifting in the $^1$H NMR spectra of the protons involved in the hydrogen bonding. The urethane region in the $^{13}$C NMR spectra showed the presence of two different NHC═O for BGC resin and three different NHC═O for BGS10% Si and BGS15% Si resins. FTIR spectroscopy was used to understand the observable changes in structure with network maturation as well as for characterizing the structure of the hybrid coatings. The characteristic thermals stability data and the TGA thermograms showed that the material thermal stability depends on the (1) TEOS content in the sample, (2) amine crosslinker nature and (3) the method of cure used for the hybrid coatings. In general, a greater amount of TEOS precursor provided better thermal stability of the hybrid materials. DSC analysis showed that an increasing TEOS content in the hybrid coatings results a slight increase in $T_g$, largely due to increase in constraints on the segmental motion of the polymeric chains via the formation of increased silica domains structure. The $T_g$ values of different amine crosslinked coatings suggest that Epicure 3164 gives flexible coatings, whereas PACM and Ancamide 2353 produces hard coatings. The hardness values of oven cured samples were higher than that of room temperature cured samples. Crosshatch adhesion values of all the coatings were in the region of 3B-4B, suggesting a good adhesion on sanded Al 2024. The reverse impact resistances of all the Epicure crosslinked coatings were >172, suggesting their flexible nature. The impact resistance of Ancamide 2353 and PACM crosslinked coatings were lower compared to the other amine crosslinked coatings. The MEK double rub resistance of all the hybrid coatings were higher than 400. The water contact angles of all the hybrid coatings were in the range 65.1-81.1.

TABLE 3-1

Properties of hybrid coatings prepared from BGC resin, TEOS and different amine crosslinkers at epoxy equivalent (BGC resin):amine hydrogen (crosslinker) ratio of 1:1.

| Sample Name | Crosslinker | TEOS (g) | Tg in ° C. (DSC) | Crosshatch adhesion | Impact (Reverse: in · lbs) | MEK double rub | Water Contact angle (°) |
|---|---|---|---|---|---|---|---|
| BGC-4 | Ancamide 2050 | 0 | 77.0 | 4 B | 60 | >400 | 71.2 |
| BGC-5 | Ancamide 2050 | 0.148 | 80.8 | 4 B | 64 | >400 | 72.1 |
| BGC-9 | Ancamide 2050 | 0.297 | — | 4 B | 88 | >400 | 65.1 |
| BGC-8 | Ancamide 2353 | 0.232 | 88.2 | 4 B | 48 | >400 | 80.1 |

TABLE 3-1-continued

Properties of hybrid coatings prepared from BGC resin, TEOS and different amine crosslinkers at epoxy equivalent (BGC resin):amine hydrogen (crosslinker) ratio of 1:1.

| Sample Name | Crosslinker | TEOS (g) | Tg in °C. (DSC) | Crosshatch adhesion | Impact (Reverse: in · lbs) | MEK double rub | Water Contact angle (°) |
|---|---|---|---|---|---|---|---|
| BGC-10 | Epicure 3164 | 0.148 | 48.4 | 4 B | >172 | >400 | 67.8 |
| BGC-7 | Epicure 3164 | 0.317 | 50.9 | 4 B | >172 | >400 | 70.7 |

TABLE 3-2

Properties of hybrid coatings prepared from BGC10%Si and BGC15%Si resin, TEOS and different amine crosslinkers at epoxy equivalent (silane modified BGC resin):amine hydrogen (crosslinker) ratio of 1:1.

| Sample Name | Crosslinker | TEOS (g) | Tg in °C. (DSC) | Crosshatch adhesion | Impact (Reverse: in · lbs) | MEK double rub | Water Contact angle (°) |
|---|---|---|---|---|---|---|---|
| BGC10%Si-11 | PACM | 0.25 | 100.2 | 3 B | 132 | >400 | 69.9 |
| BGC10%Si-12 | PACM | 0.5 | 100.3 | 4 B | >172 | >400 | 70.7 |
| BGC10%Si-13 | Epicure 3164 | 0.25 | 42.8 | 4 B | >172 | >400 | 67.4 |
| BGC10%Si-14 | Epicure 3164 | 0.5 | 45.1 | 4 B | >172 | >400 | 66.6 |
| BGC10%Si-20 | Epicure 3164 | 1.0 | 46.3 | 4 B | >172 | >400 | 58.4 |
| BGC10%Si-15 | Ancamide 2353 | 0.25 | 75.9 | 3 B | 76 | >400 | 71.5 |
| BGC10%Si-16 | Ancamide 2353 | 0.5 | 77.8 | 3 B | 132 | >400 | 72.8 |
| BGC10%Si-21 | Ancamide 2353 | 1.0 | 88.6 | 3 B | 140 | >400 | 73.8 |
| BGC10%Si-17 | Ancamide 2050 | 0.25 | 67.1 | 4 B | 108 | >400 | 72.3 |
| BGC10%Si-18 | Ancamide 2050 | 0.5 | 67.8 | 3 B | 112 | >400 | 70.2 |
| BGC10%Si-22 | Ancamide 2050 | 1.0 | 67.8 | 4 B | 168 | >400 | 81.1 |
| BGC15%Si-23 | Epicure 3164 | 0.35 | 41.3 | 4 B | >172 | >400 | 63.6 |
| BGC15%Si-24 | Epicure 3164 | 0.7 | 45.1 | 4 B | >172 | >400 | 71.1 |
| BGC15%Si-25 | Epicure 3164 | 1.4 | 47.8 | 4 B | >172 | >400 | 70.8 |
| BGC15%Si-26 | Ancamide 2050 | 0.35 | 64.0 | 4 B | >172 | >400 | 74.8 |
| BGC15%Si-27 | Ancamide 2050 | 0.7 | 70.5 | 4 B | >172 | >400 | 67.9 |
| BGC15%Si-28 | Ancamide 2050 | 1.4 | 68.2 | 4 B | >172 | >400 | 80.8 |
| BGC15%Si-29 | Ancamide 2353 | 0.35 | 84.0 | 3 B | 96 | >400 | 75.4 |
| BGC15%Si-30 | Ancamide 2353 | 0.7 | 75.5 | 3 B | >172 | >400 | 74.1 |
| BGC15%Si-31 | Ancamide 2353 | 1.4 | 89.4 | 3 B | 140 | >400 | 72.1 |

Scheme 3-1. Schematic stepwise diagram of hybrid coating formation from HDB, APTMS, TEOS and amine crosslinkers.

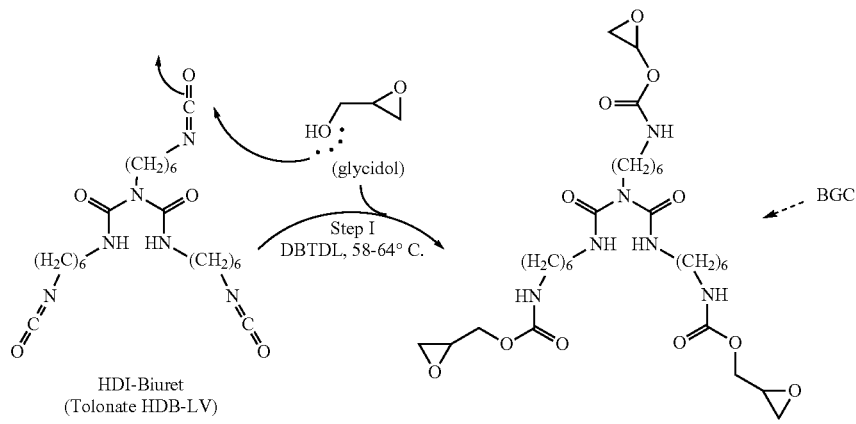

HDI-Biuret
(Tolonate HDB-LV)

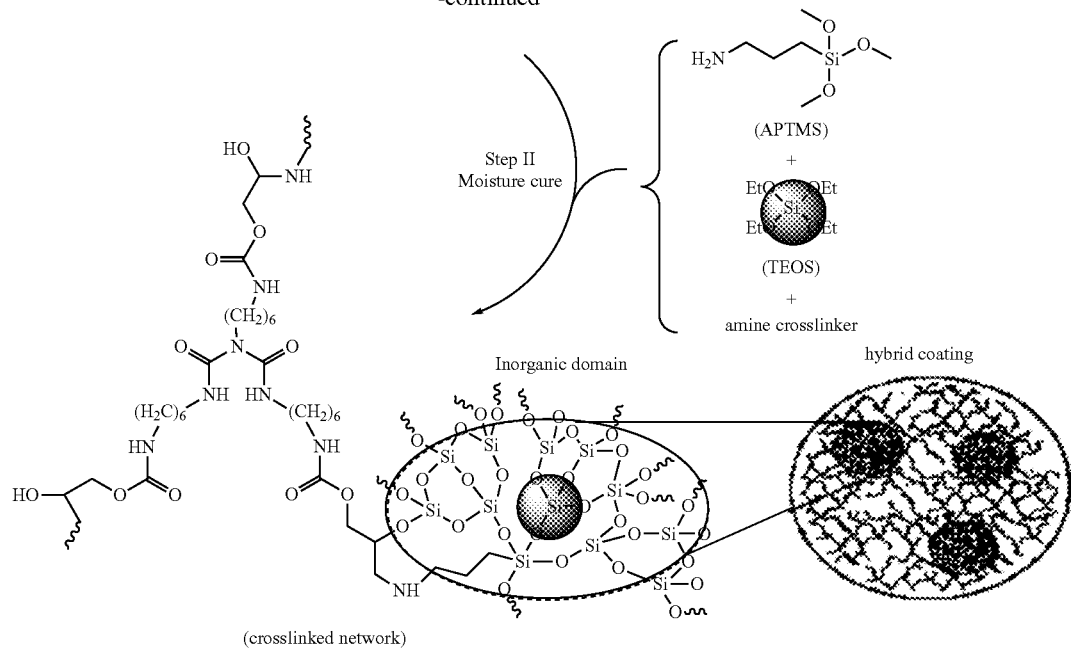

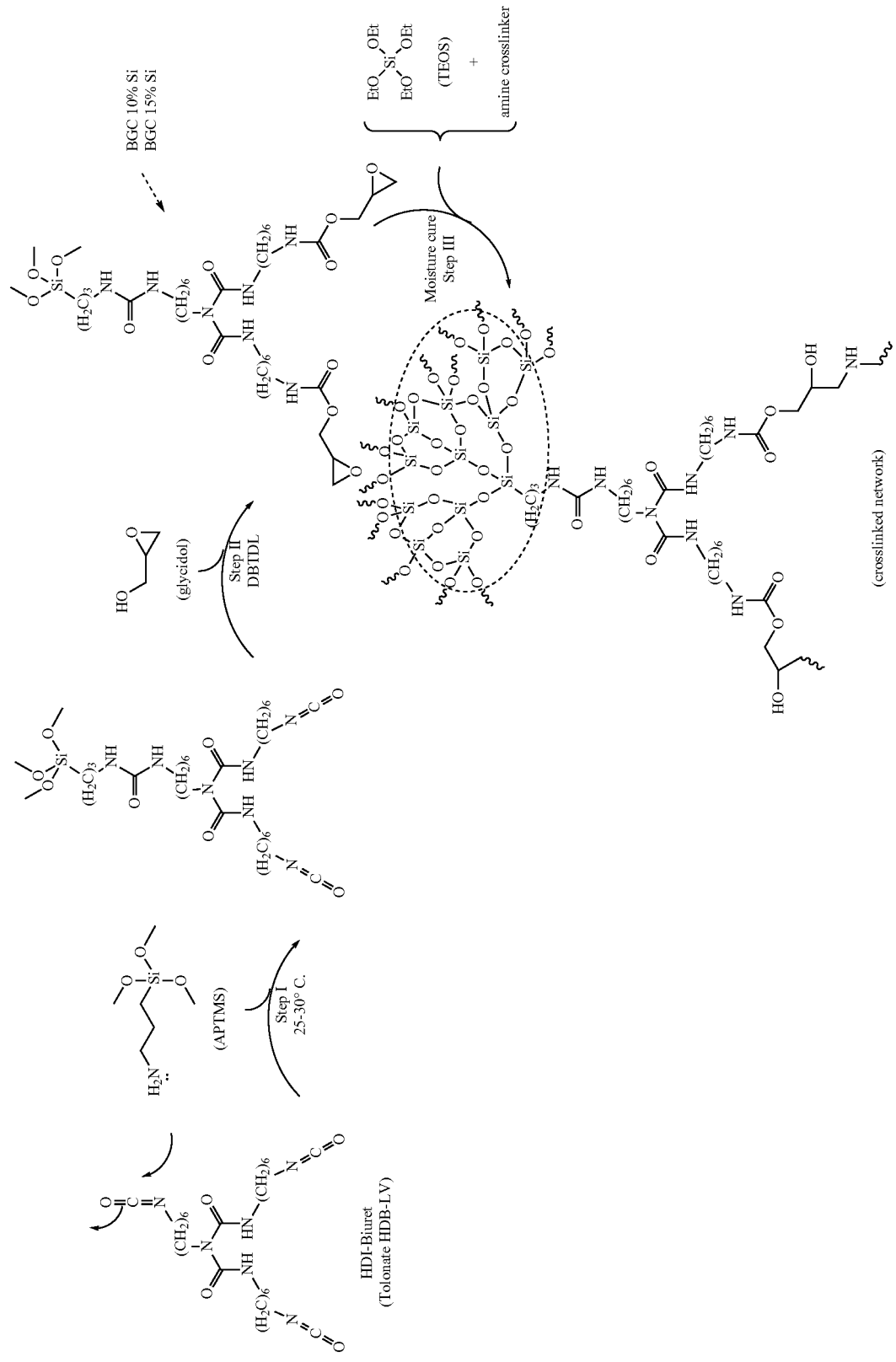
Scheme 3-2. Schematic stepwise diagram of hybrid coating formation from HDB, APTMS, TEOS and amine crosslinkers.

The claimed invention is:

1. A silane-functional epoxy urethane compound of the Formula (I) or Formula (II):

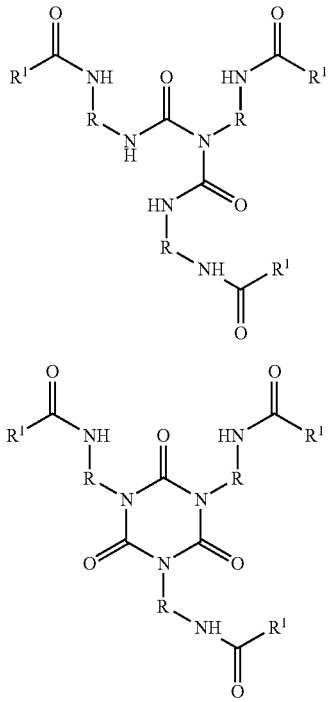

wherein:
R is independently an optionally substituted, divalent $C_1$-$C_{15}$ alkyl, optionally substituted divalent $C_3$-$C_{15}$ cycloalkyl, or a group selected from

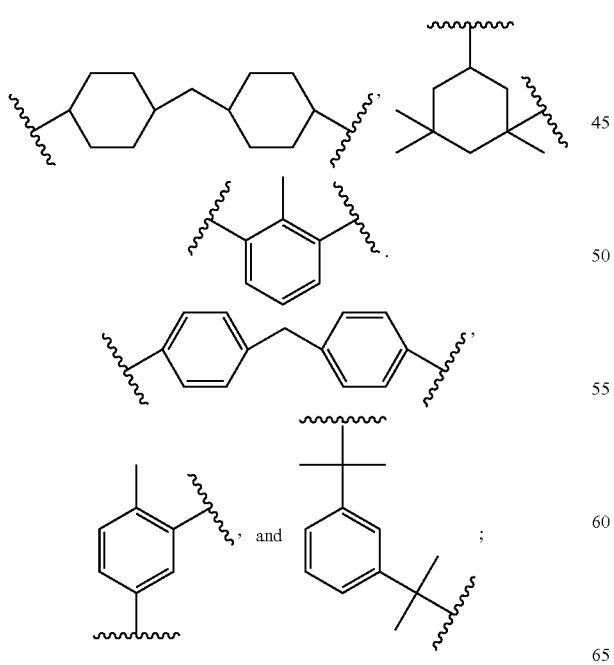

$R^1$ is independently a —NH—$(CH_2)_n$—Si$(OR^2)_3$ group or a

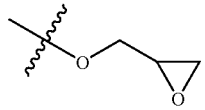

group and wherein at least one $R^1$ is a —NH—$(CH_2)_n$—Si$(OR^2)_3$ group;

$R^2$ is independently a $C_1$-$C_6$ alkyl group; and n ranges from 1 to 5.

2. The silane-functional epoxy urethane compound of claim 1, wherein each occurrence of $R^1$ is a —NH—$(CH_2)_n$—Si$(OR^2)_3$ group.

3. The silane-functional epoxy urethane compound of claim 2, wherein $R^2$ is a methyl group, n is 3, and R is —$(CH_2)_6$—.

4. The silane-functional epoxy urethane compound of claim 2, wherein the compound is a compound of formula (I).

5. A coating composition, comprising:
(a) epoxy urethane compound of the Formula (I) or Formula (II):

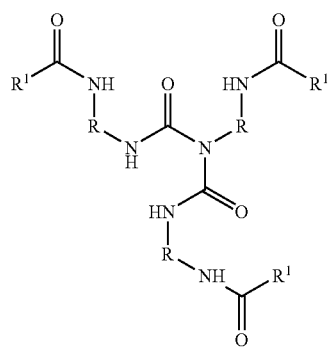

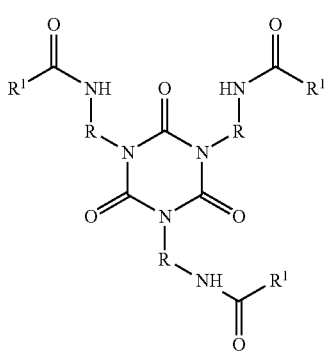

wherein:
R is independently an optionally substituted, divalent $C_1$-$C_{15}$ alkyl, optionally substituted divalent $C_3$-$C_{15}$ cycloalkyl, or a group selected from

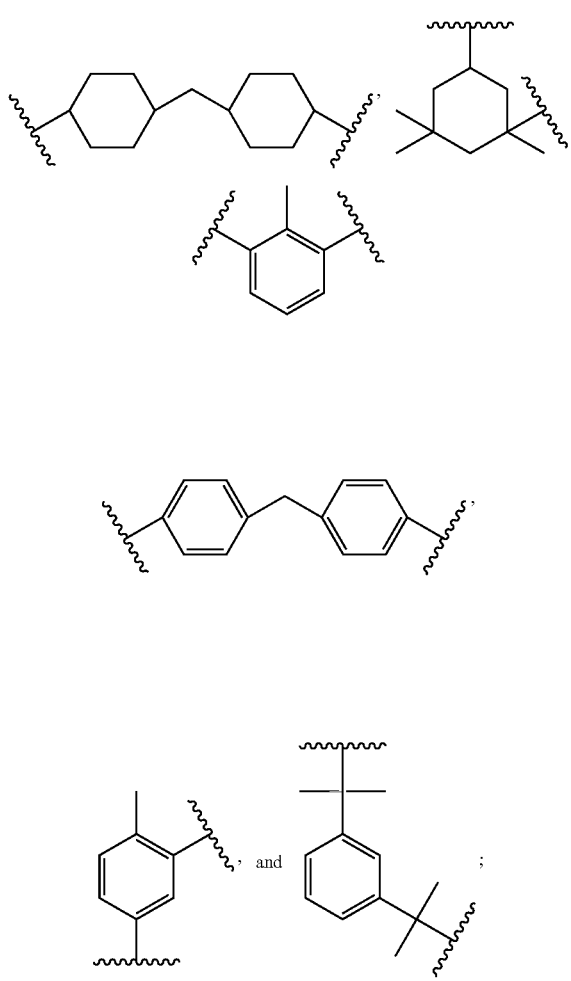

$R^1$ is independently a —NH—$(CH_2)_n$—Si$(OR^2)_3$ group or a

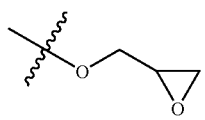

group, wherein at least one $R^1$ is a

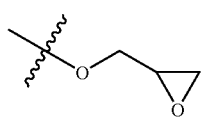

group;

$R^2$ is independently a $C_1$-$C_6$ alkyl group; and n ranges from 1 to 5; and (b) a curing agent, wherein the —NH—$(CH_2)_n$—Si$(OR^2)_3$ group is present as $R^1$ in the coating composition in an amount ranging from about 2 mole % to about 50 mole %.

6. A coating composition, comprising:
(a) epoxy urethane compound of the Formula (III) or Formula (IV):

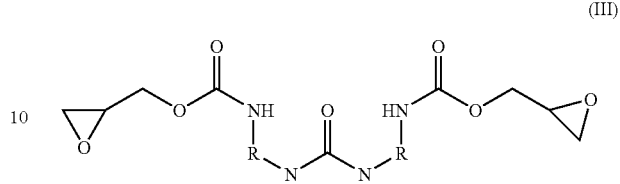

(III)

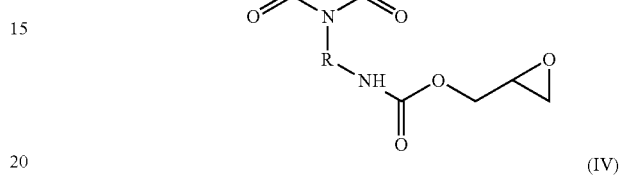

(IV)

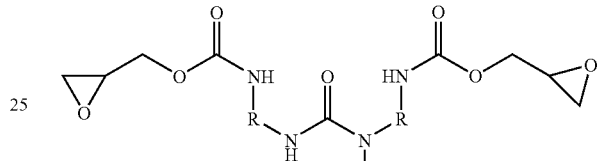

wherein:
R is independently an optionally substituted, divalent $C_1$-$C_{15}$ alkyl, optionally substituted divalent $C_3$-$C_{15}$ cycloalkyl, or a group selected from

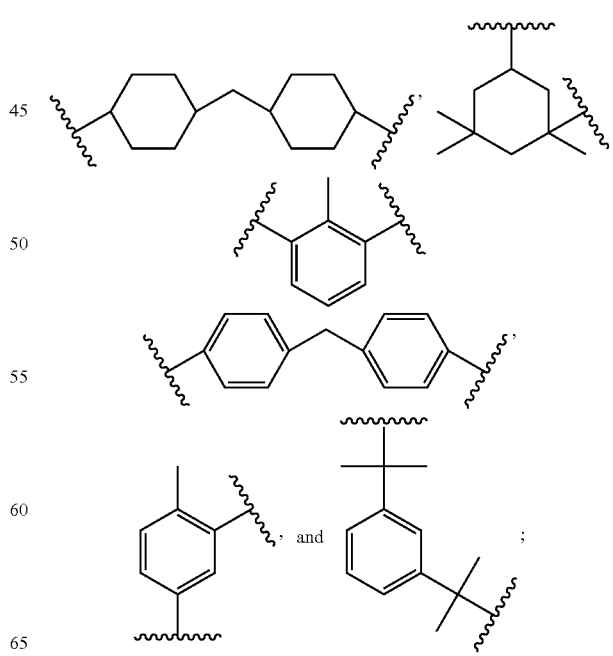

and
(b) a blended curing component comprising:
   i. at least one sol gel precursor, and
   ii. an amine crosslinker.

7. The coating composition according to claim 5, wherein R is —$(CH_2)_6$—, $R^2$ is a methyl group, and n is 3.

8. The coating composition according to claim 6, wherein R is —$(CH_2)_6$—.

9. The coating composition according to claim 5, wherein the epoxy urethane compound is a compound of formula (I).

10. The coating composition according to claim 6, wherein the epoxy urethane compound is a compound of formula (IV).

11. The coating composition according to claim 5, wherein the curing agent is an amine crosslinker.

12. The coating composition according to claim 5, wherein the curing agent (b) is a blended curing component comprising:
   i. at least one sol gel precursor, and
   ii. an amine crosslinker.

13. The coating composition according claim 6, wherein the amine crosslinker is selected from the group consisting of bis(para-aminocyclohexyl)methane, diethylene triamine, 4,4'-methylene dianiline, p-aminocyclohexyl methane, and combinations thereof.

14. The coating composition according to claim 6, wherein the sol gel precursor is selected from 3-aminopropyl trimethoxysilane (APTMS), tetraethyl orthosilicate (TEOS), and combinations thereof.

15. An abrasion-resistant material comprising the coating composition of claim 5.

16. A method of preparing a silane-modified hybrid coating composition, comprising:
   a. reacting an isocyanate resin with an amine-terminated silane to produce a silane-modified isocyanate resin;
   b. reacting the silane-modified isocyanate resin with glycidol to produce a silane-modified glycidyl carbamate resin; and
   c. mixing the silane-modified glycidyl carbamate resin with at least one sol gel precursor and/or at least one amine crosslinker
to produce a silane-modified hybrid coating composition.

17. The method of claim 16, wherein the amine-terminated silane is 3-aminopropyl trimethoxysilane.

18. A method of preparing a hybrid coating, comprising:
   a. reacting an isocyanate resin with glycidol to form a glycidyl carbamate resin; and
   b. mixing the glycidyl carbamate resin with at least one sol gel precursor and/or at least one amine crosslinker
to produce a hybrid coating composition.

19. The method according to claim 16, further comprising the step of moisture curing and/or oven curing the hybrid coating.

20. The method of claim 19, wherein the moisture curing creates an Si—O—Si network in the silane-modified hybrid coating.

21. A composition comprising the silane-functional epoxy urethane compound of claim 1.

22. The composition of claim 21, wherein the silane-functional —NH—$(CH_2)_n$—$Si(OR^2)_3$ groups are present in the composition in an amount ranging from about 2 mole % to about 50 mole %.

23. A method of coating a substrate, comprising the step of applying the coating composition of claim 5 to a substrate.

24. The method of claim 23, wherein the substrate is selected from the group consisting of metal, wood, glass, stone, ceramic materials, concrete, rigid and flexible synthetic resins, textiles, leather, paper, and combinations thereof.

25. The method of claim 24, wherein the substrate is an aluminum metal substrate.

* * * * *